Inventor:
Paul H. Korsgaard.
By Brown, Jackson, Boettcher & Dienner
Attys.

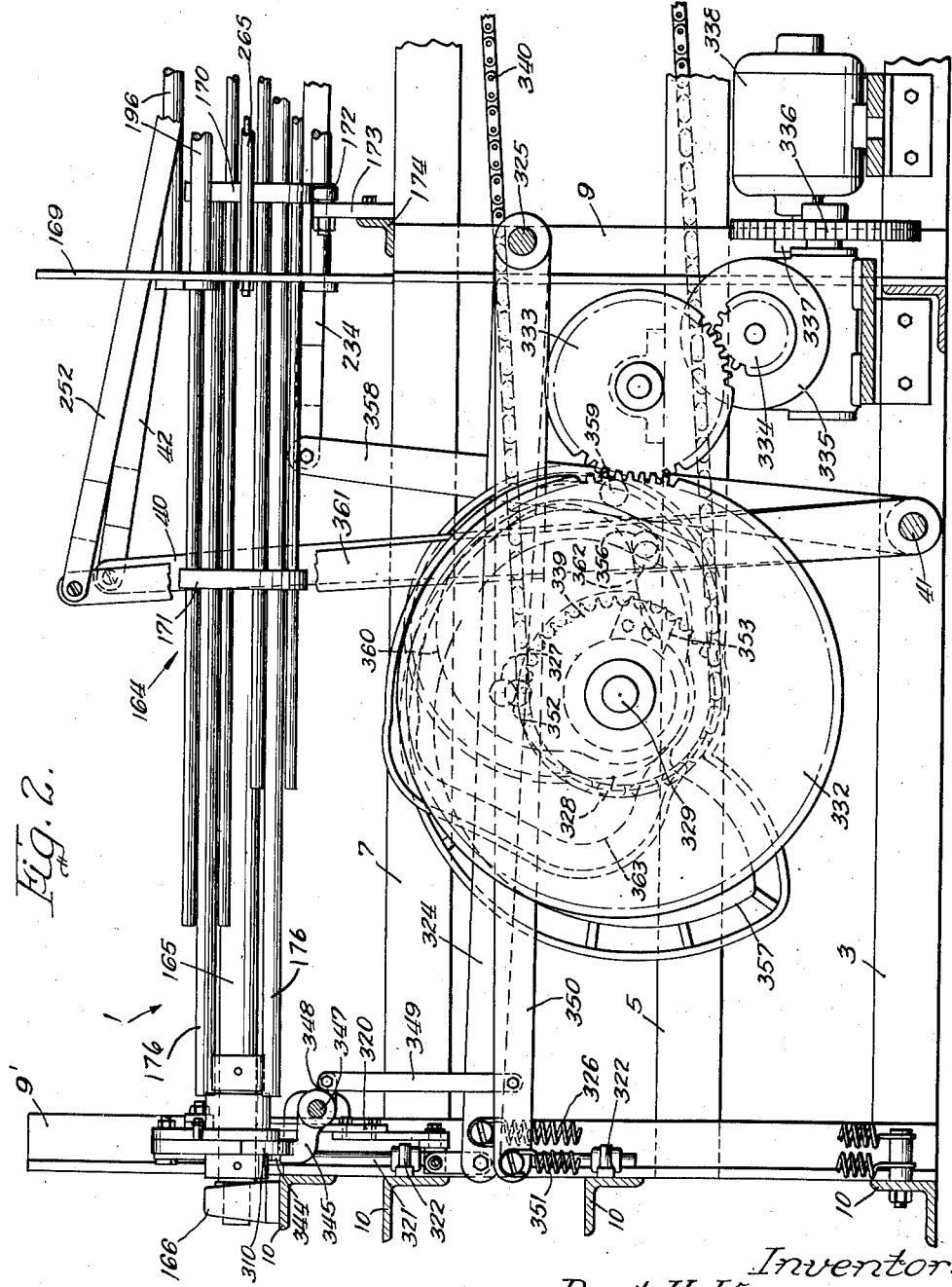

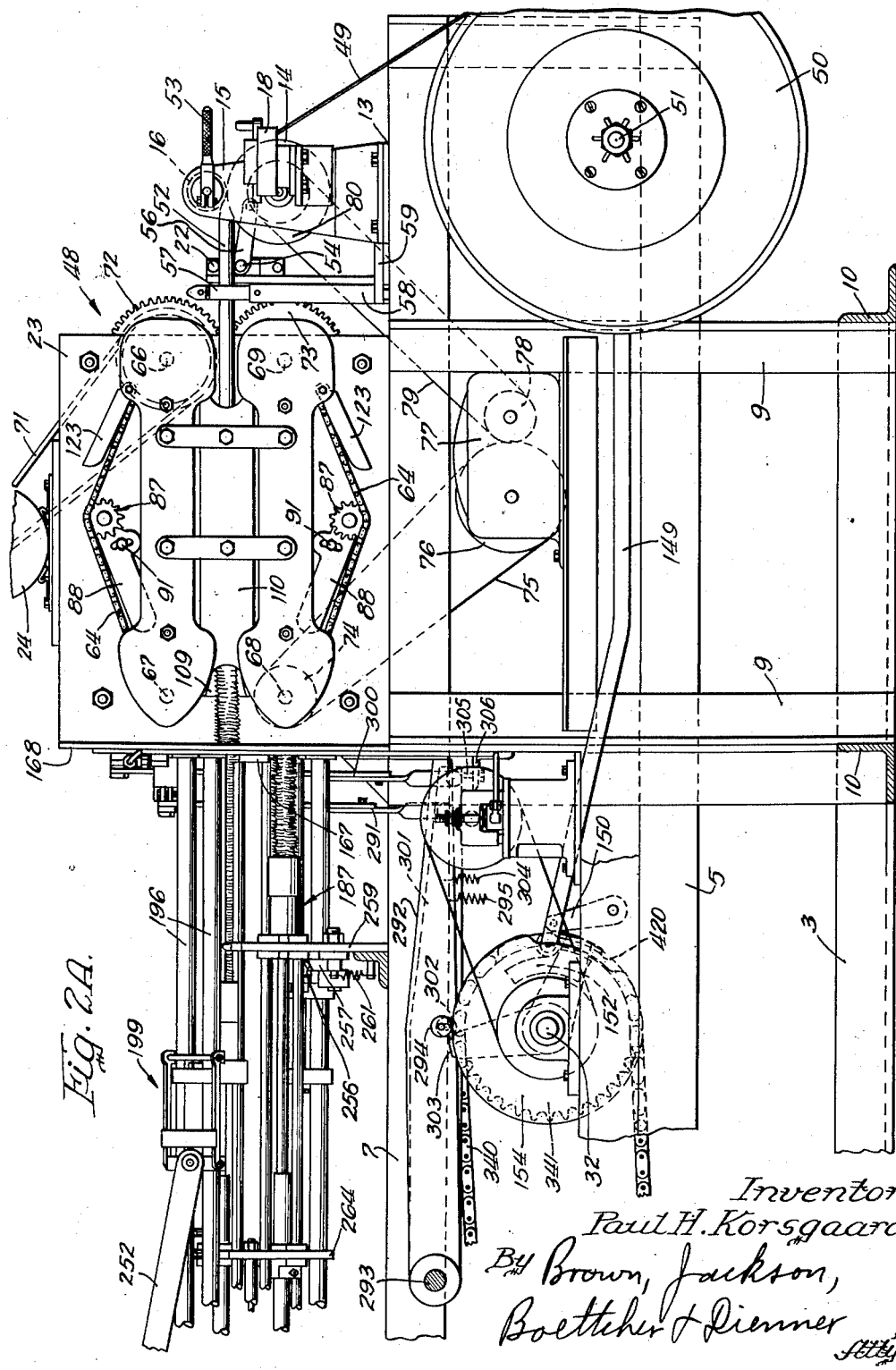

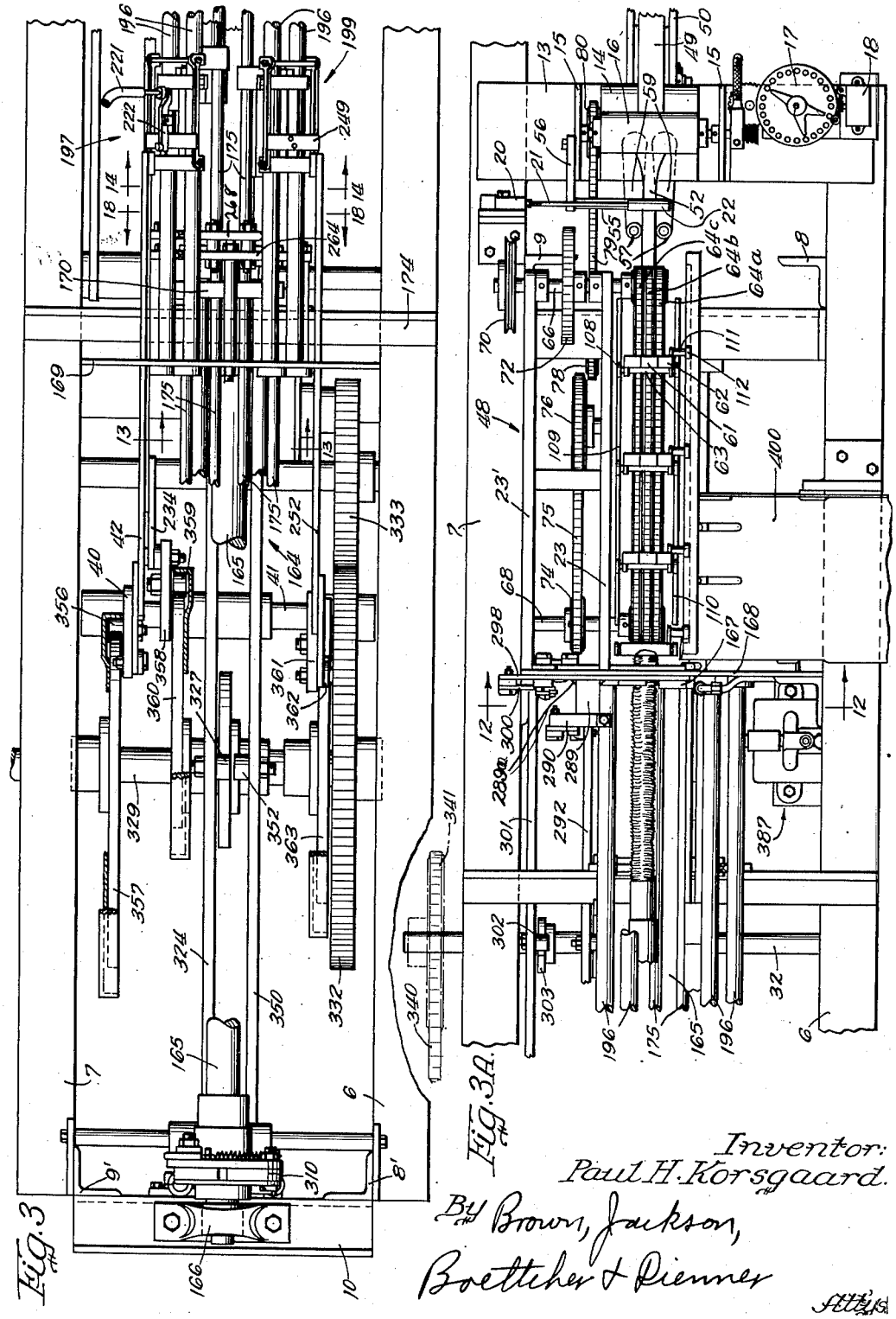

Jan. 29, 1952 P. H. KORSGAARD 2,583,654
AUTOMATIC SHIRRING MACHINE
Filed Dec. 27, 1947 22 Sheets-Sheet 5
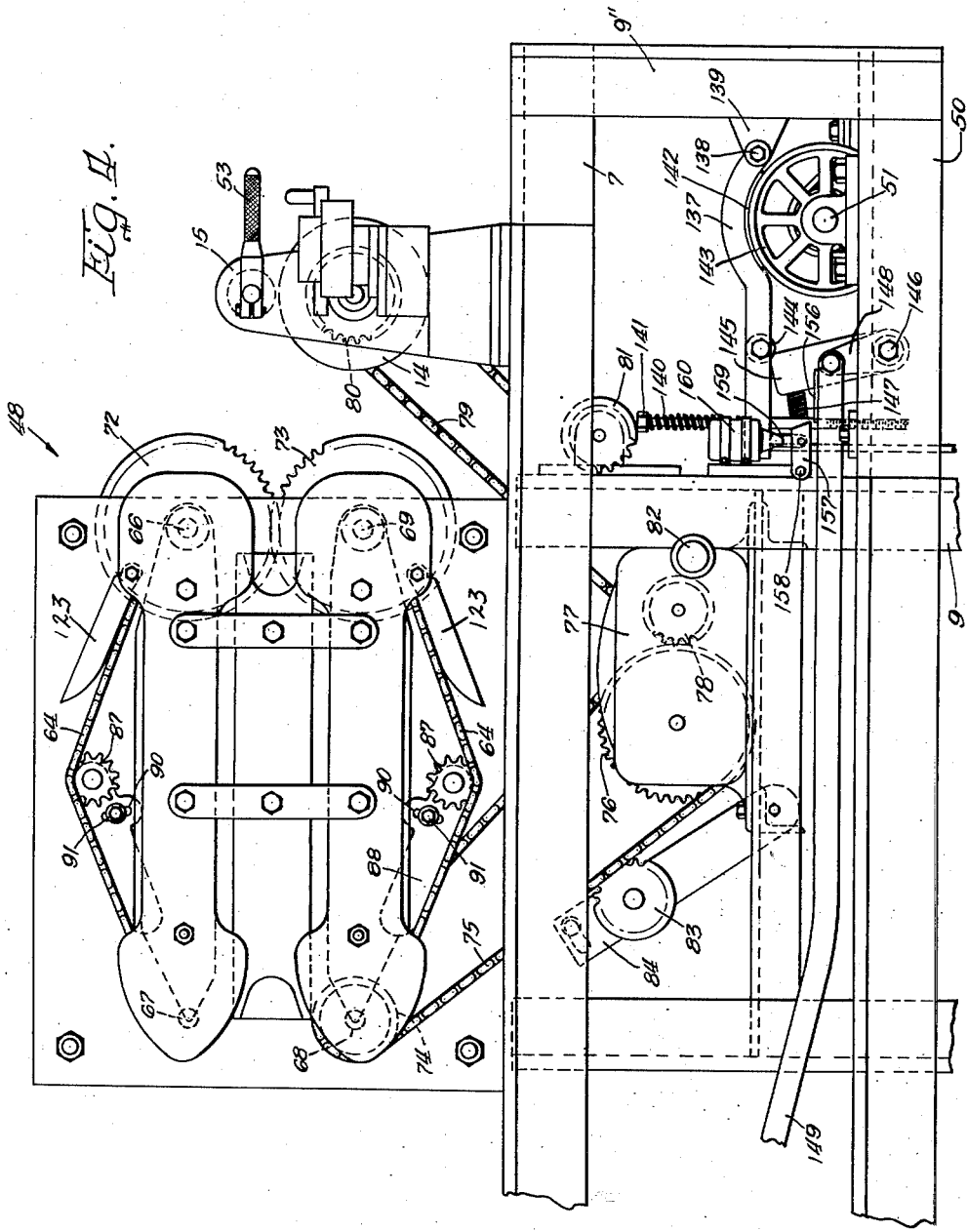
Inventor:
Paul H. Korsgaard.
By Brown, Jackson, Boettcher & Dienner
Attys.

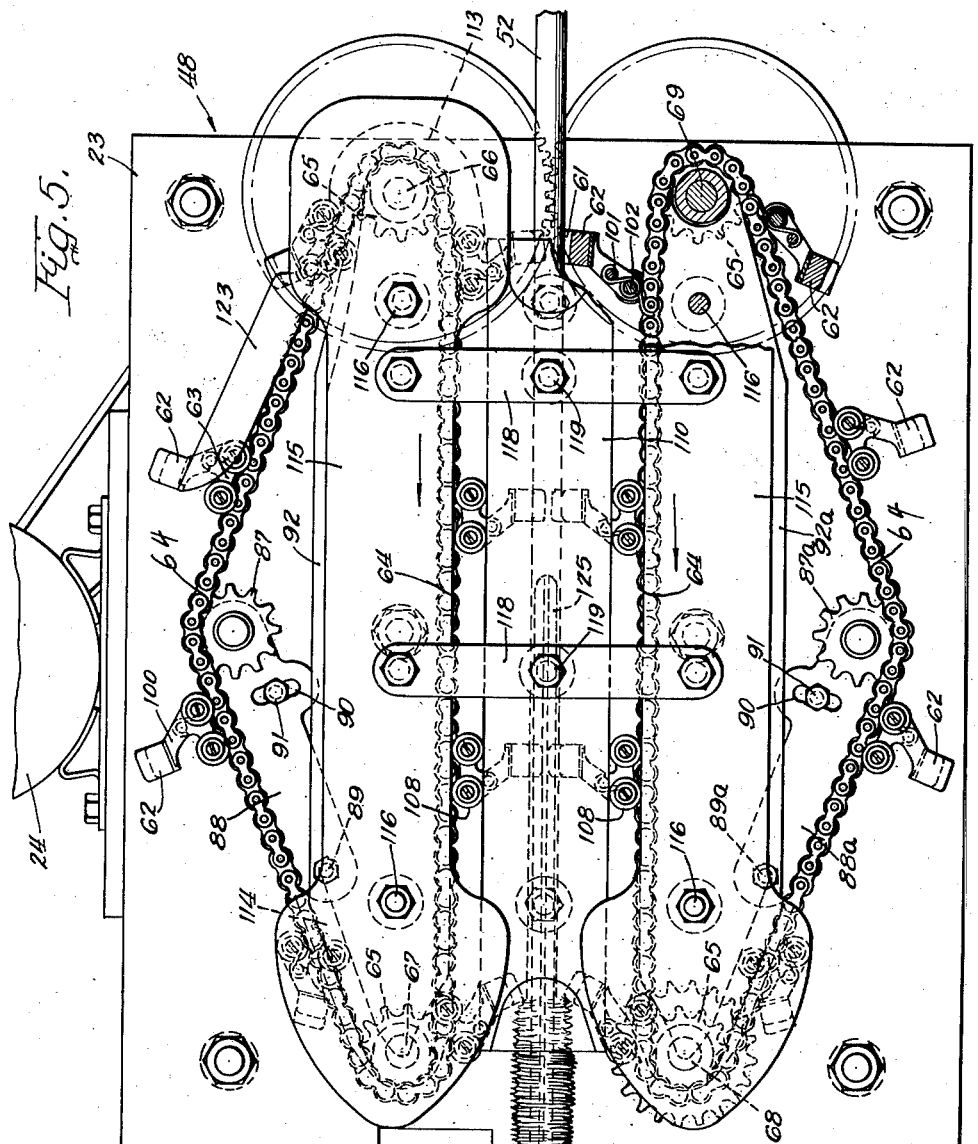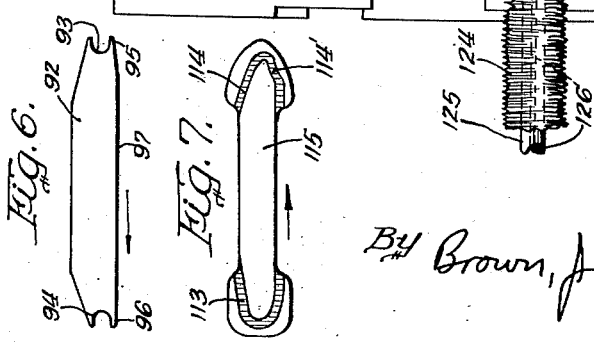

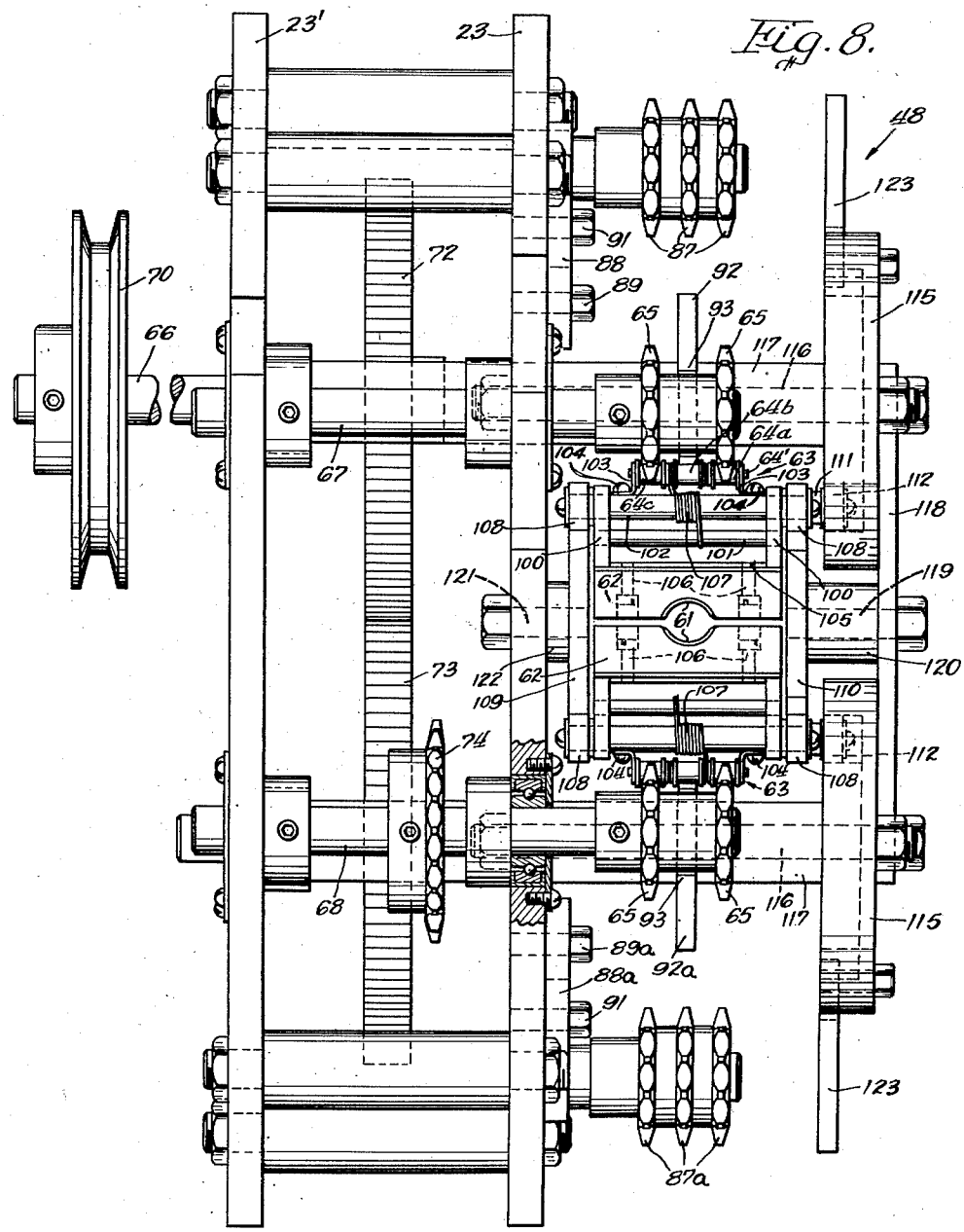

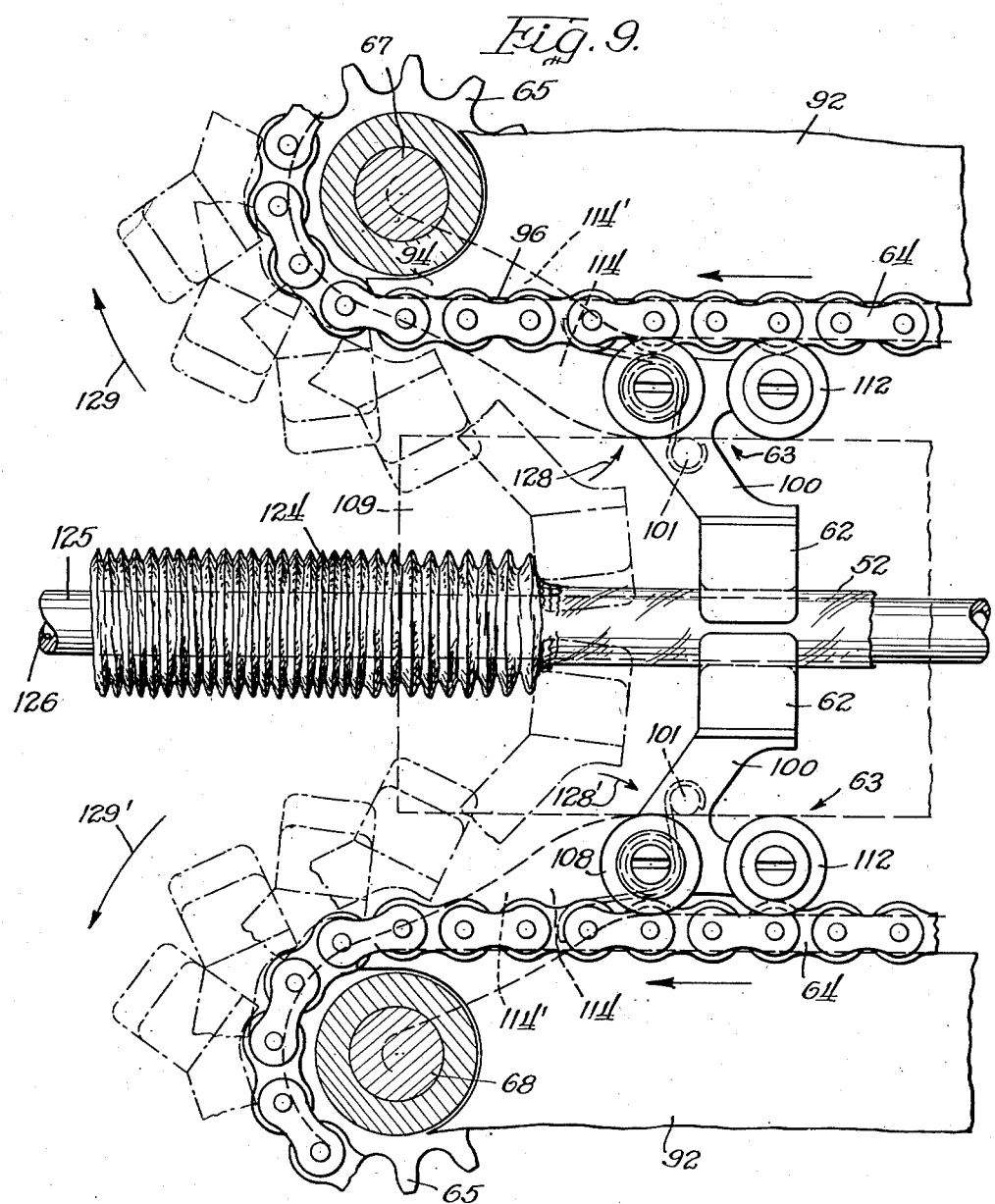

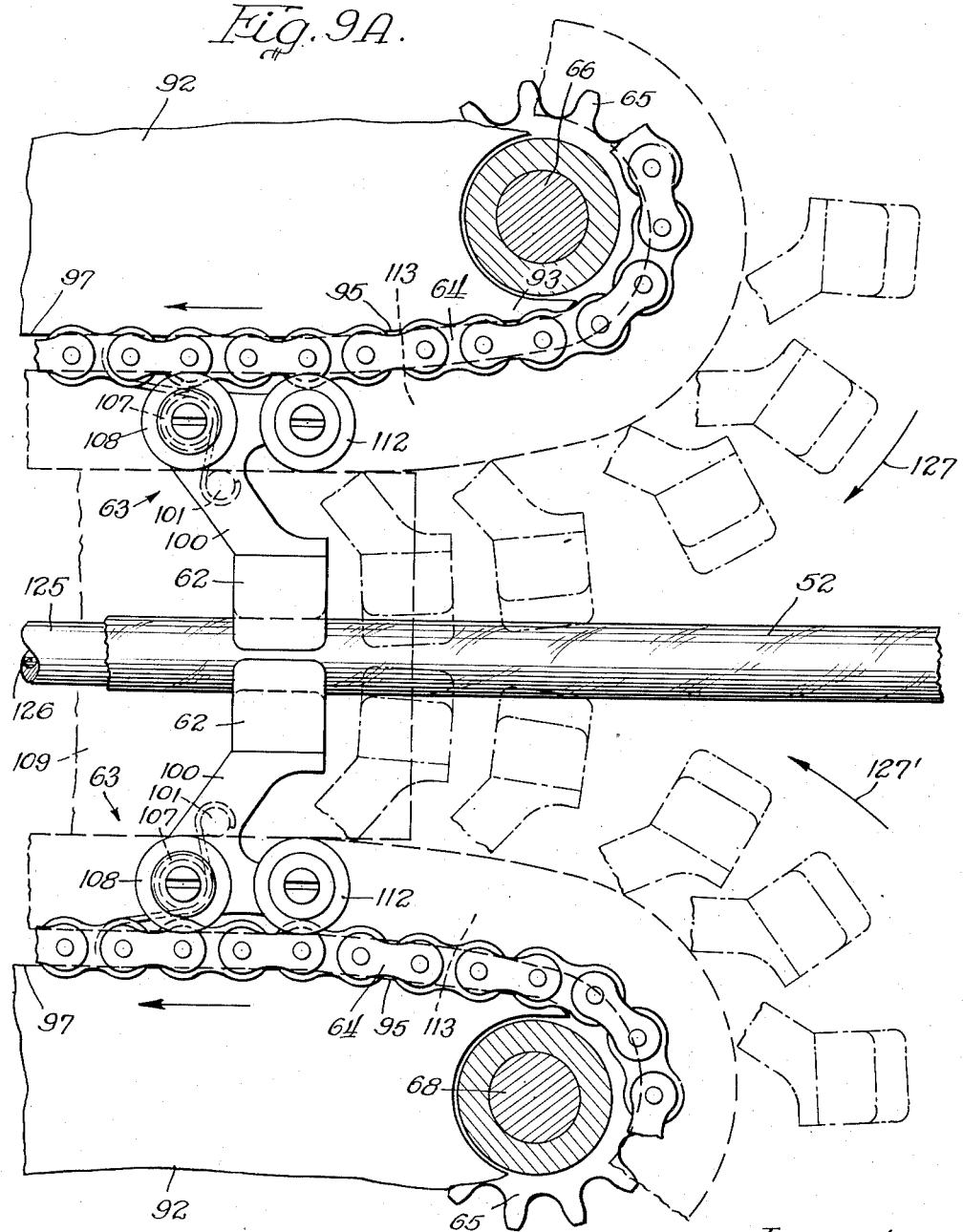

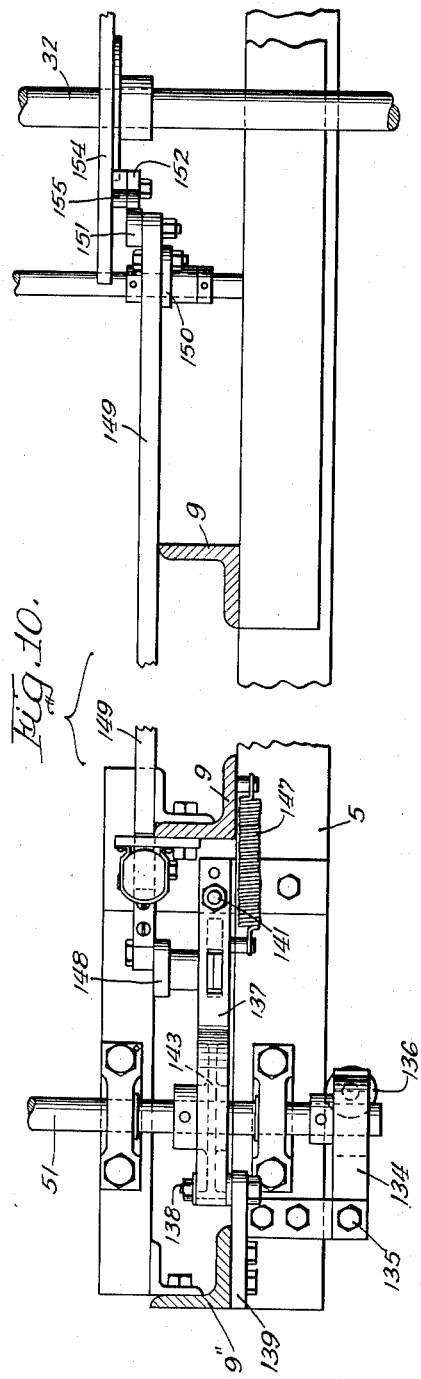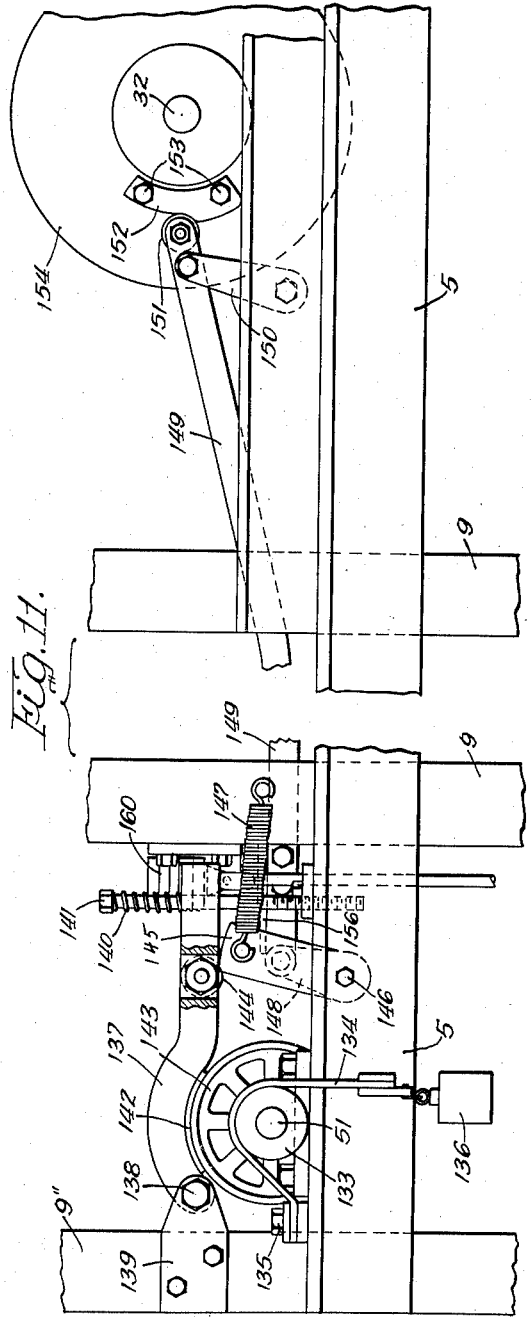

Jan. 29, 1952  P. H. KORSGAARD  2,583,654
AUTOMATIC SHIRRING MACHINE
Filed Dec. 27, 1947  22 Sheets-Sheet 11
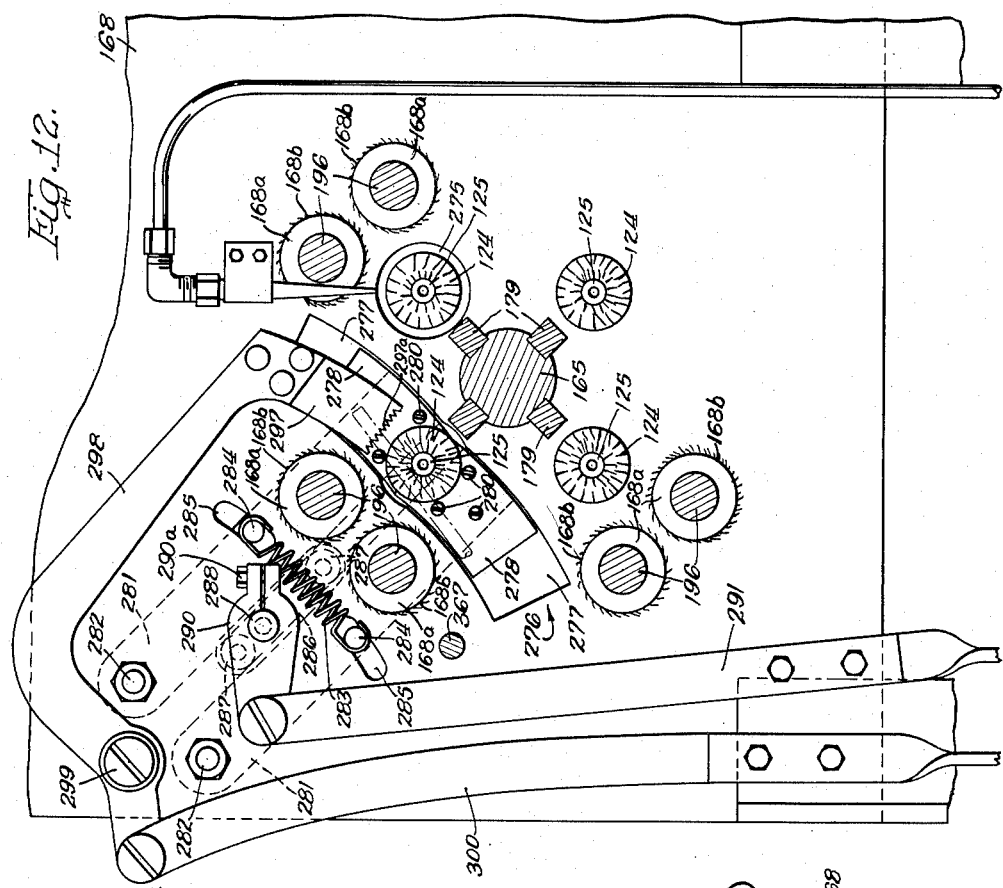
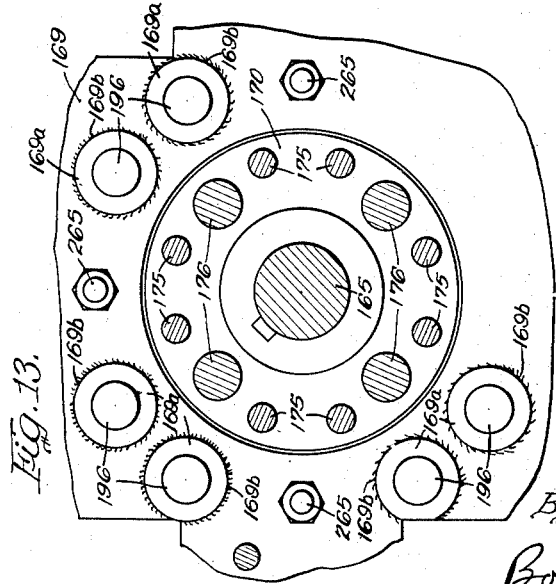
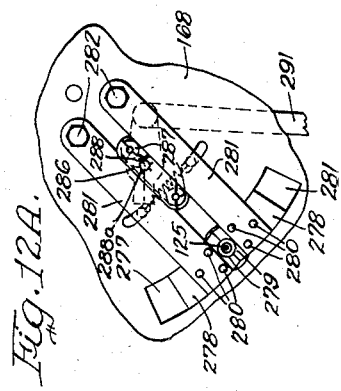
Inventor:
Paul H. Korsgaard.
By Brown, Jackson,
Boettcher & Dienner
Attys.

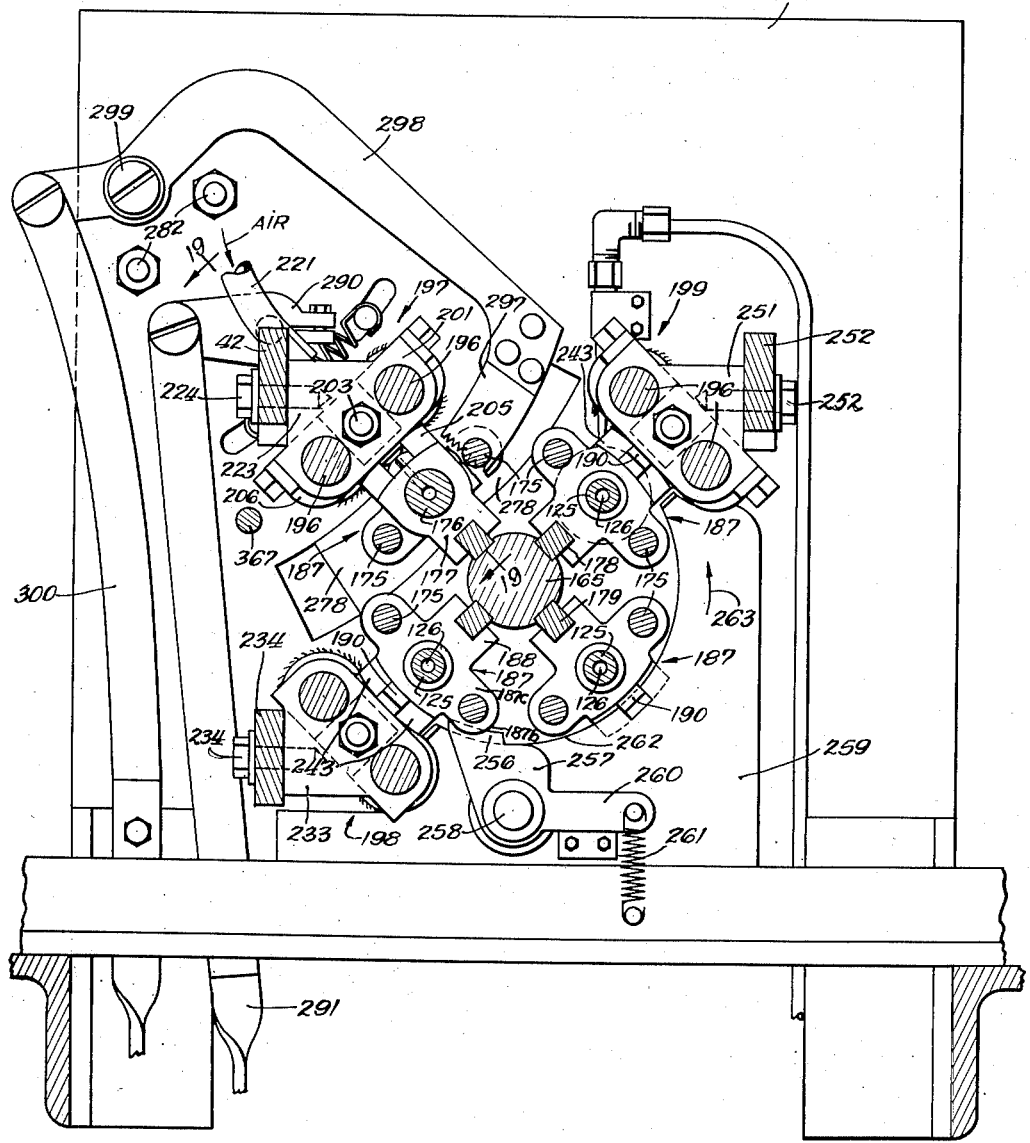

Jan. 29, 1952    P. H. KORSGAARD    2,583,654
AUTOMATIC SHIRRING MACHINE
Filed Dec. 27, 1947    22 Sheets-Sheet 13
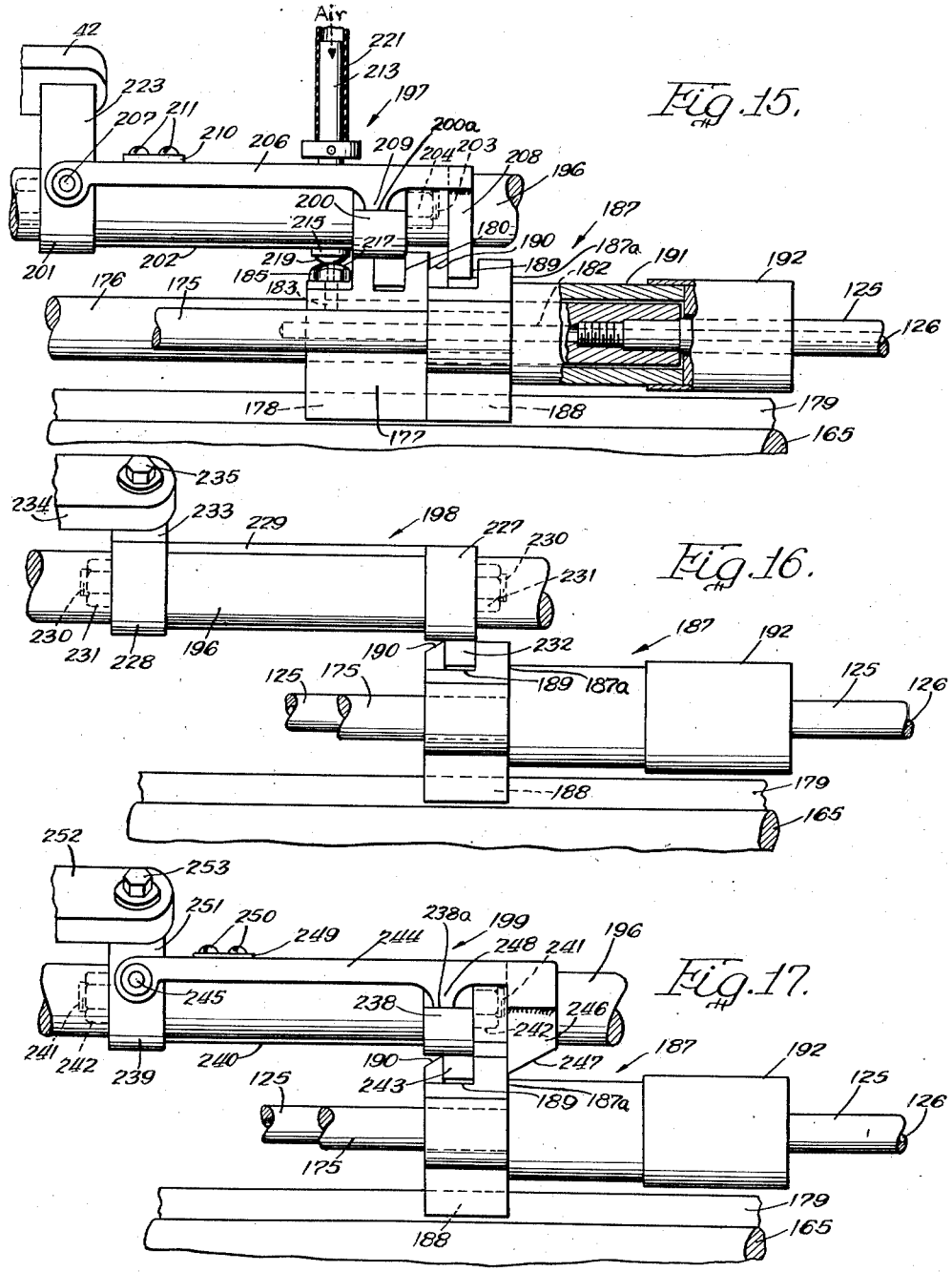
Inventor:
Paul H. Korsgaard.
By Brown, Jackson, Boettcher & Dienner
Attys.

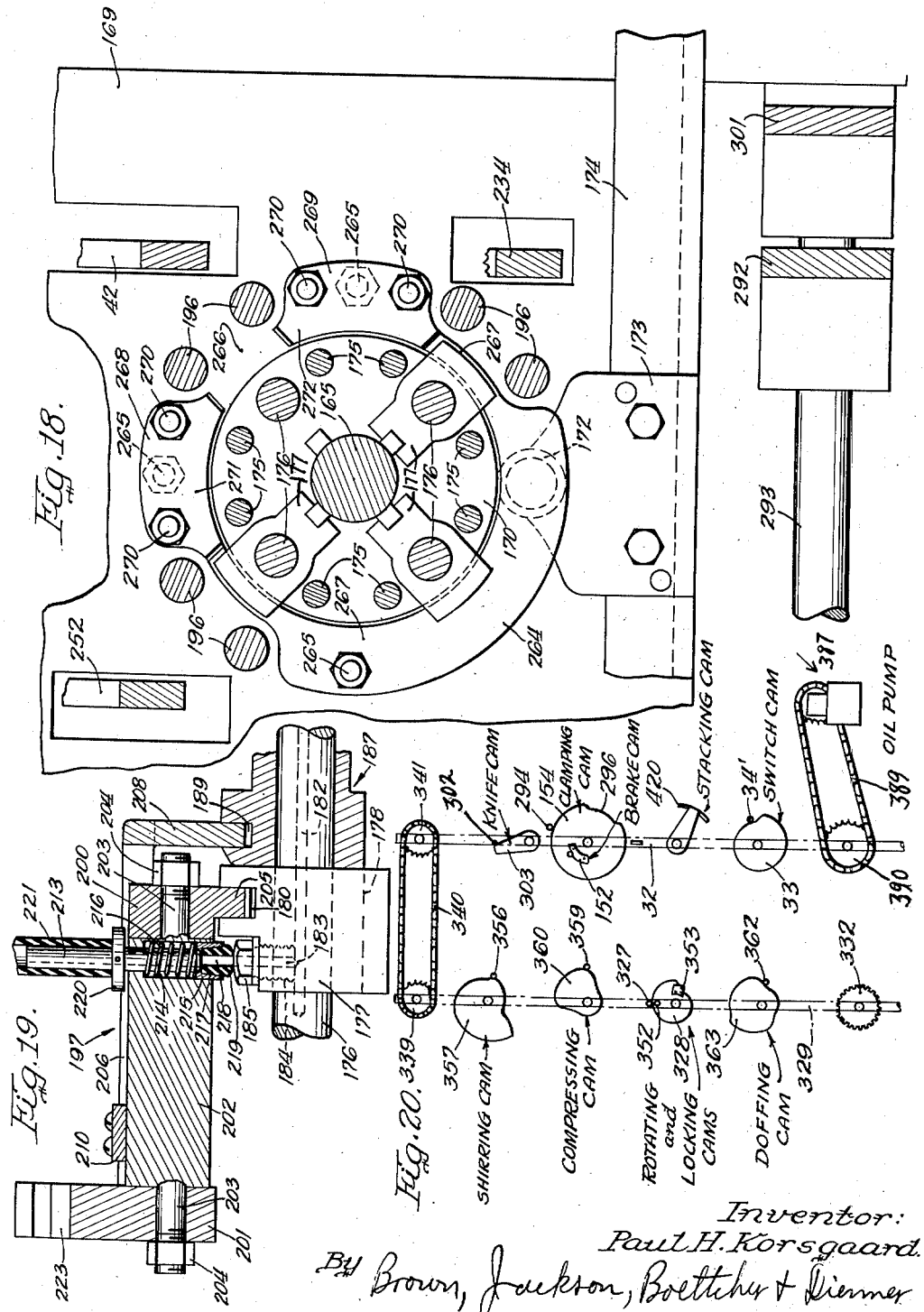

Jan. 29, 1952 P. H. KORSGAARD 2,583,654
AUTOMATIC SHIRRING MACHINE
Filed Dec. 27, 1947 22 Sheets-Sheet 15
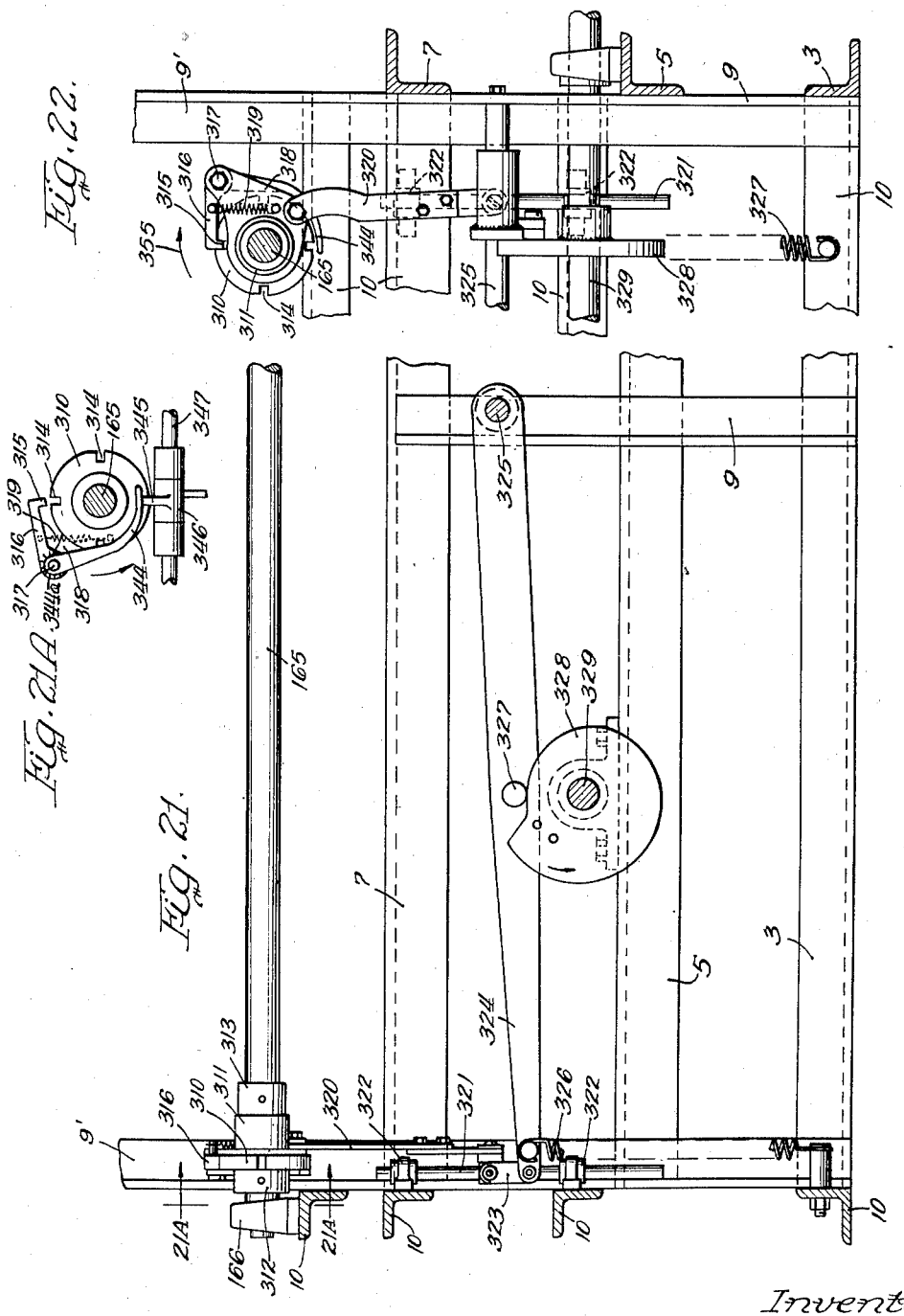
Inventor:
Paul H. Korsgaard
By Brown, Jackson, Boettcher & Dienner
Attys.

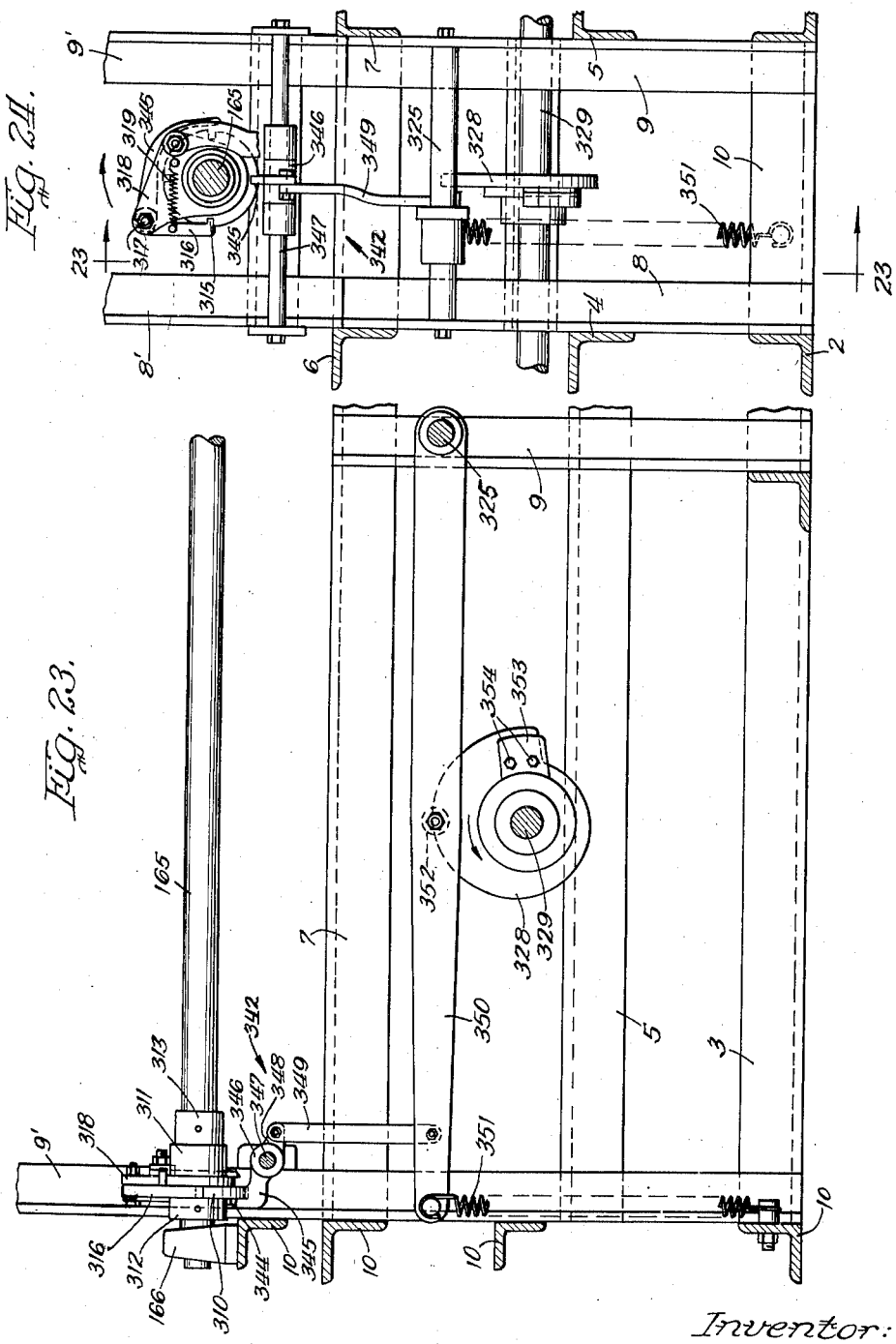

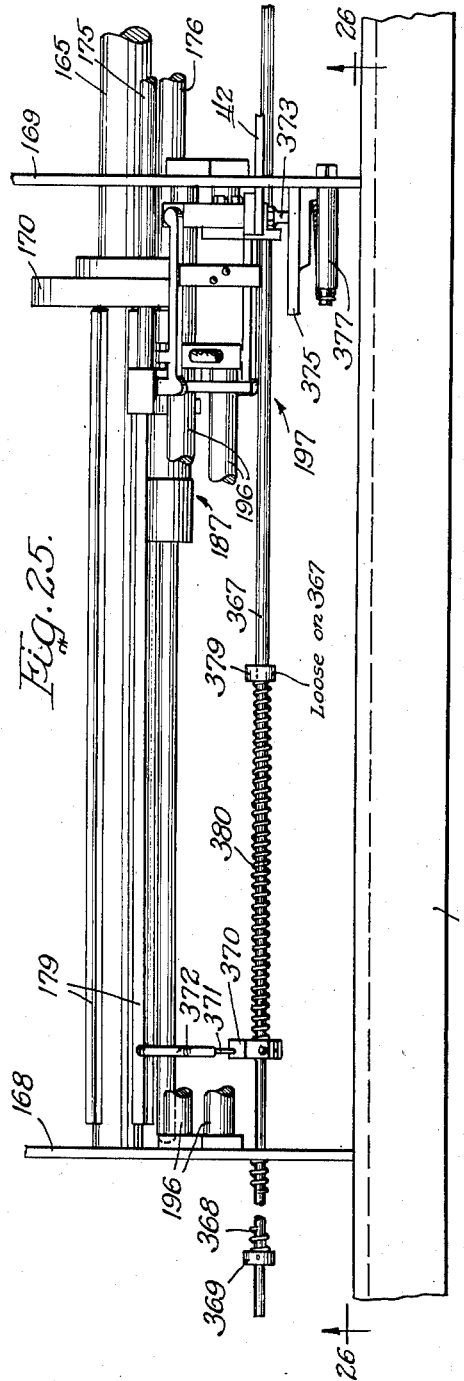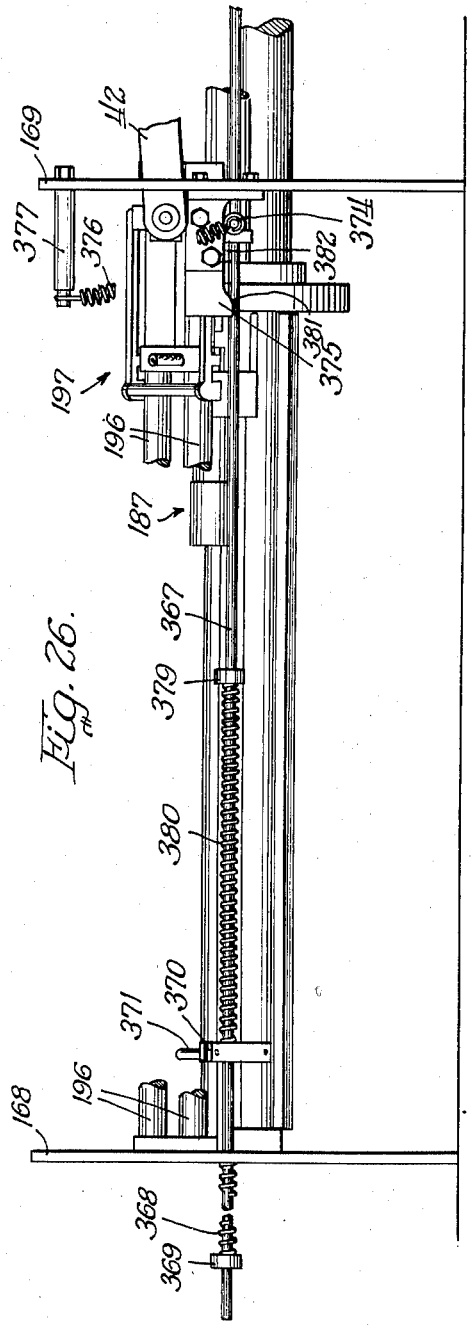

Jan. 29, 1952 P. H. KORSGAARD 2,583,654
AUTOMATIC SHIRRING MACHINE
Filed Dec. 27, 1947 22 Sheets-Sheet 18
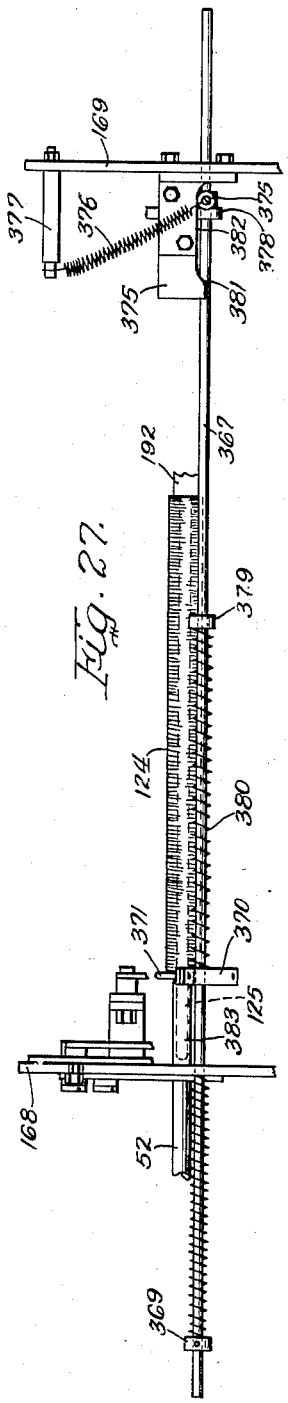
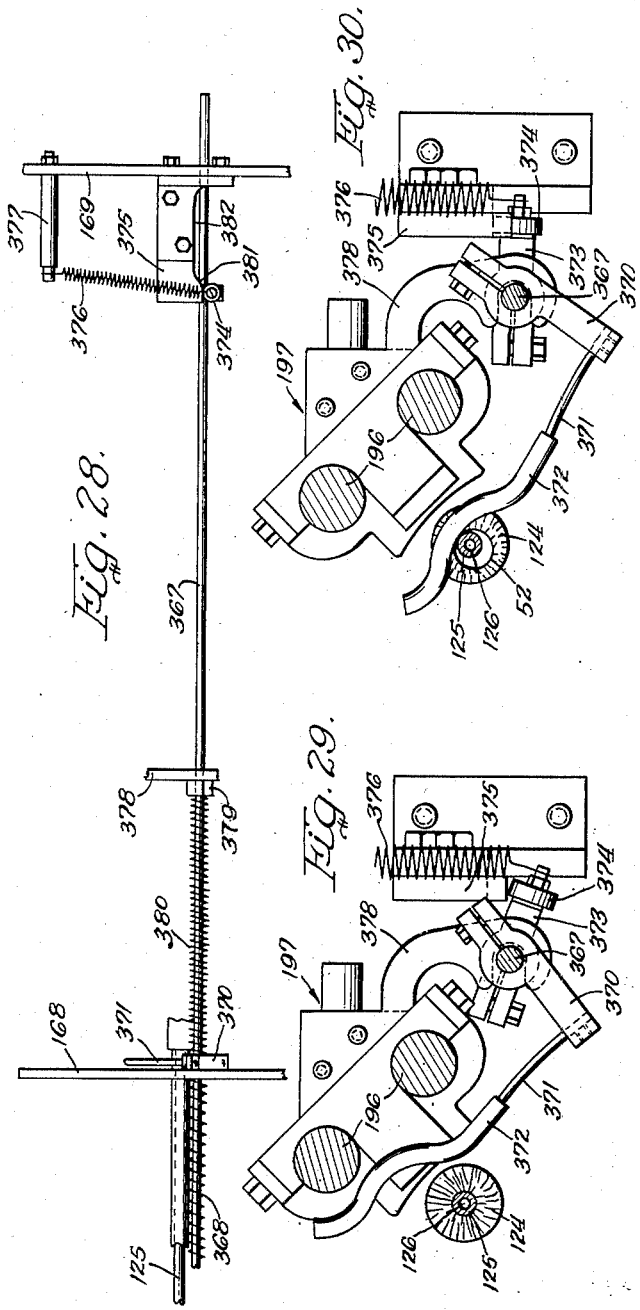
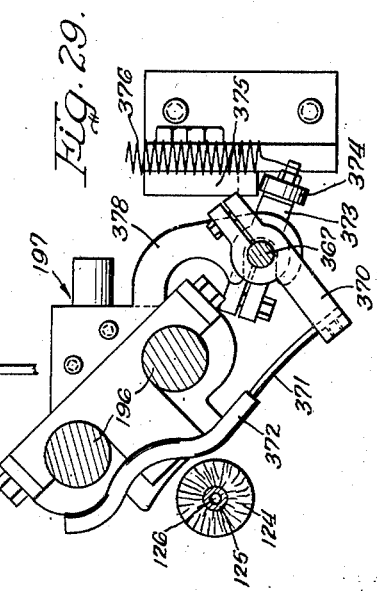
Inventor:
Paul H. Korsgaard.
By Brown, Jackson, Boettcher & Dienner
Attys Jan. 29, 1952     P. H. KORSGAARD     2,583,654
AUTOMATIC SHIRRING MACHINE
Filed Dec. 27, 1947     22 Sheets-Sheet 19
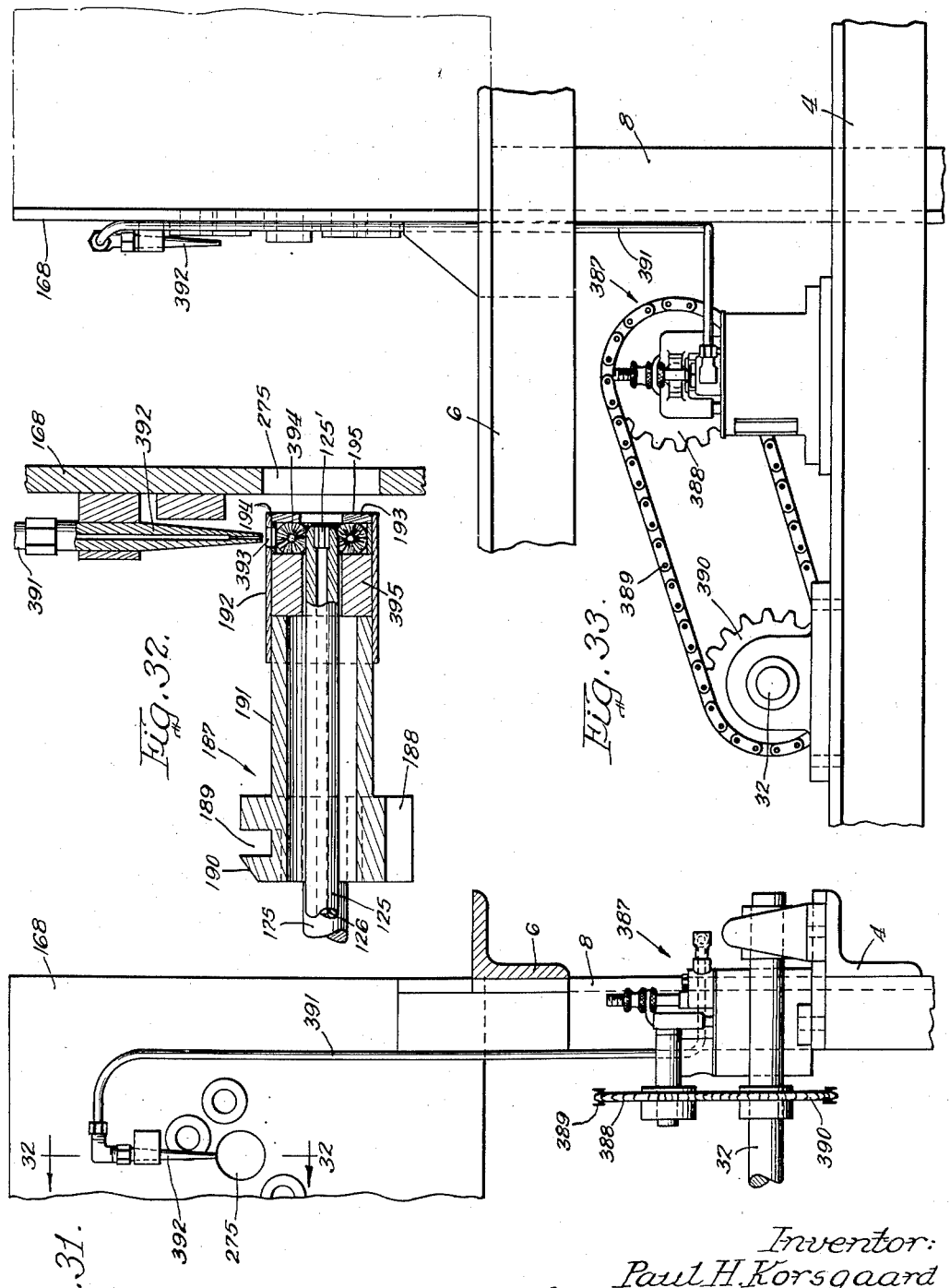
Inventor:
Paul H. Korsgaard
By Brown, Jackson, Boettcher &
Dienner   Attys

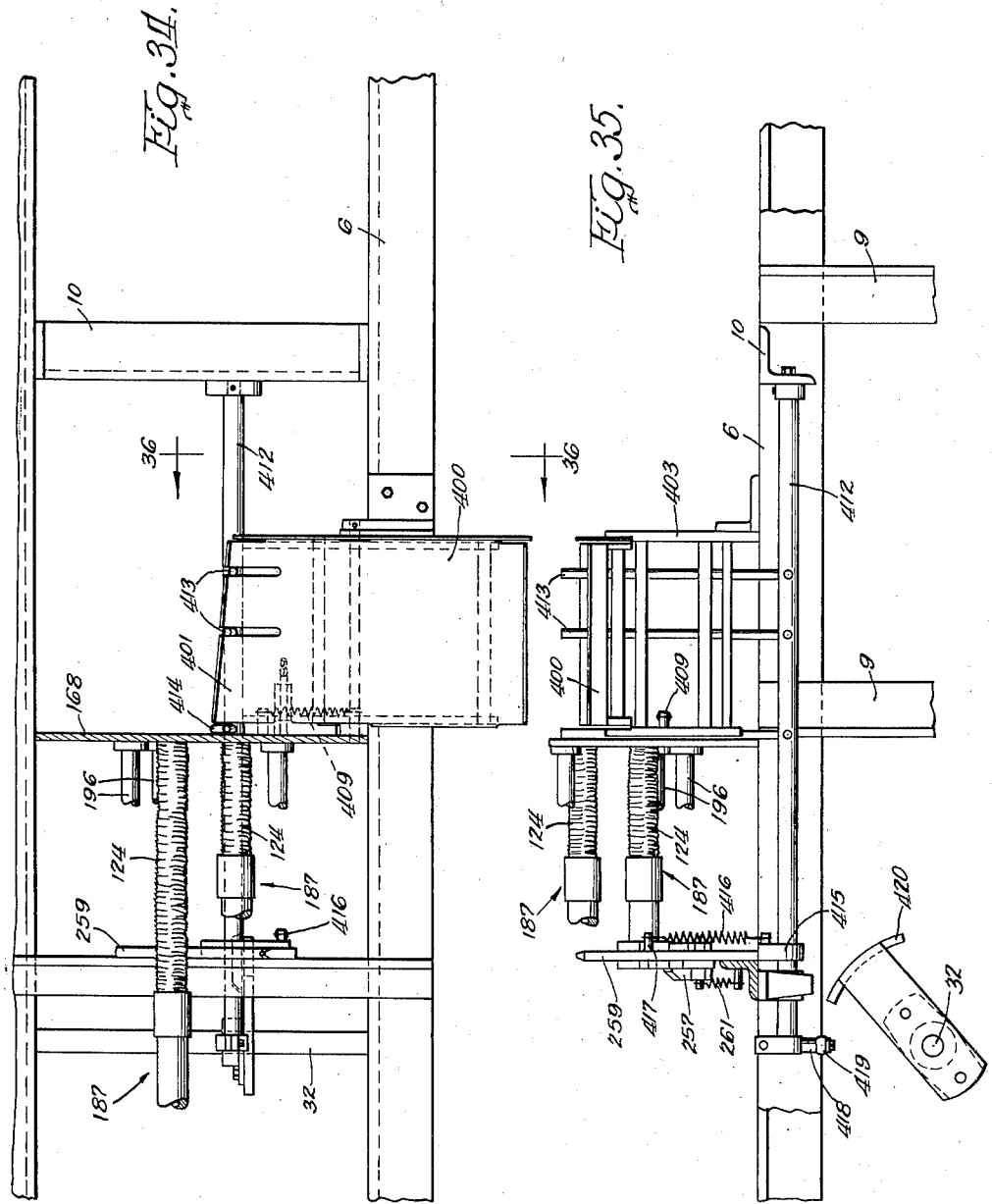

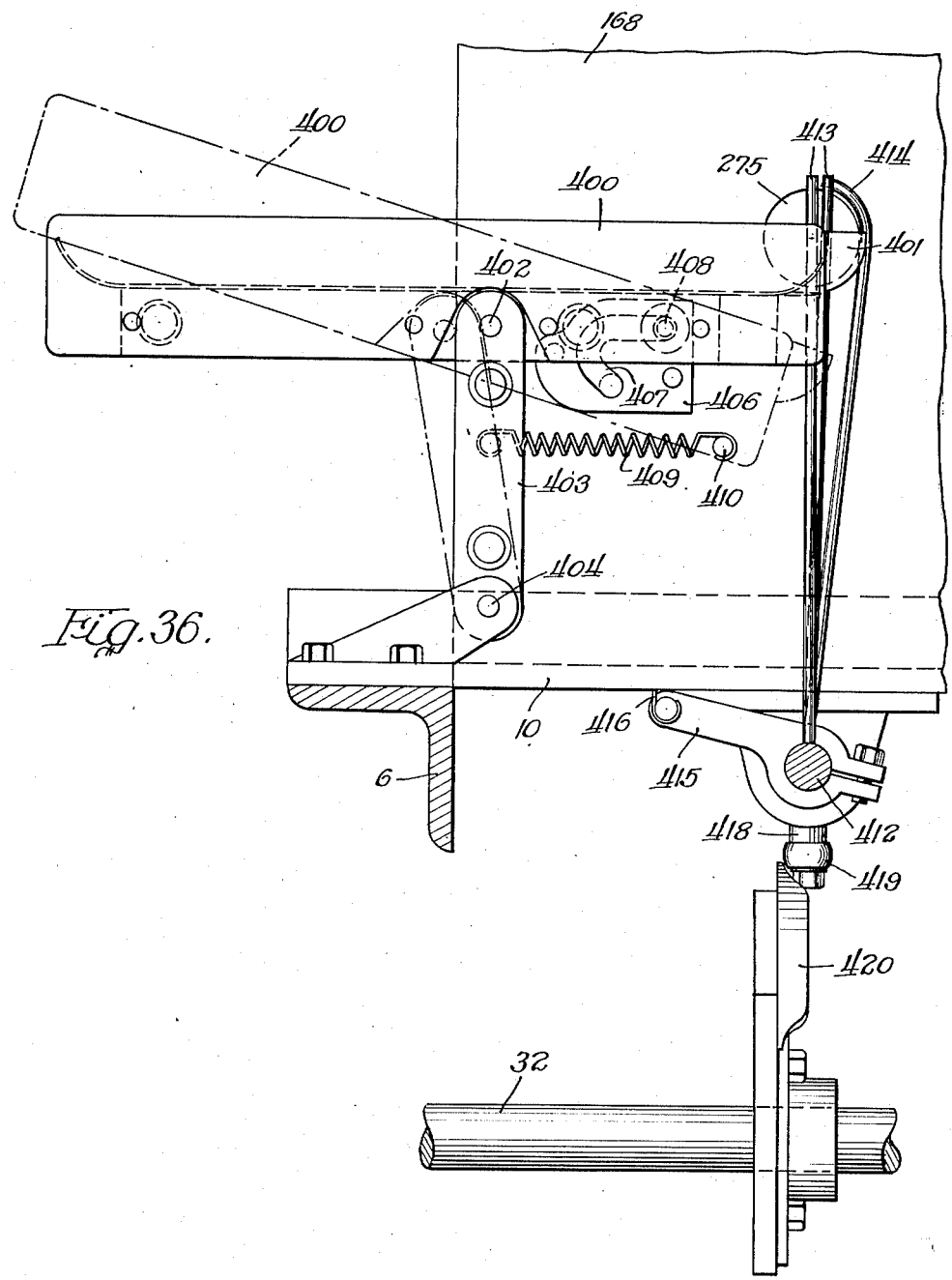

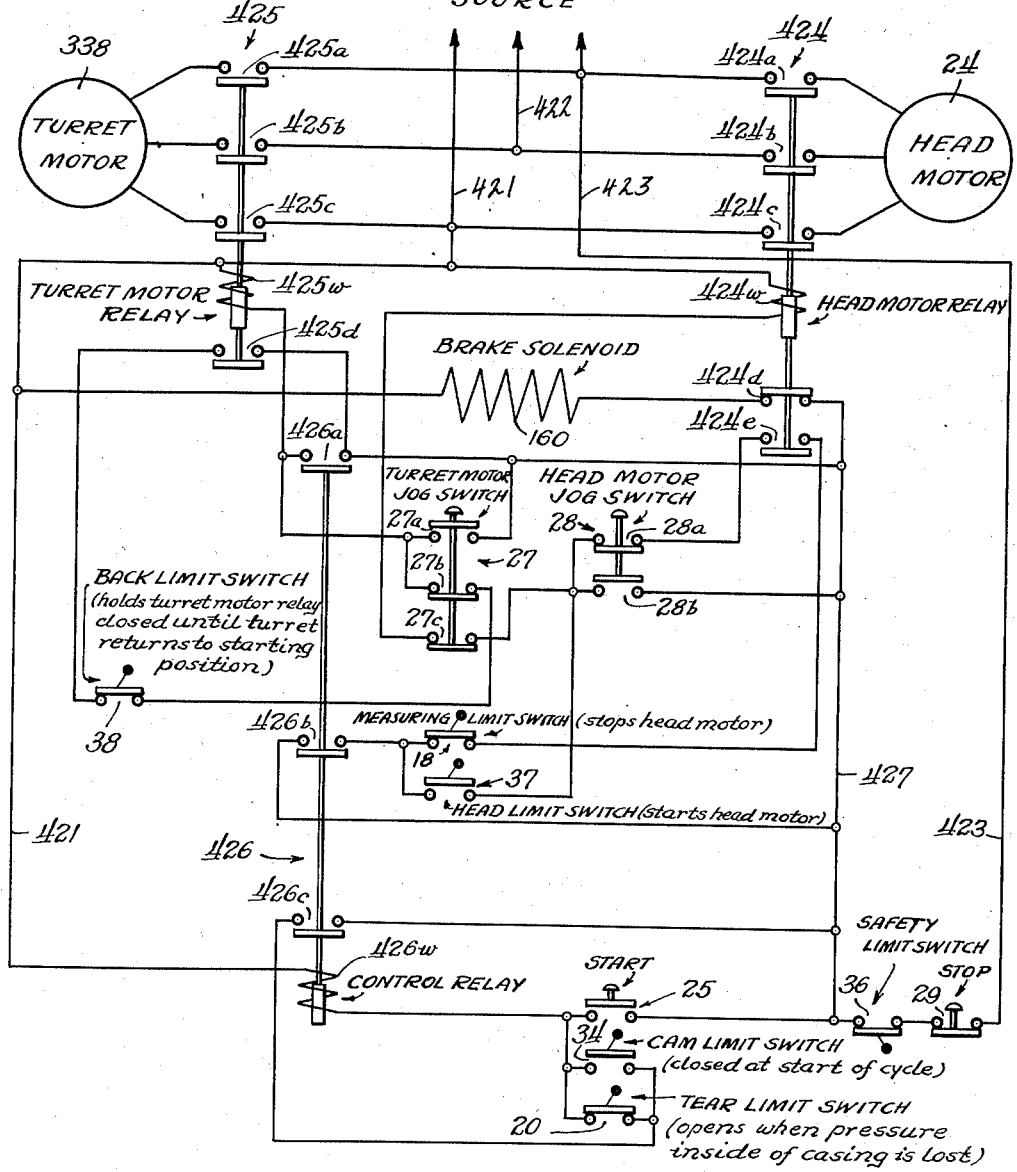

Patented Jan. 29, 1952

2,583,654

UNITED STATES PATENT OFFICE 2,583,654

AUTOMATIC SHIRRING MACHINE

Paul H. Korsgaard, Chicago, Ill., assignor to Transparent Package Company, Chicago, Ill., a corporation of Illinois Application December 27, 1947, Serial No. 794,193

74 Claims. (Cl. 17—1)

My invention relates, generally, to machines for shirring casings, such as sausage casings, and it has particular relation to an automatic machine for accomplishing this purpose.

Sausage casings are formed commonly of regenerated cellulose. On completion of the manufacturing process the casing is wound flat on a reel in lengths of approximately 1800 feet. The flat casing is cut into lengths ranging upwardly to about 40 feet and is shirred in order to permit its being applied to a sausage sutffing horn for filling the same with sausage by a meat packer. It has been the practice in the past to unreel the flat casing and to shirr the required length thereof on a mandrel through which air under pressure flows for inflating the casing during the shirring operation. When the required length of casing has been shirred onto the mandrel, it is severed from the portion on the reel and then is compressed to reduce the shirred length to the required dimension for positioning on the stuffing horn. Thereafter the shirred and compressed casing is removed from the mandrel and is packed in a suitable carton for shipment to the meat packer. After the casing has been compressed, it is desirable that it be held in this condition for a relatively short period in order to permit the casing to acquire a set and thereby reduce the tendency thereof to expand beyond the desired length.

The foregoing operations of shirring, compressing, holding and doffing a sausage casing on and from a mandrel have been accomplished largely by manual operations. In performing these operations various power mechanisms have been employed but the entire operation has been essentially a manually controlled process throughout the various stages.

As a result of the manual effort involved in the shirring of the casings the results have been non-uniform in that the casings have been injured during the shirring operation or subsequent compressing, holding or doffing operations so that, when they are subsequently stuffed by the meat packer, they are likely to tear. The disadvantages of such defective casings are obvious.

Aside from the fact that the manual shirring of casings results in a non-uniform product in many instances, the manual shirring of casings is a tedious and somewhat disagreeable work. It is difficult to obtain and expensive to train the necessary personnel for shirring casings manually and the personnel turnover for such operations is relatively high.

Accordingly, among the objects of my invention are: To provide for shirring casings, such as sausage casings and the like, automatically beginning with the flat casing on a reel and ending with the shirred casing ready for packaging; to shirr the casing on a mandrel that moves in the direction in which the shirring operation takes place; to cut the casing automatically after the required length thereof has been shirred; to hold the casing against the mandrel as it is withdrawn at the end of the shirring operation to provide a tensioned section which can be cut readily; to move the mandrel quickly into a shirring head while the latter is stopped and then to withdraw the mandrel from the shirring head at the speed that the shirring operation is accomplished; to cause air to flow through the mandrel so as to inflate the casing during the shirring operation; to clamp the inflated casing at the end of the shirring operation so as to facilitate severing thereof; to move the mandrel containing a shirred casing transversely of its longitudinal axis and away from the shirring head to permit subsequent compressing, holding and doffing thereof; to move the mandrel sequentially to compressing, holding and doffing positions; to compress the shirred casing on the mandrel in the compressing position; to hold the shirred and compressed casing in the holding position so as to permit the shirred casing to acquire a set; to doff the set casing in the doffing position from the mandrel ready for packaging; to employ four mandrels and to mount the same on a turret whereby they can be successively positioned in the shirring, compressing, holding, and doffing positions; to lock the turret in each one of these positions; to perform simultaneously the shirring, compressing, holding and doffing operations; to lubricate the mandrels with a measured amount of lubricant just prior to the shirring of the casings thereon; to mount the shirring dogs of the shirring head which engage the casing on trucks and to separately guide the trucks and the dogs; to guide the dogs so that they engage the inflated casing substantially without any relative longitudinal movement therewith; to guide the dogs so that they move slightly backwardly away from the casing when they are moved out of engagement therewith; to form the dogs of a material which will have a long life and which will not injure the casing; to guide the trucks and the dogs carried thereby so that, as long as the latter grip the casing, they do so uniformly; to drive the shirring head with a motor and the turret with another motor with the shirring head and turret operating in synchronized relationship; to operate the turret motor continuously and to energize the head motor in accordance with the position of the mandrel in the shirring position and to deenergize the head motor when a predetermined length of casing has been shirred; to deenergize the shirring head in the event that the casing being shirred is accidentally torn; to provide for rendering the tear switch ineffective during the period just prior to the beginning of the shirring operation when the casing normally is deflated; to deenergize the turret motor and the shirring head motor in the event that the casing is torn accidentally but to maintain the turret motor energized until the turret is moved to the next operative position; and to provide a machine which will intermittently shirr casings on mandrels successively presented to the shirring head by the turret as long as the casing remains intact and the machine is supplied with flat casing material to be shirred.

Other objects of my invention will, in part, be obvious and in part appear hereinafter.

My invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of my invention reference can be had to the following detailed description taken together with the accompanying drawings, in which:

Figure 1 is a perspective view of the framework of an automatic shirring machine in which my invention is embodied, the frame being viewed from the front side and front end (this being mentioned here to provide a reference to other views looking from the rear side and toward the rear end);

Figures 2 and 2A, taken together in end to end relation in the order named, provide a view, partly in side elevation and partly in section, of the automatic shirring machine looking from the front side, the shirring dogs and trucks being omitted;

Figures 3 and 3A, taken together in end to end relation in the order named, show a top plan view of the automatic shirring machine illustrated in Figures 2 and 2A;

Figure 4 is a view, in side elevation, of the shirring head and certain of the drive mechanisms associated therewith together with the measuring roll and brake mechanism, the shirring dogs and trucks being omitted;

Figure 5 is a view, in side elevation, of the shirring head shown in Figure 4, the showing in Figure 5 being at an enlarged scale and showing the shirring dogs and trucks;

Figure 6 is a view, in front elevation, of one of the chain guide plates;

Figure 7 is a view, in side elevation, of one of the dog guide plates, the view being taken on the opposite side from that where Figure 5 is taken;

Figure 8 is an end view of the shirring head looking toward the front end of the machine, the main portions of the chains being omitted in order to illustrate more clearly the details of construction;

Figure 1:
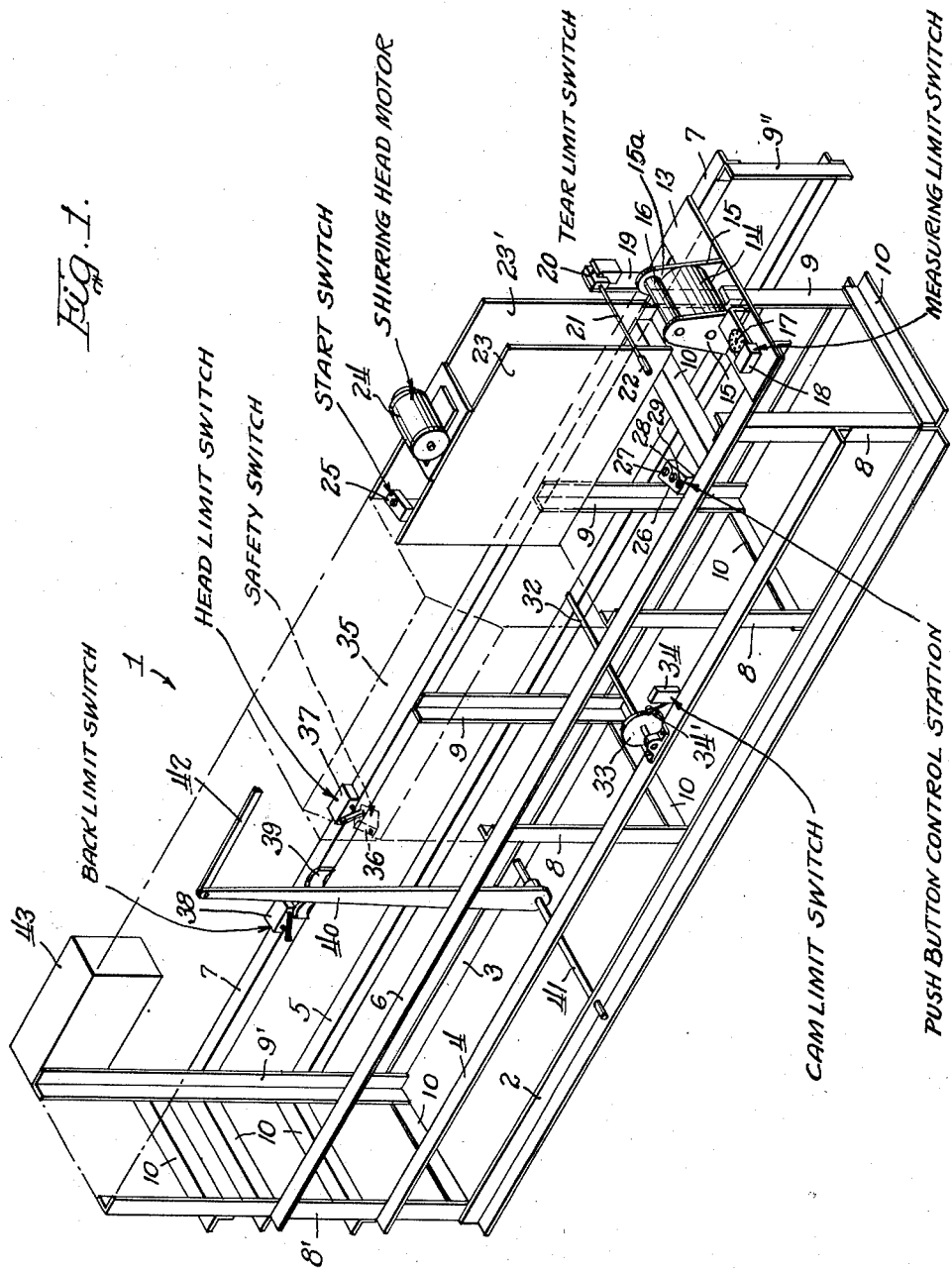

Figures 9 and 9A taken together in side by side relation in the order named, show the manner in which the shirring trucks and shirring dogs are guided to move the latter into and out of proper gripping engagement with the inflated casing for shirring the same without injuring it;

Figure 10 is a top plan view of the brake mechanism, the view being taken looking from the rear side of the machine;

Figure 11 is a view, in side elevation, of the brake mechanism shown in Figure 10, the view being taken from the back of the machine;

Figure 12 is a detail sectional view at an enlarged scale taken along the line 12—12 of Figure 3A;

Figure 12A is a view, in front elevation, taken from the opposite side of the front plate as viewed in Figure 12 to show the details of the clamp mechanism and the cam which operates the same;

Figure 13 is a detail sectional view at an enlarged scale taken along the line 13—13 of Figure 3;

Figure 14 is a detail sectional view at an enlarged scale taken along the line 14—14 of Figure 3;

Figure 15 is a view, in side elevation, looking from the front side of the machine of the shirring slide in operative position with respect to the mandrel yoke and compressor-doffer unit;

Figure 16 is a view in side elevation looking downwardly from the front side of the machine and showing the compressing slide and its operative relation to the compressor-doffer unit;

Figure 17 is a view in side elevation looking upwardly from the front side of the machine and showing the doffing slide in operative relation to a compressor-doffer unit;

Figure 18 is a detail sectional view at an enlarged scale taken along the line 18—18 of Figure 3;

Figure 19 is a detail sectional view taken along the line 19—19 of Figure 14;

Figure 20 illustrates somewhat diagrammatically the relationship between the cams on the main and auxiliary cam shafts, the manner in which they are driven and the driving connection to the oil pump;

Figure 21 is a partial longitudinal sectional view taken looking from the front side of the machine and showing certain of the details of construction of the turret rotating mechanism:

Figure 21A is a detail sectional view taken along the line 21A—21A of Figure 21;

Figure 22 is an end view of the mechanism shown in Figure 21, certain parts being shown in section;

Figure 23 is a view, similar to Figure 21, but showing in addition the mechanism for unlocking the turret to permit the same to be advanced by the turret rotating mechanism and is taken along the line 23—23 of Figure 24;

Figure 24 is an end view of the mechanism shown in Figure 23, certain parts being shown in section;

Figure 25 is a top plan view taken looking from the rear side of the machine showing the whisker and operating mechanism therefor;

Figure 26 is a view in side elevation of the whisker mechanism shown in Figure 25 and is taken looking from the rear side of the machine;

Figures 27 and 28 are views, similar to Figure 26, which show the whisker in different operating positions;

Figure 29 is a view, partly in end elevation and partly in section, looking toward the rear end of the machine, and showing the whisker positioned out of engagement with the casing;

Figure 30 is a view, similar to Figure 29 but showing the whisker in engagement with the casing and holding the same against the mandrel to provide the desired tensioned section extending from the clamping means to facilitate cutting of the casing at this section;

Figure 31 is a view in side elevation looking toward the front end of the machine and showing the mandrel lubricating mechanism;

Figure 32 is a longitudinal sectional view through one of the compressor-doffer units and showing how the mandrel which moves therethrough is lubricated;

Figure 33 is a view in side elevation of the lubricating apparatus shown in Figure 31, the view being taken from the front side of the machine;

Figure 34 is a top plan view of the stacking tray and parts of the machine associated therewith, the view being taken from the front side of the machine;

Figure 35 is a view, in side elevation, of the mechanism shown in Figure 34;

Figure 36 is a detail sectional view at an enlarged scale taken along the line 36—36 of Figure 34; and Figure 37 illustrates diagrammatically the circuits which can be employed in controlling the automatic shirring machine shown in the preceding figures of the drawings.

Referring now particularly to Figure 1 it will be observed that the reference character 1 designates, generally, an angle iron welded frame on which the various moving parts of my automatic shirring machine can be mounted. The frame 1 includes a bottom longitudinal angle 2 along the front side and a corresponding angle 3 along the rear side. There are intermediate angles 4 and 5 along the front and rear sides respectively and also top longitudinal angles 6 and 7 along the front and rear sides respectively. The angles 2, 4 and 6 are held in vertical spaced relation by front upright angles 8 and 8' while the rear angles 3, 5 and 7 are similarly held by upright angles 9 and 9'. Transverse angles 10 extend between the front and rear sides for holding the same in proper spaced relation. It will be understood that the various angles are welded together to provide a rigid frame.

At the front end of the machine a plate 13 is welded to the extending ends of the top angles 6 and 7 for carrying a measuring roll 14 that is rotatably mounted between support plates 15 and 15a that may be welded to the plate 13. A squeeze roll 16 cooperates with the measuring roll 14 to hold the flat casing against the same without slippage. As will appear hereinafter, the measuring roll 14 is arranged to drive a metering disc 17 for the purpose of measuring the length of casing that has passed over the measuring roll 14. The metering disc 17 controls the operation of a measuring limit switch 18 which, as will be described in more detail hereinafter, serves to stop the shirring operation when the required length of casing has been shirred.

It will be noted that a mounting plate 19 extends upwardly from the top angle 7 near the front end and rear side of the machine and that it carries at its upper end a tear limit switch 20 from which an arm 21 extends that carries a roller 22. The roller 22 is arranged to engage the upper surface of the inflated casing and is held thereby in the uppermost position as long as the casing is inflated. In this position the tear limit switch 20 is closed to complete a circuit which is opened in the event that the casing becomes deflated as when it is torn accidentally or is deflated when the casing is intentionally severed on completion of the shirring operation.

Near the front end of the machine and adjacent the rear side are shirring head side plates 23 and 23' between which certain of the mechanism for driving the shirring head is located. A shirring head motor 24 is carried by the shirring head side plates 23 and 23' and it is suitably connected to the shirring head 48 and certain additional mechanism which will be described in more detail hereinafter.

Also mounted on top of the shirring head side plates 23 and 23' is a start switch 25. The start switch 25 preferably is located in this somewhat inconvenient location in order to reduce the likelihood of its being accidentally operated by the operator who normally stands in front of the front side of the machine near the front end.

Adjacent the operator's position there is located a push button control station 26 which includes three switch mechanisms. These will be described in detail hereinafter. For the present it is pointed out that the push button control station 26 includes a turret motor jog switch 27, a head motor jog switch 28 and a stop switch 29. The jog switches 27 and 28 are provided to permit the operator to jog the turret and the head independently for adjusting and threading the machine. The stop switch 29 is employed, as the name indicates, to stop the machine at the will of the operator.

It will be observed that an auxiliary cam shaft 32 extends between the intermediate angles 4 and 5 and that it carries a switch cam 33 which is arranged to engage a cam follower 34' to control the functioning of a cam limit switch 34. The cam limit switch 34 is connected in shunt with the tear limit switch 20 and is provided to close the circuit opened thereby when the casing is severed at the end of the shirring operation.

It will be understood that the frame 1 is completely enclosed for safety reasons to prevent injury to personnel operating the machine or coming in contact therewith. It is necessary for the operator to open the casing in order to adjust the machine or to thread it for starting the shirring operation. For this purpose a cover 35 is employed which is shown in outline only by broken lines. The cover 35 is arranged to cooperate with a safety switch 36 that is held closed when the cover 35 is closed and is opened when the cover 35 is opened. The safety switch 36 is connected in series with the stop switch 29 and functions in the same manner so that it is not possible for the operator to open the cover 35 unless at the same time the machine is automatically stopped.

Located on the top longitudinal angle 7 is a head limit switch 37 which, when closed, serves to energize the shirring head motor 24 for initiating the operation of the shirring head. Also located on the angle 7 is a back limit switch 38 which, as will appear hereinafter, is arranged to maintain the turret motor in operation until the turret is operated to the next position. The limit switches 37 and 38 may be operated by a shoe 39 which is carried by a shirring lever 40 that is rockably mounted on a shaft 41 which extends through the bottom angles 2 and 3. A shirring arm 42 is attached to the upper end of the shirring lever 40 and extends to the shirring slide which will be described later on.

A relay cabinet 43 may be mounted on the rear side of the frame near the rear end, as shown, for containing the motor and control relays which are employed for controlling the functioning of the turret motor, to be described hereinafter, and the head motor 24.

Referring now particularly to Figures 2A and 3A, it will be observed that the reference character 48 designates, generally, a shirring head which is arranged to shirr a casing 49 that is unwound from a reel 50 that is carried by a rotatable shaft 51. A suitable brake mechanism, to be described hereinafter, is arranged to cooperate with the shaft 51 for controlling the unreeling movement of the reel 50 so as to maintain the desired tension in the casing 49 as it passes over the measuring roll 14. It will be noted that the casing 49 is flat as it is unwound from the reel 50. After it passes between the measuring roll 14 and the squeeze roll 16 it is inflated as indicated at 52 by air under pressure in a manner to be described. The squeeze roll 16 may be controlled by a handle 53. Suitable tension means (not shown) may be provided for urging the squeeze roll 16 toward the measuring roll 14 so as to prevent any slippage therebetween. It will be noted that the inflated casing 52 passes underneath the roller 22 which controls the tear limit switch 20 and above a cooperating roller 54 which is carried by a rod 55 that, in turn, is supported by an arm 56 that extends from one of the support plates 15. The roller 54 serves to limit the downward movement of the inflated casing 52. The inflated casing 52 may be centered by a pair of guide rollers 57 that are carried by vertically extending roller supports 58 mounted at the outer ends of arms 59 which are supported by the plate 13.

The inflated casing 52 extends through the shirring head 48. It is arranged to be gripped in semi-circular openings 61, Figure 8, of shirring dogs 62 that, preferably, are formed of a material, such as a phenolic condensation product, which is wear resisting and also has the characteristic of cooperating with the surface of the inflated casing 52 so as not to injure the same. Other similar plastic materials can be used for this purpose.

The shirring dogs 62 are carried by trucks 63 which will be described in more detail hereinafter. The trucks 63 are carried by upper and lower chains 64 which run on opposite sides of the inflated casing 52 and also on opposite sides of a mandrel onto which the casing 52 is to be shirred as will be described later. As shown in Figure 3A each of the chains 64 comprises three sections, i. e. sections 64a, 64b and 64c. These sections are joined together to operate as a unit and their directions of movement are reversed by sprockets 65 which, as shown in Figure 8, are arranged to cooperate only with the outer chain sections 64a and 64c. A sprocket for cooperating with the intermediate chain section 64b is omitted for reasons which will be apparent presently. It will be noted that there are eight shirring dogs 62 and eight trucks 63 mounted on each of the chains 64. If desired, a greater or lesser number of dogs 62 and trucks 63 can be employed.

The four sprockets 65 which serve to reverse the direction of movement of the chains 64 are mounted for rotation with the shafts 66, 67, 68 and 69 which are rotatably mounted on the shirring head side plates 23 and 23'.

It will be observed that the shaft 66 carries a pulley 70 which is driven by a belt 71 from the shirring head motor 24. The shaft 66 also carries a gear wheel 72 which meshes with a gear wheel 73 that is fast on the shaft 69. In this manner the shirring motor 24 drives the chains 64 and 65.

As shown more clearly in Figure 4 and Figure 8 the shaft 68 has a sprocket 74 secured thereto. A chain 75 is trained over the sprocket 74 and over a sprocket 76 which acts to drive a variable speed device 77 of well known construction which may be adjusted to vary precisely the speed of rotation of a sprocket 78. The sprocket 78 drives through a chain 79 to a sprocket 80 which is fast on the same shaft as the measuring roll 14 and thus drives the same to withdraw the flat casing 49 from the reel 50 at the exact speed which is required for satisfactory operation of the shirring head 48. The tension of the chain 79 may be adjusted by a movably mounted idler sprocket 81, Figure 4. The gear reduction provided by the variable speed device 77 may be adjusted by a hand wheel 82. The tension of the chain 75 may be adjusted by an idler sprocket 83 which may be mounted on a rockable idler bracket 84.

Referring now particularly to Figures 5 and 8 of the drawings, it will be noted that the chains 64 are trained over idler sprockets 87 and 87a each of which comprises three sprockets for cooperating with each of the sections of the chain 64. The idler sprockets 87 are rotatably mounted on idler brackets 88 and 88a which are pivoted by cap screws 89 and 89a on the shirring head side plate 23. Each of the brackets 88 and 88a has a slot 90 and 90a for limited movement relative to a clamp bolt 91 and 91a. It will be understood that the construction just described permits assembly and disassembly of the chains 64 and adjustment of their tension as a result of wear.

The intermediate chain section 64b is guided along the casing 52 by a chain guide plate 92 one of which is shown in elevation in Figure 6. The ends 93 and 94 of the chain guide plates 92 and 92a are bifurcated so that they extend beyond the rotational axes of the sprockets 65. It will be understood that the chain guide plate 92 shown in Figure 6 is associated with the upper chain 64 and that the view is taken so that the end 93 is that which is associated with the shaft 66 while the end 94 is associated with the shaft 67. These ends 93 and 94 project into the space between the sprockets 65 which otherwise would be occupied by a center sprocket such as that employed for the idler sprockets 87. The end surfaces 95 and 96 of the chain guide plate 92 are so shaped as to guide the trucks 63 and thereby the shirring dogs 62 along predetermined paths relative to the pitch circles of the sprockets 65 so as to grip the inflated casing 52 without any abrasive action. The end surfaces 95 and 96 are shaped so as to guide the intermediate chain section 64b to and from the intermediate surface 97 of the chain guide plate 92 that parallels the upper and lower surfaces of the inflated casing 52. Thus, as any given link of the intermediate chain section 64b passes on to the end surface 95 and the corresponding links in the outer chain sections 64a and 64c leave the sprocket 65, there is no sudden inward movement of the chain and corresponding movement of the truck 63 and shirring dog 62 carried thereby. This assures that there is a smooth transition of the shirring dogs 62 into gripping engagement with the inflated casing 52. In like manner as a given link of the intermediate chain section 64b moves off of the intermediate surface 97 of the chain guide plate 92 over the end surface 96, the transition to a position where the corresponding links of the outer chain sections 64a and 64c will be picked up by the sprockets 65 is smooth and the shirring dogs 62 can be swung away from the inflated casing 52 without injury to the same as will be described in more detail hereinafter.

In Figure 8 of the drawings the details of construction of the trucks 63 are shown more clearly. Reference also may be had to Figure 5. It will be noted that each of the trucks 63 includes a pair of L-shaped truck side frames 100 which may be interconnected by a tie bar 101 extending between the same. The side frames 100 are rockably mounted on a truck shaft 102 which is secured by clips 103 to the ends of a shaft 64' which extends through corresponding links of each of the chain sections 64a, 64b and 64c. The clips 103 may be secured to the truck shaft 102 by screws 104. A plate 105 is secured to the truck side frames 100 and provides a flat surface for receiving the shirring dog 62 which is secured thereto by suitable screws 106. A coil spring 107 has its central portion wound around the truck shaft 102 and one end bears against an adjacent portion of the chain between the chain sections 64b and 64c while the other end engages the tie bar 101 and thus serves to bias the shirring dog 62 backwardly toward the chain 64 as viewed in Figure 5 and away from the inflated casing 52.

At the ends of the truck shaft 102 truck rollers 108 are provided which are arranged to engage the upper and lower edges of roller guide plates 109 and 110 which are positioned alongside of the inflated casing 52 as it passes through the shirring head 48. The plates 109 and 110 are held in proper spaced relation in a manner to be described presently.

One of the side frames 100 of each of the trucks 63 is provided with an arm 111. This is shown more clearly in Figure 3A. Each arm 111 carries a dog guide roller 112 which is arranged to follow slots 113 and 114 in a dog guide plate 115 that is shown in Figure 7. It will be recalled that Figure 7 is shown looking outwardly from the shirring head 48 as it is viewed in Figure 5 so that, in reality, the slot 113 is at the right hand end of the plate 115 as it is viewed in Figure 5. The slots 113 and 114 are provided for guiding the shirring dogs 62 into and out of gripping engagement with the outer surface of the inflated casing 52 in a manner that will be described with reference to Figures 9 and 9A.

The dog guide plates 115 are held in spaced relation with respect to the shirring head side plate 23 by bolts 116, Figure 8, and spacers 117. Straps 118 extend between the guide plates 115 and are suitably secured thereto. The roller guide plate 110 is secured in spaced relation to the straps 118 by bolts 119 and spacers 120. The other roller guide plate 109 is held in spaced relation with respect to the shirring head side plate 23 by bolts 121 and spacers 122.

Now it will be apparent that the trucks 63, which are fastened to the chains 64 in uniform spaced relation are guided partly by the chain guide plate 92 and partly by the roller guide plates 109 and 110. The shirring dogs 62, while they are carried by the trucks 63, are rockably mounted thereon and their positions are controlled by the slots 113 and 114 with which the dog guide rollers 112 cooperate. Guide plates 123, carried by the dog guide plates 115 serve to engage the dog guide rollers 112 so as to direct them into register with the entrance to the slot 113 after they leave the idler sprocket 87.

The manner in which the shirring dogs 62 grip the inflated casing 52 for shirring the same is important. With a view to demonstrating more clearly just how this is accomplished in accordance with my invention reference now may be had to Figures 9 and 9A of the drawings which, for convenience, can be placed in side by side relation. The views in these drawings are taken immediately behind the dog guide plates 115 but the guide slots 113 and 114 therein are shown by broken lines in order to illustrate the manner in which the dog guide rollers 112 serve to direct the movement of the shirring dogs 62 into gripping relationship with the inflated casing 52 and also out of this gripping engagement as the shirring operation is completed.

It will be observed that the shirred portion of the casing is indicated at 124 and that it is shirred onto the mandrel 125 which has a central longitudinal aperture 126 through which air under pressure of the order of two and one half pounds per square inch flows to inflate the casing 52 as it is drawn between the measuring roll 14 and the squeeze roll 16, shown, for example, in Figure 3A.

In Figures 9 and 9A the successive positions of one shirring dog 62 for each of the shirring chains 64 is shown, the illustrations being by broken lines and close together to indicate successive positions of the same shirring dog 62. As the shirring dogs 62 are moved by their trucks 63 around the right hand sprockets 65, the outer edges of the shirring dogs 62 are swung rapidly in the direction indicated by the arrows 127 and 127'. Just prior to coming into gripping engagement with the inflated casing 52 the shirring dogs 62 are traveling at a higher speed than the casing 52 is being shirred onto the mandrel 125. In order that there be no relative movement between the shirring dogs 62 and the outer surface of the inflated casing 52, the trucks 63 and shirring dogs 62 are so guided that the latter move at the same speed that the casing 52 is shirred just prior to coming into gripping engagement therewith. This is accomplished in part by the inclined surfaces 95 on the under and upper sides of the upper and lower chain guide plates 92. It will be recalled that these inclined surfaces 95 cooperate with the intermediate chain section 64b to cause a uniform transition in the movement of the trucks 63 from the right hand sprockets 65 onto the intermediate surfaces 97 of the chain guide plates 92. The movement of the shirring dogs 62 also is controlled by the dog guide roller 112 following the associated slot 113 in the corresponding dog guide plate 115. The dog guide rollers 112 cause the shirring dogs 62 to rotate about the axis of the truck shafts 102 into the clamping position while the trucks 63 and the shirring dogs 62 are moved bodily by the inclined end surfaces 95 into the desired gripping engagement. As a result, just prior to the time when the inflated casing 52 is engaged by the shirring dogs 62 they are moving at exactly the same speed that the casing 52 is moved forwardly along the mandrel 125. Thus when a pair of shirring dogs 62 grips the inflated casing 52, they do so without there being any relative longitudinal movement. This is of a great importance particularly when it is recalled that the casing 52 is relatively fragile and can be torn or, if scratched, may become weakened so that it will tear when it is subjected later on to the stress incident to the stuffing of the same through a sausage stuffing horn.

After the shirring dogs 62 have been moved into proper gripping engagement with the inflated casing 52, the dog guide rollers 112 move out of the slots 113. The springs 107 hold the shirring dogs 62 and prevent their flopping around when they are out of engagement with or not guided by the chain guide plate 92 and the roller guide plates 109 and 110. The truck rollers 108 remain in engagement with the upper and lower surfaces of the roller guide plates 109 and 110 while the intermediate chain section 64b remains in contact with the intermediate surface 97 of the chain guide plates 92. The trucks 63 and shirring dogs 62 thus are guided as they move with the inflated casing 52 parallel to the mandrel 125 to shirr the casing into the form indicated at 124.

When the shirring dogs 62 are moved out of gripping engagement with the inflated casing 52, it is important that this be accomplished without any abrasive action for the reasons mentioned hereinbefore. Also, at this point it is desirable that the trucks 63 be guided in their movement off of the chain guide plates 92 onto the left hand sprockets 65 so that there is no slight inward movement of the truck 63 as it passes from one to the other. Such a slight displacement of the trucks 63 is prevented by omitting the intermediate sprocket in each of the left hand sprockets 65 and extending the end 94 of the chain guide plate 92 past the axis of rotation of the sprockets 65. Thus, the chain 64 and the trucks 63 pass off of the chain guide plates 92 and around the sprockets 65 from paths which are tangent to the circles through the bottoms of the rollers.

Now considering particularly the guide slots 114 in the rear sides of the dog guide plates 115 it will be noted that they have sections 114' which dip inwardly so that the dog guide rollers 112 are required to move correspondingly and swing the shirring dogs 62 in the directions indicated by the arrows 128 and 128' about the axes of the truck shafts 102. In effect the shirring dogs 62 are swung backward away from the inflated casing 52 as they are moved forwardly by the continued movement of the chains 64. Thus, as the shirring dogs 62 move around the left hand sprockets 65 in the direction indicated by the arrows 129 and 129', although their speed increases in this portion of their travel, they have been swung away from the casing 52 so that they do not injure the same. Moreover, since the shirred portion 124 of the casing lies immediately ahead of the shirring dogs 62 leaving the unshirred portion 52, it is important to swing them backward so as to clear the increased diameter resulting from the shirring operation.

As indicated hereinbefore, the material of which the shirring dogs 62 is formed is important. Preferably the material should be such that it has long lasting and wear resisting qualities and yet it must be such that it will provide a smooth surface for engaging the inflated casing 52. A material which has been found particularly suitable for this purpose is, as indicated, a phenolic condensation product. Other plastics such as methyl methacrylate can be used.

Reference now may be had to Figures 4, 10 and 11 of the drawings which illustrate more clearly the details of construction of the brake mechanism which can be employed for controlling the unreeling of the casing 49 from the reel 50 as shown in Figure 2A and referred to hereinbefore. Since it is desirable to provide a constant drag on the shaft 51 to which the reel 50 is clamped, a pulley 133, Figure 11, is secured to the rear end of the shaft 51 and over this pulley 133 a strap 134 is trained. The strap 134 is anchored at one end to the angle 5 by a cap screw 135 and at its other end it carries a weight 136. The frictional engagement between the strap 134 and the pulley 133 is sufficient to provide a constant drag on the reel 50. Thus, when the brake is released, as will be described presently, the reel 50 is not free to rotate but is restrained slightly as described.

Since it is desirable to stop the rotation of the reel 50 on termination of the shirring operation, a positive brake mechanism is provided therefor which is controlled automatically in a manner to be described. For the present it is pointed out that a brake lever 137 is rockably mounted at 138 on an arm 139 which extends rearwardly from an upright angle 9'' and that a coil compression spring 140 surrounding a bolt 141 is arranged to vary the braking force applied by the brake lever 137. By changing the tension of the spring 140 as by screwing the bolt 141 in or out it is possible to vary the force exerted by the brake lever 137. Underneath the brake lever 137 there is provided a length of brake lining 142 which is arranged to engage the outer surface of the rim of a brake wheel 143. The brake wheel 143 is fast on the shaft 51. Thus the force of the coil compression spring 140 is exerted through the brake lever 137 and the brake lining 142 on the brake wheel 143.

Provision is made for releasing the brake lever 137 from the braking position by mechanical means and it is held in the released position by means which are controlled electrically. This construction will be described now.

The brake lever 137 carries a roller 144 that is arranged to be engaged by a brake release arm 145 which is rockably mounted at 146. A coil tension spring 147 serves to bias the brake release arm 145 away from the roller 144. An arm 148 is mounted to move with the brake release arm 145 and it is pivotally connected to a brake operating arm 149 that, as shown more clearly in Figures 10 and 11, is supported at its rear end by a brake arm support lever 150. The brake operating arm 149 carries a roller 151 at its rear end which is arranged to engage a brake cam 152 that is secured by cap screws 153 to a clamp cam 154 which is fast on the auxiliary cam shaft 32. A spacer 155, Figure 10, serves to locate the cam 152 in operative relation to the roller 151 and in proper spaced relation to the clamp cam 154.

As shown in Figure 4 a latch plate 156 is mounted on top of the brake operating arm 149 which is arranged to be engaged by a latch 157 that is pivoted at 158. A link 159 serves to interconnect the latch 157 and the armature of a solenoid 160. The arrangement is such that, when the solenoid 160 is deenergized, the latch 157 occupies the lowermost position where it can engage the latch plate 156. In Figure 4 the solenoid 160 is shown in the energized position where the latch 157 is moved to its uppermost position in which the spring 147, Figure 11, is permitted to move the brake release arm 145 so that it no longer supports the roller 144 and the brake lever 137 in the released position. Thereupon the spring 140 moves the brake lever 137 downwardly to cause the brake lining 142 to engage the rim of the brake wheel 143 and arrest further rotation of the shaft 51 and the reel 50 fastened thereon.

As will appear hereinafter, when the head motor 24 is deenergized and the shirring head 48 is not in operation the brake solenoid 160 is energized to maintain the latch 157 in the retracted position as shown in Figure 4. This permits the brake to be set at all times with the shirring head motor 24 deenergized except when it is released by engagement of the roller 151 by the brake cam 152. Ordinarily this occurs only once during each cycle of operation of the shirring head 48. Immediately upon energization of the shirring head motor 24, the brake solenoid 160 is deenergized and the latch 157 is permitted to fall so that it will engage the latch plate 156 at this time to prevent rearward travel of the brake operating arm 149 and thus hold the brake release arm 145 in supporting engagement with the roller 144. The timing is such that the brake operating arm 149 releases the brake sufficiently far in advance of the energization of the shirring head motor 24 so that the brake solenoid 160 can be deenergized to hold the brake in the released position at the instant that the shirring head motor 24 is energized, thus releasing the reel 50 so that the casing 49 can be unreeled therefrom by the measuring roll 14 with no restraint other than that provided by the strap 134 in frictional engagement with the pulley 133, previously described.

In Figures 2, 2A, 3 and 3A the turret, referred to hereinbefore, is indicated generally at 164. The turret 164 includes a turret shaft 165 which is rotatably mounted at its left end, as is viewed in these figures, by a bearing 166 which is carried by one of the transverse angles 10. At the forward end the turret shaft 165 is piloted in a bearing boss 167 which may be secured, as by welding, to a front slide plate 168 that is secured suitably to the angle iron frame 1. A back slide plate 169 is also provided on the frame 1 in spaced relation with respect to the front slide plate 168 and the shaft 165 extends through the same. The turret 164 also includes front and back turret plates 170 and 171 which are circular in outline and are fast on the shaft 165. With a view to supporting the turret 164 intermediate its ends a steady rest is provided in the form of a roller 172, Figure 2, which is carried by a bracket 173 that is fastened to a transverse angle 174 extending between the front and rear top longitudinal angles 6 and 7.

Slidably mounted in the front and back turret plates 170 and 171 are four pairs of pilot shafts 175 which also are shown in Figures 13, 14 and 18 of the drawings. Between each pair of pilot shafts 175 is a mandrel pilot shaft 176. The four mandrel pilot shafts 176 also are slidably mounted in the front and back turret plates 170 and 171.

Each of the mandrel pilot shafts 176 carries near its forward end a mandrel yoke 177 one of which is shown more clearly in Figures 14, 15 and 19 of the drawings. Each mandrel yoke 177 has an inner slot 178 which registers with a key 179 that extends from the turret shaft 165 as shown. This construction is provided in order to guide each of the mandrel yokes 177 accurately with respect to the turret shaft 165. While only one mandrel yoke 177 is shown in Figure 14 because of the position where the section is taken for this view, it will be understood that there are four mandrel yokes 177, one mounted on each of the forward ends of the mandrel pilot shafts 176 and secured thereto for movement therewith. Each of the mandrel yokes 177 moves with its associated mandrel 125, previously referred to, during the longitudinal and transverse movement of the same as will be described in more detail herein.

As shown more clearly in Figures 15 and 19 of the drawings, each of the mandrel yokes 177 has an outer circumferential slot 180 the purpose of which will be apparent presently. Also as here shown it will be noted that the portion of the mandrel pilot shaft 176 which extends through the mandrel yoke 177 has a longitudinally drilled aperture 182 which registers with the aperture 126 in the associated mandrel 125 that, as shown, is threaded into the outer end of the corresponding mandrel pilot shaft 176. A transverse aperture 183 is drilled centrally in a cap screw 184 which is threaded into the mandrel yoke 177 and into the shaft 176 as shown more clearly in Figure 19. It will be understood that air under pressure flows through the apertures 183 and 182 into the aperture 126 in the mandrel 125 for inflating the casing 52 as described hereinbefore. The manner in which the connection to the source of air under pressure is accomplished will be described presently. At this time it is pointed out that the head 185 of the cap screw 184 is rounded off to facilitate the making of the air connection thereto.

As illustrated in Figures 14 through 17 a compressor-doffer unit 187 is carried by each pair of pilot shafts 175. The pilot shafts 175 extend past the corresponding mandrel yoke 177 and into suitable openings in the compressor-doffer unit where they are fastened by suitable means such as set screws. It will be understood that there are four compressor-doffer units 187 and that each of these units has an inner slot 188 for registering with the corresponding key 179 secured to the turret shaft 165 for guiding the same. Also each of the compressor-doffer units 187 has an outer circumferential slot 189 the purpose of which will be apparent presently. In addition at the left hand end of each of the compressor-doffer units 187 the lip which forms part of the slot 189 is inclined as indicated at 190 for a purpose to be described.

As shown more clearly in Figure 32, each of the units 187 has a forwardly extending tubular extension 191 with a collar 192 at the forward end which is partially closed by a ring 193 that may be welded thereto as indicated at 194. As will appear hereinafter the shirred casing 124 at its outer end bears against the ring 193 which forms a stop for the same with respect to the corresponding mandrel 125. The ring 193 also provides a surface 195 which is moved forwardly during the compressing stroke to compress the shirred casing 124 and subsequently holds the shirred casing in a compressed condition during the hold part of the cycle. Subsequently, the forward surface of the ring 193 is moved forwardly relative to the corresponding mandrel 125 to doff the shirred casing in the doffing position of the turret 164.

Now it will be understood that the turret 164 includes the turret shaft 165 which carries the front and back turret plates 170 and 171. These turret plates 170 and 171 carry slidably four pairs of pilot shafts 175 and between each pair there is slidably mounted a mandrel pilot shaft 176. Each mandrel pilot shaft has a mandrel yoke 177 secured thereto near the forward end and likewise at the forward ends of each pair of pilot shafts 175 there is secured a compressor-doffer unit 187. As will appear hereinafter, each compressor-doffer unit 187 is movable longitudinally relative to the associated mandrel yoke 177 so as to effect relative movement with respect to the mandrel 125 carried by the mandrel pilot shaft 176 which is secured to the corresponding mandrel yoke 177. The turret 164 can be rotated at the proper time through an arc of 90° for the purpose of presenting the mandrels 125 successively to the shirring head 48. At the same time that the shirring head 48 is shirring the casing 52 onto the mandrel 125 in register therewith, certain operations are being performed on the casings which have been shirred on the other three mandrels.

As illustrated in Figures 3, 3A, 12, 13 and 18, there are three pairs of slide bars 196 which extend between the front and back slide plates 168 and 169. The slide bars 196 may be secured to the slide plates 168 and 169 by the provision of suitable apertured bosses 168a, Figure 12, on the former and 169a, Figure 13, on the latter which are secured thereto as by welding 168b and 169b respectively, the slide bars 196 being secured in position by suitable set screws (not shown). The three pairs of slide bars 196 are provided for slidably mounting a shirring slide shown generally at 197 in Figure 15, a compressing slide, shown generally at 198 in Figure 16, and a doffing slide, shown generally at 199 in Figure 17. These three slides 197, 198, and 199 also are shown in end elevation in Figure 14.

By reference to Figures 15 and 19 the details of construction of the shirring slide 197 are more readily apparent. It will be observed that the shirring slide 197 includes a front piece 200 and a rear piece 201 which are apertured for mounting on the pair of slide bars 196 employed for carrying the same. The front and rear pieces 200 and 201 are held in proper spaced relation by a spacer 202 which has studs 203 integrally formed therewith at its ends for projecting through the pieces 200 and 201. Nuts 204 threaded on the studs 203 serve to hold the parts in assembled relation. The front piece 200 has an integrally formed nose 205 that is arranged to interfit in the slot 180 in the mandrel yoke 177 when the turret 164 is rotated to bring about this relationship. A U-shaped latch arm 206 is secured by bolts 207 to opposite ends of the rear piece 201 and it has a nose 208 which interfits with the slot 189 in the compressor-doffer unit 187 when it is rotated into this position on operation of the turret 164. Extensions 209 from the latch arm 206 bear against portions 200a of the front piece 200 for limiting the downward movement of the arm 206. A hold down strap 210 is secured by screws 211 to the spacer 202 for holding the latch arm 206 in the position shown in Figures 15 and 19 of the drawings. This construction for the shirring slide 197 is employed in order to make it as nearly as possible a duplicate of the construction of the doffing slide 199 to be described presently. This was done for reasons of economy in manufacturing. Insofar as the shirring slide 197 is concerned, the latch arm 206 remains stationary with respect to the same. Accordingly, it will be apparent that the nose 208 forms an extension of the front piece 200 if desired in order to perform its intended function.

As shown in Figure 19 a metal tube 213 extends through an opening 214 in the spacer 202 and it has a cap 215 at its lower end. A coil compression spring 216 is located in the opening 214 around the tube 213 and serves to bias the same downwardly by reacting against the upper surface of the cap 215. Within the cap 215 there is located a rubber nipple 217 which has an aperture 218 that is arranged to register with the aperture 183 in the cap screw 184 that is threaded into the mandrel yoke 177. As indicated the nipple 217 is formed of rubber or similar material such as a synthetic rubber and it has a lower surface 219 that is rounded for cooperating with the rounded upper surface of the head 185 of the cap screw 184 to facilitate the operative engagement of the nipple 217 with the head 185 of the cap screw 184 when the turret 164 is rotated to bring the mandrel yoke 177 into operative position to permit the shirring of the casing 52 onto the mandrel 125 in the shirring position. As the mandrel yoke 177 is rotated into position with the turret 164, the upper rounded surface of the head 185 engages the correspondingly shaped surface 219 of the nipple 217 and lifts the same together with the tube 213 upwardly against the biasing force of the spring 216 until the nipple 217 is seated against the upper surface of the head 185. By maintaining these surfaces smooth and providing them with a slight lubricant, the desired engagement therebetween takes place as the turret 164 is rotated and an air tight connection therebetween is established.

The downward movement of the tube 213 is limited by a stop collar 220. A flexible tube 221 of rubber or like material is slipped over the upper end of the tube 213 and is connected to a suitable source of air pressure (not shown) which, it will be recalled, is preferably of the order of two and one-half pounds per square inch.

As illustrated in Figure 3, a manually operable lever 222 may be pivotally mounted on the shirring slide 197 to facilitate the separation of the nipple 217 from the head 185 of the cap screw 184. Such operation may be desired in threading the shirring machine or for making certain adjustments where it is desired to remove the air pressure from the casing and the mandrel on which it is being shirred.

As illustrated in Figure 14, the rear piece 201 of the shirring slide 197 has an integrally formed extension 223 to which the shirring arm 42 may be rockably connected by a cap screw 224. Now it will be understood that the shirring slide 197 is moved forwardly along the associated slide bars 196 by the shirring arm 42 in proper timed relation for the purpose of moving the mandrel 125 that extends forwardly from the associated mandrel yoke 177 together with the associated compressor-doffer unit 187 to position the mandrel 125 through the shirring head 48 and then to withdraw these elements from the shirring head 48 as the casing 52 is shirred onto the mandrel 125, the casing being shirred against the ring 193, Figure 32, of the compressor-doffer unit 187 as indicated hereinbefore.

As shown in Figure 16 the compressing slide 198 is somewhat similar in construction to the shirring slide 197. The compressing slide 198 includes a front piece 227 and a rear piece 228 which are apertured for receiving the corresponding pair of slide bars 196 therethrough. A spacer 229 extends between the front and rear pieces 227 and 228 and it has integrally formed studs 230 which extend through the pieces 227 and 228 and are provided with nuts 231 for holding them in assembled relation. The front piece 227 has an integrally formed nose 232 which is arranged to engage the slot 189 in the compressor-doffer unit 187 as it is rotated into engagement therewith when the turret 164 is rotated from one operative position to the next operative position. The rear piece 228 has an integrally formed extension 233 to which a compressing arm 234 may be rockably secured by a cap screw 235. It will be understood that the compressing arm 234 is operated in proper timed relation with the other parts of the automatic shirring machine so that it is effective to move the compressing slide 198 forwardly to carry therewith the compressor-doffer unit 187 with which the nose 232 is in engagement to compress the shirred casing on the mandrel 125 between the ring 193, Figure 32, at the forward end of the collar 192 and the rear side of the front slide plate 168. The shirred casing is compressed in this manner in order to reduce further its bulk and to permit it to be reduced to a minimum length suitable for packaging at a minimum of expense. The compressing slide 198 is employed only for moving the associated compressor-doffer unit 187 forwardly. After the turret 164 is rotated so as to move the associated unit 187 out of engagement therewith, the compressing slide 198 is returned to the initial position for engagement with the slot 189 in the next compressor-doffer unit 187.

In Figure 17 of the drawings, the details of construction of the doffing slide 199 are shown more clearly. It will be noted that it includes a front piece 238 and a rear piece 239 which are separated by a spacer 240 that has integrally formed studs 241 at its ends. The studs 241 extend through the front and rear pieces 238 and 239 and nuts 242 serve to hold the parts in assembled relation. The front piece 238 has an integrally formed nose 243 that is arranged to bear against the forward wall of the slot 189 in the compressor-doffer unit 187. The nose 243, as shown in Figure 14, is formed in two parts so that they straddle the part of the compressor-doffer unit 187 which is provided with the inclined lip 190. This arrangement is required since the doffing slide 199 is moved forwardly to pick up the corresponding compressor-doffer unit 187 rather than having the latter rotated into engagement with the former as is the case for the shirring and compressing slides 197 and 198. The two part nose 243 of the doffing slide 199 bears against the forward surface of the slot 189 for moving the compressor-doffer unit 187 forwardly to strip the shirred casing from the mandrel 125.

Since the doffing slide 199 also serves to return the compressor-doffer unit 187 to its rearmost position, a U-shaped latch arm 244 is rockably mounted on the rear piece 239 thereof by studs 245 extending therefrom. At its forward end the latch arm 244 is provided with a nose 246 which has an inclined surface 247 which is arranged to engage the inclined surface 190 of the compressor-doffer unit 187 for lifting the latch arm 244 so that the nose 246 can pass beyond the portion of the compressor-doffer unit 187 in which the slot 189 is located and engage the forward side 187a of this portion. Then when the doffing slide 199 is returned to its initial position, it carries with it the associated compressor-doffer unit 187.

The latch arm 244 has downwardly formed extensions 248 which bear against surfaces 238a of the front piece 238 for limiting the downward movement of the latch arm 244. A leaf spring 249, secured by screws 250 to the spacer 240, extends across the arms of the U-shaped latch arm 244 to bias the same downwardly.

The rear piece 239 has an integrally formed extension 251 to which a doffing arm 252 is rockably secured by a cap screw 253. It will be understood that the doffing arm 252 is moved forwardly and rearwardly in proper timed sequence for effecting corresponding movement of the doffing slide 199 to pick up the compressor-doffer unit 187 in its path and to move it forwardly for stripping the mandrel of the compressed, shirred and set casing thereon and for returning the compressor-doffer unit 187 to the initial position after which it is moved by rotation of the turret 164 to the shirring position.

After the shirred casing has been compressed as a result of the forward movement of the compressing slide 198, it is desirable to hold the casing in this compressed condition for a short interval of time to permit it to assume a set which overcomes the likelihood of the casing springing back to occupy a greater length than is desired. Accordingly, provision is made for holding the compressor-doffer unit 187 in the forward or compressed position to accomplish this purpose.

The means for holding the compressor-doffer unit 187 in the compressing position are illustrated more clearly in Figure 14 of the drawings. It will be observed that one side 187b of the compressor-doffer unit 187, as it moves forwardly in the compressing position, engages and moves past an inclined surface 256 of a latch 257 which is rockably mounted on a stud 258 that is carried by a guide plate 259. The latch 257 has an integrally formed arm 260 to which a coil tension spring 261 is attached for rocking the latch 257 in a clockwise direction as viewed in Figure 14. When the compressor-doffer unit 187 has moved past the latch 257, the spring 261 moves the latch radially inwardly so that it engages the rear face 187c of the compressor-doffer unit 187 and prevents its rearward movement. At the same time the latch 257 permits the compressor-doffer unit 187 to be rotated when the turret 264 is rotated and it accurately guides the slot 189, Figure 19 or Figure 32, so that the arcuate inner edge 262 of the guide plate 259 interfits with this slot. It will be understood that, as the turret 164 is rotated, the compressor-doffer unit 187 which has been moved forwardly by the compressing slide 198 is rotated laterally out of engagement with the compressing slide 198 and into operative engagement with the guide plate 259. Thus, as the turret 164 is rotated in the direction indicated by the arrow 263 in Figure 14 from one position to the next, the mandrel 125 on which the casing has been compressed is rotated together with the associated compressor-doffer unit 187 onto the guide plate 259 where it is held during the interval of rest of the turret 164 while the shirring, compressing and doffing operations are being performed on the other mandrels in these positions.

It is pointed out that the mandrel yoke 177 and the associated mandrel 125 is moved forwardly and then returned to the rearmost position only during the time that the turret 164 occupies the shirring position. During the other three positions of the mandrel 125 it occupies the rearmost position. It is desirable that the mandrel yoke 177 be retained in this rearmost position during the three successive positions of the mandrel 125 after the casing has been shirred thereon.

For this purpose the mechanism as shown in Figure 18 may be employed. As there illustrated, a mandrel yoke guide ring 264 is supported forwardly of the back slide plate 169 by studs 265 extending therefrom. As the name implies, the ring 264 is generally circular and it has a gap 266 in it which corresponds to the position of the mandrel yoke 177 when it is in the shirring position. The gap 266 is provided to permit the mandrel yoke 177 to be moved forwardly relative to the ring 264 and to be returned for subsequent engagement therewith. After the mandrel yoke 177 has been returned into its rearmost position through the gap 266 and the turret 164 is rotated to the next position, the slot 180, Figure 15, in the mandrel yoke 177 rides into registry with the inner edge 267 of the guide ring 264. In this manner the mandrel yokes 177 in the rearmost position are held therein while the corresponding compressor-doffer units 187 are moved forwardly thereof. In Figure 18 it will be observed that three of the four mandrel yokes 177 always are guided on the guide ring 264 while the fourth mandrel yoke 177 can be moved through the gap 266 for the shirring operation.

It will be recalled that the doffing slide 199 returns the compressor-doffer unit 187 to the rearmost position after the shirred and compressed casing has been stripped from the associated mandrel 125. As the turret 164 rotates to the next position, the compressor-doffer unit 187 previously in engagement with the doffing slide 199 is rotated out of engagement therewith toward the shirring position. It is desirable that the compressor-doffer unit 187 be retained in its rearmost position so that the slot 189 therein can register with the nose 208 of the shirring slide 197.

In Figure 18 the mechanism for guiding the compressor-doffer unit 187 from the doffing position to the shirring position and also from the shirring position to the compressing position are illustrated. It will be noted that there are provided compressor-doffer unit guide plates 268 and 269 between the doffing and shirring positions and between the shirring and compressing positions respectively. These guide plates 268 and 269 are held in spaced relation forwardly of the guide ring 264 by studs 270. Now as the turret 164 is rotated from one position to the next the slot 189 in the compressor-doffer unit 187 in the doffing position registers with the inner edge 271 of the guide plate 268 and at the same time the slot 189 of the compressor-doffer unit in the shirring position registers with the inner edge 272 of the guide plate 269. Thus, as the turret 164 is rotated from one position to the other, the compressor-doffer units 187 are guided from the shirring position into the compressing position. This accurately registers the nose 208 of the shirring slide 197 with the slot 189 and the nose 232 of the compressing slide 198 with the slot 189 of the next compressor-doffer unit 187.

It will be understood that the forward guide plate 259, Figure 14, serves to guide the compressor-doffer units 187 as they are moved from the compressing position through the holding position to the doffing position on rotation of the turret 164. Likewise the rear guide plates 268 and 269 serve to guide the compressor-doffer units 187, as just described, so that there is no likelihood that they will be moved out of registry with the appropriate cooperating parts of the slides 197, 198 or 199 as the case may be.

Referring now particularly to Figure 12 of the drawings, it will be noted that the front slide plate 168 has a doffing aperture 275 that is circular. It is through this aperture 275 that the shirred and compressed and held casing 124 is doffed from the mandrel 125 onto a delivery tray which will be described hereinafter.

The front slide plate 168 also is provided with a shirring aperture, indicated generally at 276, which is formed by two intersecting arcuate openings 277 that are provided for guiding a pair of clamp members 278. In Figure 12A the clamp members 278 are shown more clearly and it will be noted that each of them is provided with a semi-circular arcuate opening 279 which is slightly less in diameter than the outer diameter of the inflated casing 52. The meeting edges of the clamp members 278 are parallel and the adjustment is such that the casing is doubled back about 1/32 inch between each pair of parallel faces so that, in the clamping position they are spaced apart about 0.002 inch. The purpose of this is to clamp securely the inflated casing near the slide plate 168 to permit its being severed at the end of the shirring operation. In addition the clamp members 278 serve to hold the casing distended in order to permit the next mandrel 125 to be inserted therethrough and through the shirring head 48 preparatory to the next shirring operation. When the clamp members 278 are moved into engagement the arcuate openings 279 form a complete circular opening against the surface of which the casing is held initially by air pressure from within the same. After the casing is severed and the pressure is relieved, the casing still remains in engagement with the inner surface of the cylindrical opening thus provided while the shirring dogs 62 in engagement therewith in the shirring head 48 serve to hold the casing distended for receiving the next mandrel 125.

The clamp members 278 may be secured by screws 280 to the lower ends of clamp arms 281 which are located on the front side of the front slide plate 168 and are pivoted thereon at 282. The clamp arms 281 are biased toward each other by a coil tension spring 283, Figure 12, which extends between pins 284 that project through arcuate slots 285 in the front slide plate 268 so that the spring 283 is located on the rear side thereof. The clamp arms 281 may be swung apart by a cam link 286 which has cam rollers 287 at its ends for engaging the adjacent sides of the clamp arms 281. A cam shaft 288 is welded at 288a, Figure 12A, to the cam link 286 and it extends through a cam shaft boss 289, Figure 3A, that is secured as by welding 289a, to the rear side of the front slide plate 168. A cam shaft lever 290 is clamped by a bolt 290a to the rear end of the cam shaft 288 and it has rockably fastened thereto a clamp operating rod 291 that extends downwardly for attachment to a clamp operating lever 292, Figure 2A. As shown in Figure 2A and in Figure 18, the clamp operating lever 292 is rockably mounted on a shaft 293 that extends transversely between the frame angles 6 and 7. The clamp operating lever 292 carries a cam follower 294 that is arranged to engage the clamp cam 154, previously referred to, which is fast on the auxiliary cam shaft 32. A coil tension spring 295 is secured to the clamp operating lever 292 for biasing the same downwardly to hold the cam follower 294 in engagement with the surface of the clamp cam 154.

As shown in Figure 20 of the drawings, the clamp cam 154 is generally circular except for a recessed portion 295. When the cam follower 294 rides along the circular surface of the clamp cam 154, the cam operating lever 292 is raised and the clamp operating rod 291 occupies a similar raised position. The cam link 286 is rocked so that the cam rollers 287 engage the clamp arms 281 and swing them apart, thereby swinging the clamp members 278 in the arcuate slots 277 away from the inflated casing. The clamp members 278 are swung far enough apart so that the compressor-doffer unit 187 associated with the mandrel 125 on which the casing is to be shirred can project through the shirring aperture 276. The purpose of this is to permit the forward end of the compressor-doffer unit 187 to approach closely to the next set of shirring dogs 62 in engagement with the casing 52 so as to permit sealing off the open end thereof at the beginning of the shirring operation for the purpose of permitting the casing 52 to be inflated.

The clamp members 278 are closed for only a brief period at the end of the shirring operation. This is accomplished by the cam follower 294 riding into the recessed portion 296 of the clamp cam 154. At this time the coil tension spring 295, Figure 2A, biases the clamp operating lever 292 downwardly and carries with it the clamp operating rod 291. The cam link 286 is swung to a position parallel to the clamp arms 281, as shown in Figures 12 and 12A of the drawings, and the coil tension spring 283 is permitted to bring the clamp arms 282 toward each other and the clamp members 278 together. They remain in this position while the inflated casing is being severed and until the next mandrel 125 is inserted into the casing held thereby. The recessed portion 296 of the clamp cam 154 is so shaped and the clamp cam 154 is rotated at such a speed in proper timed sequence so that the clamp members 278 are separated prior to the insertion of the associated compressor-doffer unit 187 into the shirring aperture 276.

Also shown in Figure 12 of the drawings is a knife blade 297 having a serrated cutting edge 297a and secured to the lower end of a knife arm 298 which is pivoted to the rear side of the front slide plate 168 at 299. A knife operating rod 300 extends downwardly from and is pivoted to the knife arm 298, as shown in Figure 12, and is attached at its lower end to a knife operating lever 301, Figure 2A. The knife operating lever 301 is rockably mounted on the shaft 293 as shown more clearly in Figure 18. A cam follower 302 is carried by the knife operating lever 301 and it is arranged to be engaged by a knife cam 303 in the form of an arm which is mounted on and rotates with the auxiliary cam shaft 32. The knife cam 303 also is shown in Figure 20. A coil tension spring 304, Figure 2A, serves to bias the knife operating lever 301 downwardly against an adjusting screw 305 which is carried by a transverse angle 306.

It will be understood that the knife blade 297 occupies the position shown in Figure 12 except for the brief period when it is moved immediately past the rear sides of the clamp members 278 to sever the inflated casing held thereby. The knife blade 297 is held in this retracted position by the coil tension spring 304. The knife blade 297 is moved forwardly across the inflated casing 52 to sever the same only during the brief interval when the outer end of the knife cam 303 engages the cam follower 302 and raises the knife operating lever 301. This also raises the knife operating rod 300 and swings the knife arm 298 in a clockwise direction as viewed in Figure 12 to accomplish the cutting or severing function. The timed arrangement of the movement of the knife blade 297 is such that it takes place after the mandrel 125 has been completely withdrawn through the clamp members 278 and they have been moved into clamping engagement with the inflated casing. After these functions have been accomplished, the knife blade 297 is swung along the rear surfaces of the clamp members 278 to sever the inflated casing at this location.

Reference now may be had to Figures 21 and 22 where the details of the mechanism for rotating the turret 164 are shown more clearly. Reference also should be had to Figure 2 in conjunction with Figures 21 and 22. It will be noted that the turret shaft 165 has a circular turret rotating plate 310 keyed thereto immediately ahead of the bearing 166 and that this plate has an integrally formed hub 311. The plate 310 and the hub 311 are positioned between collars 312 and 313 which may be secured as by set screws to the shaft 165. It will be understood that the plate 310 and its hub 311 are arranged to rotate with the shaft 165. The plate 310 has four notches 314 in its periphery that are spaced 90° apart. Since the turret 164 has four different positions a notch 314 is provided for each.

In order to rotate the plate 310 and therewith the shaft 165 a nose 315 extending radially inwardly from a pawl 316 is arranged to enter the notches 314. The pawl 316 is rockably mounted at 317 on a turret rotating plate 318 which is rockably mounted on the hub 311. A coil tension spring 319 is strained between the pawl 316 and the plate 318 for biasing the nose 315 into the corresponding notch 314. Attached to the plate 318 is a turret rotating rod 320 that is secured at its lower end to a slide 321 which is guided in suitable guides 322 fastened onto the transverse angles 10 as shown. A link 323 serves to interconnect the lower end of the rod 320 and the rear end of a turret rotating lever 324 which is rockably mounted on a transverse shaft 325. A coil tension spring 326 is fastened to the rear end of the turret rotating lever 324 for biasing the same downwardly to effect the rotation of the shaft 165 and thereby of the turret 164. The turret rotating lever 324 carries a cam follower 327 which is arranged to engage the periphery of a turret rotating cam 328 that is fast on a cam shaft 329.

The cam shaft 329, as shown in Figures 2 and 20 of the drawings, is provided with a gear wheel 332 which is engaged by a gear wheel 333 driven by a pinion 334 of a speed reducer 335. The speed reducer 335 has a gear wheel 336 which is driven by a pinion 337 of a turret motor 338. As will appear hereinafter the turret motor 338 is ordinarily intended to operate continuously for causing rotation of the cam shaft 329.

The cam shaft 329 also has a sprocket 339 secured thereto for driving a chain 340 which extends over a sprocket 341, that is attached to the auxiliary cam shaft 32. In this manner the cams on both of the cam shafts 329 and 32 are rotated in proper synchronized relation.

With a view to withdrawing the nose 315 of the pawl 316 from the notch 314 in which it may be located a pawl release arm 344 is formed integrally as by welding at 344a with the pawl 316. This is shown more clearly in Figure 21A. It will be understood that the pawl 316 and the pawl release arm 344 rock as a unit about the pivot support at 317.

The pawl release arm 344 is rocked by the locking mechanism 342 which is illustrated more clearly in Figures 23 and 24 of the drawings.

Reference now may be had to these two figures of the drawings together with Figure 21A. It will be noted that a latch finger 345 extends from a sleeve 346 which is rockably mounted on a transverse shaft 347. An arm 348 extends from the sleeve 346 and is movable therewith together with the latch finger 345 as a unit. A turret locking rod 349 serves to interconnect the arm 348 and a turret locking lever 350 which is rockably mounted on the shaft 325. A coil tension spring 351 serves to bias the turret locking lever 350 downwardly and to thereby hold the latch finger 345 in the associated notch 314 in the turret rotating plate 310. A cam follower 352 is carried by the turret locking lever 350 and it is arranged to be engaged by a cam 353 that may be secured as by bolts 354 to the turret rotating cam 328. The cam 353 may be identified as a locking cam since it controls the position of the latch finger 345 which, in cooperation with the turret rotating plate 310 serves to lock and unlock the turret 164. When the latch finger 345 is moved to the locking position by the coil tension spring 354, it engages the lower end of the pawl release arm 344, as seen in Figure 21A, and thereby the nose 315 of the pawl 316 is moved out of engagement with the corresponding notch 314.

Now it will be understood that the relationship between the turret rotating cam 328 and the locking cam 353 is such that the latter moves the latch finger 345 out of engagement with the associated notch 314 at the time when the spring 319 is permitted to rock the pawl 316 so as to bring the nose 315 thereof into engagement with one of the notches 314. At this time the spring 326, Figure 21, is stressed and thereafter it is released as the cam 328 is rotated so that the turret rotating plate 310 is rocked by the spring 326 in the direction indicated by the arrow 355 in Figure 22 to advance the turret 164 through 90°. In the meantime the inner edge of the latch finger 345 rides on the periphery of the turret rotating plate 318 between the notches 314 until it registers with the next notch whereupon the spring 351 is effective to move the latch finger 345 into engagement with this notch and thereby hold the turret 164 in position during the next cycle of operations of the shirring machine. When the latch finger 345 enters the notch to lock the turret rotating plate 310, it engages the pawl release arm 344 and rocks the pawl 316 to the position shown in Figure 21A. The continued rotation of the turret rotating cam 328 raises the turret rotating lever 324 and thereby rocks the turret rotating plate 318 to the position shown in Figure 24. The nose 315 of the pawl 316 then engages the next notch 314. The spring 326 is effective, when the latch finger 345 is withdrawn, to advance the turret shaft 165 and the turret 164 through the next quarter revolution. In this manner the turret 164 is advanced in four steps during each complete revolution and is locked in each of the four positions to hold the turret 164 in the proper operative position with respect to the mechanism which cooperates therewith in each of the operative positions.

Referring now to Figures 2, 3 and 20 of the drawings, it will be noted that the shirring lever 40 which is attached to the shirring arm 42 and is rockably mounted on the shaft 41 carries a cam follower 356 which is arranged to engage the surface of a shirring cam 357 which is of a box type construction in order to avoid the necessity for the use of spring or weight means for opposing the action of the cam 357 in moving the shirring lever 40. A similar construction is provided for controlling the movement of the compressing arm 234 and the doffing arm 252.

A compressing lever 358 is connected to the compressing arm 234 and is rockably mounted on the shaft 41. The lever 358 carries a cam follower 359 which is arranged to engage the surface of a compressing cam 360. This cam 360 also is of the box type for the purpose mentioned. It and the shirring cam 357 are fast on the cam shaft 329 and rotate therewith.

In a similar manner a doffing lever 361 is attached to the doffing arm 252 and is rockably mounted on the shaft 41. The doffing lever 361 carries a cam follower 362 which is arranged to follow the outer surface of a doffing cam 363 of the box type for controlling the forward and reverse movements of the doffing arm 252.

When the knife blade 297, Figure 12, is operated to cut the inflated casing 52 adjacent the clamping members 278, it is desirable that this section of the casing extending rearwardly from the clamp members 278 toward the shirred portion 124 of the casing be held under tension. When this is done the knife blade 297 is able to make a clean cut across the end of the inflated casing 52 immediately to the rear of the clamping members 278. In order to provide this tensioned section of the inflated casing 252 the whisker construction illustrated in Figures 25 through 30 can be used. It will be recalled that Figures 25, 26, 27 and 28 are taken looking forwardly from the rear of the machine. Thus the front slide plate 168 appears to the left and the rear slide plate 169 appears to the right rather than vice versa as shown in Figures 2, 2A, 3 and 3A of the drawings.

Referring now particularly to Figures 25 through 30, it will be observed that a whisker slide rod 367 is slidably mounted in the plates 168 and 169. A coil tension spring 368 on the front side of the front plate 168 is connected between it and a collar 369 for biasing the slide rod 367 to the right or rearwardly. A whisker arm 370 is fastened to the slide rod 367 and from it a whisker 371 extends preferably in the form of a steel wire which is curved as indicated more clearly in Figures 29 and 30 of the drawings. Surrounding the whisker 371 is a sleeve 372 of a material such as a synthetic rubber which can engage the inflated casing 52 and hold the same against the mandrel 125 without injuring the casing.

Near its rear end and ahead of the rear slide plate 169 a cam follower arm 373 is fastened to the slide rod 367 and it carries a cam follower 374 that is arranged to engage the underside of a whisker cam plate 375 that extends forwardly from the rear slide plate 169. A coil tension spring 376 interconnects the outer end of the cam follower arm 373 and a post 377 which extends forwardly from the rear slide plate 169 and serves to maintain the cam follower 374 in engagement with the cam surface of the whisker cam plate 375. In order to move the whisker slide rod 367 forwardly to effect a corresponding movement of the whisker 371 a hook 378, Figures 29 and 30, is fastened to the shirring slide 197 and its outer bifurcated end fits around the rod 367 and is arranged to engage a collar 379 which is loose on the rod 367. A coil spring 380 surrounds the rod 367 and is interposed between the collar 379 and the whisker arm 370 so that it must be compressed to equal the tension exerted by the spring 368 as the shirring slide 197 moves forwardly before any movement of the whisker 371 takes place.

When the shirring slide 197 occupies its forwardmost position, the whisker 371 is positioned close to the front slide plates 168 as shown in Figure 28 and the cam follower 374 rides up on the cam surface 381 of the cam plate 375 so as to swing the whisker 371 away from the mandrel 125 as illustrated in Figure 29. In this position the whisker 371 and the cover 372 thereon are out of the path of the shirred casing 124 and do not interfere in any way with the shirring operation.

It will be recalled that the shirring slide 197 moves rearwardly or toward the right as viewed in Figures 25 and 26 of the drawings as the shirring operation progresses. At the end of the shirring operation and after the shirring head 48 has stopped, the hook 378 carried by the shirring slide 197 has moved rearwardly sufficiently far so that the spring 368 is able to urge the rod 367 in a rearward direction. Accordingly, the cam follower 374 moves off of the cam surface 381 and onto the cam surface 382 of the cam plate 375. This causes the rod 367 to rock slightly so as to bring the whisker 371 and the sleeve 372 thereon into engagement with the inflated casing 52 as illustrated in Figure 30. The whisker 371 moves rearwardly together with the mandrel 125 and maintains the casing 52 under tension forwardly of the clamp member 278. Thereafter the knife blade 297 is operated as previously described to cut the inflated casing 52 in the tensioned section which is produced and maintained in the manner described. In Figure 27 of the drawings the manner in which the whisker 371 cooperates with the retreating mandrel 125 to provide a tensioned section 383 in the casing 52 is illustrated. It will be noted that the tensioned section 383 is immediately ahead of the shirred section 124 of the casing and immediately to the rear of the clamp members 278 which are shown in Figure 12A.

It is desirable that the mandrels 125 be lubricated in order to reduce to a minimum the likelihood of injuring the casing as it is moved relative thereto during the shirring, compressing and doffing operations. For this purpose the mechanism illustrated more particularly in Figures 31, 32 and 33 may be employed. As there shown an oil pump 387 has a sprocket 388 which is driven by a chain 389 from a sprocket 390 that is fast on the auxiliary cam shaft 32. A conduit 391 extends upwardly from the pump 387 for supplying a lubricant to a nozzle 392 which is carried on the rear side of the front slide plate 168. The nozzle 392 registers with an opening 393 in the collar 192 of the compressor-doffer unit 187 as it moved rearwardly by the doffing cam 363. The doffing cam 363, Figure 20, is so shaped that, after the compressor-doffer unit 187 is withdrawn through the doffing aperture 275 in the front slide plate 168 after it has stripped the shirred, compressed and held casing from the mandrel 125, it pauses for a time long enough to permit two or three drops of lubricant to fall from the nozzle 392 through the opening 393 and onto a bristle brush 394 that is generally circular in configuration and is located between the rear side of the ring 193 and the forward side of a collar or spacer 395. The lubricant which is thus applied to the bristle brush 394 is distributed over the surface of the mandrel 125 from its forward end as the compressor-doffer unit 187 is moved rearwardly in the doffing position in preparation for rotation to the shirring position on the next operation of the turret 164.

In Figures 34, 35 and 36 the mechanism which handles the shirred, compressed, held and doffed casing is shown. The casing is stripped from the mandrel 125 through the doffing aperture 275, Figure 36, in the front slide plate 168. Assuming that it contains no defects, it is in condition for packaging. As the casing comes through the doffing aperture 275 it is guided onto a tray 400 which has an inclined forward end 401, Figure 34, which extends past the inner side of the doffing aperture 275.

It is desirable to shift the tray 400 from the position shown by the full lines in Figure 36 to the position as shown by the broken lines in order to facilitate setting up of the shirring machine. Accordingly, the tray 400 is rockably mounted at 402 on a frame 403 which in turn is rockably mounted at 404 on the front top longitudinal angle 6. A plate 406 is fastened to the front side of the slide plate 168 and it has a slot 407 which is arranged to be engaged by a pin 408 that serves to position the tray 400 in either of its extreme positions. A coil tension spring 409 is strained between a pin 410 extending forwardly from the front slide plate 168 and the frame 403 for holding the tray 400 in either of its extreme operating positions.

As the shirred and compressed casing is stripped from the mandrel 125 through the doffing aperture 275, it is desirable that it be moved bodily toward the front side of the tray 400 and away from the doffing aperture 275. For this purpose a stacker shaft 412 is rockably mounted underneath the forward transverse angles 10 and it carries two stacker fingers 413 which are straight and offset slightly and a third stacker finger 414 which is curved and which is positioned close to the doffing aperture 275. It will be understood that, when the shaft 412 is rocked in a counter-clockwise direction as viewed in Figure 36, the fingers 413 and 414 move forwardly relative to the tray 400 sufficiently far to move the shirred casing away from the doffing aperture 275 and leave a space for the next casing.

As shown in Figure 36 the shaft 412 has an arm 415 clamped thereon and to this a spring 416, Figure 35, is attached. The other end of the spring 416 is secured to a pin 417 that extends forwardly from the guide plate 259. The spring 416 is arranged to bias the fingers 413 and 414 in a clockwise direction to the initial position.

In order to move the fingers 413 and 414 forwardly, a pin 418 extends radially from the shaft 412 and it carries a cam follower 419 which is arranged to be engaged by a stacking cam 420 that is carried by and rotates with the auxiliary cam shaft 32. The stacking cam 420 is so positioned on the auxiliary cam shaft 32 that it engages the cam follower 419 to move the fingers 413 and 414 forwardly just after the casing has been stripped from the mandrel 125 and has been fully deposited on the inner end of the tray 400.

It will be recalled that each of the mandrels 125 is threaded into the forward end of a mandrel pilot shaft 176. As shown in Figure 32 a hexagonal socket 125' is provided in the forward end of each of the mandrels 125 for receiving a correspondingly shaped wrench to facilitate application and removal of the mandrels 125 to and from the mandrel pilot shafts 176.

By way of illustration it is pointed out that where it is desired to shirr a 27/32 inch casing having an initial length of forty feet onto a mandrel 125, the mandrel 125 preferably has a length ahead of the ring 193 in the compressor-doffer unit 187 of about twenty-five and one-fourth inches. It is tapered from the forward or small end from a diameter of .460 inch to a diameter of .525 inch at the rear end adjacent the mandrel pilot shaft 176. This gradual taper from the rear end of the mandrel to the forward end facilitates the stripping of the casing therefrom when the mandrel is in the doffing position.

In Figure 37 of the drawings, the circuit connections which may be used for the shirring machine described hereinbefore are illustrated. Preferably a three phase 60 cycle 220 volt source is employed and conductors 421, 422 and 423 may be provided for making the necessary connections. However, it will be understood that a single phase source can be used if desired.

The head motor 24 is arranged to be controlled by a head motor relay that is indicated, generally, at 424. The head motor relay 424 has normally open main contact members 424a, 424b and 424c. In addition the head motor relay 424 has normally closed auxiliary contacts 424d, and normally open auxiliary contacts 424e. A winding 424w is provided for effecting the energization of the head motor relay 424.

The turret motor 338 is controlled by a turret motor relay that is indicated, generally, at 425. The relay 425 has main contacts that are indicated at 425a, 425b and 425c. In addition the motor relay has normally open auxiliary contacts 425d and an energizing winding 425w.

The energization of the turret motor relay 425 may be controlled by a control relay that is indicated, generally, at 426. The control relay 426 has normally open contacts 426a, 426b and 426c. It also has an energizing winding 426w.

The turret motor jog switch 27, previously referred to, has three sets of contacts. They include normally open contacts 27a, and normally closed contacts 27b and 27c. The head motor jog switch 28, also previously referred to, has nomally closed contacts 28a and normally open contacts 28b.

It will be observed that the circuit from energized conductor 423 normally is completed through the normally closed stop switch 29 and normally closed safety limit switch 36 to a conductor 427. It will be recalled that the stop switch 29 is provided for stopping the entire mechanism in the event that such operation is desired. The safety limit switch 36 is provided to prevent the operator from operating the machine with the cover 35 in the raised position. In describing the electrical control system for the automatic shirring machine it will be assumed that the stop switch 29 and the safety limit switch 36 are closed.

Further, in describing the functioning of the automatic shirring machine it will be assumed that the casing 49 is being unwound from the reel 50 and that it has been threaded into the shirring head 48 and onto a mandrel 125 positioned therein. Also it will be assumed that air at the desired pressure of about two and one-half pounds per square inch is available through the flexible air hose 221 for use during the shirring operation to inflate the casing 52.

Referring now to Figure 37, the start switch 25 is operated momentarily by the operator. This completes an obvious energizing circuit for the operating winding 426w of the control relay 426 between the energized conductors 421 and 427. At contacts 426c a holding circuit for the winding 426w is completed through the contacts of the tear limit switch 20. The start switch 25 can be immediately released and the control relay motor 26 remains energized.

At contacts 426a an obvious energizing circuit is completed for the operating winding 425w of the turret motor relay 425. This circuit extends between the energized conductors 421 and 427. Contacts 425a, 425b and 425c are closed to connect the turret motor 338 to the power source. At contacts 425d a holding circuit for the turret motor relay 425 is completed. This holding circuit extends through the contacts of the back limit switch 38 and normally closed contacts 27b of the turret motor jog switch 27 and is provided to insure that the turret 164 is rotated to the next position by the turret motor 38 in the event that the control relay 426 is deenergized as a result of the opening of the tear limit switch 20 caused by the loss of pressure in the casing 52, as when it becomes accidentally torn.

When the turret motor 338 is energized, it rotates the cam shaft 329 and the auxiliary cam shaft 32. The shirring cam 357 moves the shirring arm 42 forwardly to effect a corresponding forward movement of the associated mandrel yoke 177, mandrel 125 and compressor-doffer unit 187 as the shirring slide 197 is moved forwardly. The mandrel 125 is moved so that its forward end passes entirely through the shirring head 48. As yet the shirring head motor 24 has not been energized.

Now when the shirring lever 40, Figure 1, reaches the limit of its forward stroke, it engages the head limit switch 37 to complete an energizing circuit for the winding 424w of the head motor relay 424. This circuit may be traced from the energized conductor 427 through contacts 426b of the control relay 426 which now are closed, the contacts of the head limit switch 37, normally closed contacts 27c of the turret motor jog switch 27, winding 424w to energized conductor 421. The head motor 24 now is energized as a result of the closure of contacts 424a, 424b and 424c. At the same time at contacts 424d the energizing circuit for the brake solenoid 160 is opened and the latch 157, Figure 4, is permitted to fall for holding the brake lever 137 in the released position to which it is operated by the brake release cam 152 operated by the auxiliary cam shaft 32. The flat casing 49 on the reel 50 can be unwound therefrom by the measuring roll 14.

The shirring chains 64 are operated as described to cause the shirring dogs 62 to engage the outer surface of the inflated casing 52 and to move it along the mandrel 125 as it is fed by the measuring roll 14. The open end of the casing 52 engaged the ring 193, Figure 32, of the compressor doffer unit 187 and seals the same while air continues to be supplied through the central aperture 126 in the mandrel 125.

The mandrel 125 on which the casing is being shirred is moved rearwardly by the shirring cam 357 in the manner described while the associated compressor-doffer unit 187 likewise is moved rearwardly.

The casing 52 continues to be shirred onto the mandrel 125 as it retreats until the desired length has been shirred as measured by the measuring roll 14, and translated into rotation of the metering disc 17 to operate the measuring limit switch 18.

When the head motor relay 424 was energized it completed at contacts 424e a holding circuit for the winding 424w through the measuring limit switch 18. This circuit now is opened when the required length of casing has been shirred and the relay 424 is deenergized. The head motor 24 stops as a result. The casing now is clamped by the clamp member 278 and is thereafter severed by the knife blade 297 in the manner described.

As a result of the severing of the inflated casing 52 the normally closed tear limit switch 20 is opened. However, at this time the cam limit switch 34 is closed to shunt the contacts of the tear limit switch 20 and maintain the holding circuit for the winding 426w of the control relay 426 energized during the interval that the tear limit switch 20 is open as the result of the deflation of the casing. As soon as the next compressor-doffer unit 187 is moved through the shirring aperture 276 and into engagement with the end of the casing that previously had been held between the clamp members 278, the air pressure is again built up and the tear limit switch 20 is closed. Thereafter the cam limit switch 34 is opened on further rotation of the cam 33 on the auxiliary cam shaft 32 so that the control during the next interval is maintained by the tear limit switch 20. In the event that the inflated casing becomes torn and the air pressure is lost, the tear limit switch 20 is opened and the control relay 426 is deenergized.

In the event that the tear limit switch 20 should open as a result of a tear in the casing, the control relay 426 is deenergized as described. However, the turret motor relay 425 remains energized since the holding circuit for its energizing winding 425w is completed through the back limit switch 38 and the auxiliary contacts 425d of the turret motor delay 425. Assuming that the control relay 426 has been deenergized as a result of the operation of the tear limit switch 20, the holding circuit, just described, for the winding 425w will be maintained until the shirring lever 40 is returned to its initial rearmost position where it operates the back limit switch 38 to open the holding circuit. Thereupon the turret motor 338 is deenergized. This arrangement insures that the turret motor 338 will complete a cycle of operation.

Immediately upon the deenergization of the head motor relay 424 to terminate the shirring operation the energizing circuit for the brake solenoid 160 is completed through auxiliary contacts 424d of the head motor relay 424. The energization of the brake solenoid 160 lifts the latch 157 and permits the spring 147 to retract the brake release arm 145, Figure 11. This permits the brake lever 131 to move downwardly under the influence of gravity and the spring 140 to engage the brake wheel 143 and stop further rotation of the reel 50.

At the termination of the shirring operation the mandrel yoke 177 and the compressor-doffer unit 187 associated with the mandrel 125 on which the casing has just been shirred occupy the rearmost positions. Thereafter the turret shaft 165 is rotated in the manner described to advance the mandrel yoke 177, compressor-doffer unit 187 and associated mandrel 125 with the casing shirred thereon to the next position. The mandrel yoke 177 rides onto the mandrel yoke guide ring 264, Figure 18, and remains in engagement with this ring until the turret 164 is rotated through 360°.

The compressor-doffer unit 187 is guided by the guide plate 269, Figure 18, into engagement with the compressing slide 198 in the next position of the turret 164. Now, while the casing is being shirred onto the next mandrel 125 which has been positioned in the shirring head 48 in the manner described, the compressing slide 198 is moved forwardly to carry with it the compressor-doffer unit 187 while the associated mandrel 125 remains stationary. This forward movement of the compressor-doffer unit 187 compresses the shirred casing on the mandrel 125 against the rear side of the front slide plate 168.

Near the forward end of the stroke of the compressing slide 198, the compressor-doffer unit 187 associated therewith moves past the latch 157 and into registry with the inner edge 262 of the guide plates 259. Thereafter the turret 164 is rotated to the next position and it carries with it the compressor-doffer unit 187 which holds the shirred casing in the compressed position. The compressor-doffer unit 187 moves into engagement with the guide plate 259 and remains there while the turret 164 is rotated through 180°. This constitutes the holding cycle for the shirred casing and a time of the order of from five to ten seconds is obtained for effecting a more or less permanent set in the shirred casing. It will be understood that, as the compressor-doffer unit 187 is moved onto the guide plate 259, the mandrel 125 on which the casing has just been shirred is moved with the associated parts into the compressing position where the foregoing described cycle of operations is repeated.

The turret 164 is again rotated to bring the compressor-doffer unit 187 which has been holding the shirred casing during the holding position into the doffing position. Thereafter the doffing slide 199 is moved forwardly to engage this compressor-doffer unit 187, as previously described, for moving the same forwardly to strip the shirred, compressed and held casing from the mandrel 125 through the doffing aperture 275 in the front slide plate 168. The compressor-doffer unit 187 is retracted by the doffing slide 199 to the rearmost position, pausing meanwhile, as shown in Figure 32, to permit the application of a lubricant to the bristle brush 394 for lubricating the mandrel 125.

From what has been said it will be apparent that casings will be shirred automatically onto the mandrels 125 as they are presented successively to the shirring head 48. While a casing is being shirred onto one mandrel, the casing which has been shirred onto the preceding mandrel is being compressed, the casing which has been compressed on the next preceding mandrel is being held to permit it to set, and the casing on the next preceding mandrel which has been set is being doffed or stripped therefrom. This automatic operation results from a proper interrelationship between the various cams and limit switches which control the functioning of the various parts in the proper timed relationship. As long as a satisfactory casing 49 is available to the machine, it will continue to shirr, compress, hold and doff the casings in the manner described.

It will be understood that certain changes are required to be made in the diameter and length of the mandrels 125 for shirring different diameters and lengths of casing. Corresponding changes also are required to be made in the various cams and limit switches to conform to the different lengths of casing. As indicated hereinbefore, the machine can be set up to shirr forty foot lengths of casing. It can be adjusted and adapted for shirring shorter lengths such as thirty-two feet or even still shorter lengths. The casing of regenerated cellulose has a wall thickness of approximately .001 inch. Its diameter may vary from $22/32$ inch dry to $29/32$ depending upon the particular size that is being run. The machine may be adjusted to operate at a speed of about two hundred feet per minute, i. e. five 40 foot lengths of casing can be shirred per minute. These figures are set forth by way of illustration only, it being understood that the machine can be adjusted to operate at greater or lesser speeds and with other sizes of casings.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. In a machine for shirring sausage casings and the like having a mandrel and a shirring head in cooperative relation therewith for shirring said casings thereon, in combination, means in said machine for movably supporting said mandrel, and means operatively connected to said mandrel for moving it in the direction in which said casing is shirred simultaneously with the shirring operation.

2. In a machine for shirring sausage casings and the like having a shirring head adapted to shirr a casing onto a mandrel, in combination, means in said machine for starting said shirring head to shirr said casing onto said mandrel, means in said machine for cutting said casing, and means connecting said starting means with said cutting means to operate the latter a predetermined time after said shirring head starts to shirr said casing onto said mandrel.

3. In a machine for shirring sausage casings and the like having a mandrel and a shirring head in cooperative relation therewith for shirring said casings thereon, in combination, means in said machine for starting said shirring head to shirr said casing onto said mandrel, means in said machine for movably supporting said mandrel, means operatively connected to said mandrel for moving it in the direction in which said casing is shirred simultaneously with the shirring operation, means in said machine for cutting said casing, and means connecting said starting means with said cutting means to operate the latter a predetermined time after said shirring head starts to shirr said casing onto said mandrel.

4. In a machine for shirring sausage casings and the like having a mandrel and a shirring head in cooperative relation therewith for shirring said casings thereon, in combination, means in said machine for starting said shirring head to shirr said casing onto said mandrel, means in said machine for movably supporting said mandrel, means operatively connected to said mandrel for moving it in the direction in which said casing is shirred simultaneously with the shirring operation, a whisker, means mounting said whisker in said machine for movement toward said mandrel to cooperate therewith and provide a tensioned section of said casing, means in said machine for cutting said casing at said tensioned section thereof, and means connecting said starting means with said whisker and said cutting means to operate them a predetermined time after said shirring head starts to shirr said casing onto said mandrel.

5. In a machine for shirring sausage casings and the like having a mandrel and a shirring head in cooperative relation therewith for shirring said casings thereon, in combination, means in said machine for starting said shirring head to shirr said casing onto said mandrel, means in said machine for movably supporting said mandrel, means operatively connected to said mandrel for moving it in the direction in which said casing is shirred simultaneously with the shirring operation, a whisker, means mounting said whisker in said machine for movement toward said mandrel to cooperate therewith and provide a tensioned section of said casing, means in said machine for clamping said tensioned section of said casing, means in said machine for cutting said casing at said tensioned section thereof adjacent said clamping means, and means connecting said starting means with said whisker, said clamping means and said cutting means to operate them a predetermined time after said shirring head starts to shirr said casing onto said mandrel.

6. In a machine for shirring sausage casings and the like having a mandrel and a shirring head in cooperative relation therewith for shirring said casings thereon, in combination, means in said machine for movably supporting said mandrel, and means operatively connected to said mandrel to move it through said shirring head prior to the beginning of the shirring operation and for withdrawing it from said shirring head as said casing is shirred thereon at the speed that the shirring is accomplished.

7. In a machine for shirring sausage casings and the like having a mandrel and a shirring head in cooperative relation therewith for shirring said casings thereon, in combination, means in said machine for starting said shirring head to shirr said casing onto said mandrel, means in said machine for movably supporting said mandrel, means operatively connected to said mandrel to move it through said shirring head prior to the beginning of the shirring operation and for withdrawing it from said shirring head as said casing is shirred thereon at the speed that the shirring is accomplished, means in said machine for cutting said casing, and means connecting said starting means with said cutting means to operate the latter a predetermined time after said shirring head starts to shirr said casing onto said mandrel.

8. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means for movably supporting said mandrel in said machine with the air passing therethrough, and means operatively connected to said mandrel for moving it in the direction in which said casing is shirred simultaneously with the shirring operation.

9. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for starting said shirring head to shirr said casing onto said mandrel, means for movably supporting said mandrel in said machine with the air passing therethrough, means operatively connected to said mandrel for moving it in the direction in which the casing is shirred simultaneously with the shirring operation, means in said machine for clamping the inflated casing between the shirring head and the mandrel when the latter has been withdrawn from the former, means in said machine for severing said casing adjacent said clamping means, and means connecting said starting means with said clamping means and said severing means for operating the same a predetermined time after said shirring head starts to shirr said casing onto said mandrel.

10. In a machine for shirring sausage casings and the like having a hollow mandrel, a shirring head in cooperative relation therewith for shirring said casings thereon, and means for suplying air under pressure through said hollow mandrel to inflate the casing during the shirring operation, in combination, means in said machine for clamping said inflated casing at the rear of said shirring head, means for movably supporting said mandrel in said machine with the air passing therethrough, means operatively connected to said mandrel to move it through said clamp means and shirring head prior to the beginning of the shirring operation and for withdrawing it therefrom at the speed that the shirring is accomplished, means operatively interconnecting said mandrel and said clamp means for opening the latter when the former is moved to a predetermined position relative to said shirring head, means in said machine for starting said shirring head to shirr said casing onto said mandrel when the latter is in said predetermined position, means in said machine for severing said casing adjacent said clamp means, and means connecting said starting means with said clamping means and said severing means for closing the former and operating the latter a predetermined time after said shirring head starts to shirr said casing onto said mandrel.

11. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for clamping said inflated casing at the rear of said shirring head, means for movably supporting said mandrel in said machine with the air passing therethrough, means operatively connected to said mandrel to move it through said clamp means and shirring head prior to the beginning of the shirring operation and for withdrawing it therefrom at the speed that the shirring is accomplished, means operatively interconnecting said mandrel and said clamp means for opening the latter when the former is moved to a predetermined position relative to said shirring head, means in said machine for starting said shirring head to shirr said casing onto said mandrel when the latter is in said predetermined position, a whisker, means mounting said whisker in said machine for movement toward said mandrel to cooperate therewith and provide a tensioned section of said casing, means in said machine for severing said casing at said tensioned section thereof, and means connecting said starting means with said whisker, said clamping means and said severing means to operate the same and close said clamp means onto said tensioned section a predetermined time after said shirring head starts to shirr said casing onto said mandrel.

12. In a machine for shirring sausage casings and the like having a mandrel and a shirring head in cooperative relation therewith for shirring casings thereon, in combination, means in said machine for supporting said mandrel for both axial and transverse movement, means operatively connected to said mandrel for moving it axially in the direction in which said casing is shirred during the shirring operation, means operatively connected to said mandrel for moving the same with said shirred casing thereon transversely away from said shirring head, means in said machine for compressing said shirred casing on said mandrel, and means in said machine for doffing said shirred and compressed casing from said mandrel.

13. In a machine for shirring sausage casings and the like having a mandrel and a shirring head in cooperative relation therewith for shirring casings thereon, in combination, means in said machine for supporting said mandrel for both axial and transverse movement, means operatively connected to said mandrel for moving it axially in the direction in which said casing is shirred during the shirring operation, means operatively connected to said mandrel for moving the same with said shirred casing thereon transversely away from said shirring head, means in said machine for compressing said shirred casing on said mandrel, means in said machine for holding said shirred and compressed casing in compressed condition to permit the same to set, and means in said machine for doffing said set casing from said mandrel.

14. In a machine for shirring sausage casings and the like having a mandrel and a shirring head in cooperative relation therewith for shirring casings thereon, in combination, means in said machine for supporting said mandrel for both axial and lateral movement, means operatively connected to said mandrel for moving it along its longitudinal axis through said shirring head for receiving the shirred casing thereon, means operatively connected to said mandrel for sequentially moving the same with said shirred casing thereon laterally away from said shirring head to compressing and doffing positions, means in said machine for compressing said shirred casing in said compressing position, and means in said machine for doffing said shirred and compressed casing in said doffing position.

15. In a machine for shirring sausage casings and the like having a mandrel and a shirring head in cooperative relation therewith for shirring casings thereon, in combination, means in said machine for supporting said mandrel for both axial and lateral movement, means operatively connected to said mandrel for moving it along its longitudinal axis through said shirring head for receiving the shirred casing thereon, means operatively connected to said mandrel for sequentially moving the same with said shirred casing thereon laterally away from said shirring head to compressing, holding and doffing positions, means in said machine for compressing said shirred casing in said compressing position, means in said machine for holding said compressed casing in said holding position to permit the same to set, and means in said machine for doffing said set casing from said mandrel in said doffing position.

16. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for starting said shirring head to shirr said casing onto said mandrel, means for movably supporting said mandrel in said machine with the air passing therethrough, means operatively connected to said mandrel for moving it in the direction in which the casing is shirred simultaneously with the shirring operation, means in said machine for severing said casing, means connecting said starting means with said severing means for operating the same a predetermined time after said shirring head starts to shirr said casing onto said mandrel, means operatively connected to said mandrel for moving it with said shirred casing thereon transversely away from said shirring head, means in said machine for compressing said shirred casing on said mandrel, and means in said machine for doffing said shirred and compressed casing from said mandrel.

17. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for clamping said inflated casing at the rear of said shirring head, means for movably supporting said mandrel in said machine with the air passing therethrough, means operatively connected to said mandrel to move it through said clamp means and shirring head prior to the beginning of the shirring operation and for withdrawing it therefrom at the speed that the shirring is accomplished, means operatively interconnecting said mandrel and said clamp means for opening the latter when the former is moved to a predetermined position relative to said shirring head, means in said machine for starting said shirring head to shirr said casing onto said mandrel when the latter is in said predetermined position, means in said machine for severing said casing adjacent said clamp means, means connecting said starting means with said clamping means and said severing means for closing the former and operating the latter a predetermined time after said shirring head starts to shirr said casing onto said mandrel, means operatively connected to said mandrel for moving it with said shirred casing thereon transversely away from said shirring head, means in said machine for compressing said shirred casing on said mandrel, and means in said machine for doffing said shirred and compressed casing from said mandrel.

18. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for clamping said inflated casing at the rear of said shirring head, means for movably supporting said mandrel in said machine with the air passing therethrough, means operatively connected to said mandrel to move it through said clamp means and shirring head prior to the beginning of the shirring operation and for withdrawing it therefrom at the speed that the shirring is accomplished, means operatively interconnecting said mandrel and said clamp means for opening the latter when the former is moved to a predetermined position relative to said shirring head, means in said machine for starting said shirring head to shirr said casing onto said mandrel when the latter is in said predetermined position, a whisker, means mounting said whisker in said machine for movement toward said mandrel to cooperate therewith and provide a tensioned section of said casing, means in said machine for severing said casing at said tensioned section thereof, means connecting said starting means with said whisker, said clamping means and said severing means to operate the same and close said clamp means onto said tensioned section a predetermined time after said shirring head starts to shirr said casing onto said mandrel, means operatively connected to said mandrel for moving it with said shirred casing thereon transversely away from said shirring head, means in said machine for compressing said shirred casing on said mandrel, and means in said machine for doffing said shirred and compressed casing from said mandrel.

19. In a machine for shirring sausage casings and the like having a hollow mandrel, a shirring head in cooperation relation therewith for shirring said casings thereon, and means for supplying air under pressure through said hollow mandrel to inflate the casing during the shirring operation, in combination, means in said machine for starting said shirring head to shirr said casing onto said mandrel, means for movably supporting said mandrel in said machine with the air passing therethrough, means operatively connected to said mandrel for moving it in the direction in which the casing is shirred simultaneously with the shirring operation, means in said machine for severing said casing, means connecting said starting means with said severing means for operating the same a predetermined time after said shirring head starts to shirr said casing onto said mandrel, means operatively connected to said mandrel for sequentially moving the same with said shirred casing thereon laterally away from said shirring head to compressing and doffing positions, means in said machine for compressing said shirred casing in said compressing position, and means in said machine for doffing said shirred and compressed casing in said doffing position.

20. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for clamping said inflated casing at the rear of said shirring head, means for movably supporting said mandrel in said machine with the air passing therethrough, means operatively connected to said mandrel to move it through said clamp means and shirring head prior to the beginning of the shirring operation and for withdrawing it therefrom at the speed that the shirring is accomplished, means operatively interconnecting said mandrel and said clamp means for opening the latter when the former is moved to a predetermined position relative to said shirring head, means in said machine for starting said shirring head to shirr said casing onto said mandrel when the latter is in said predetermined position, means in said machine for severing said casing adjacent said clamp means, means connecting said starting means with said clamping means and said severing means for closing the former and operating the latter a predetermined time after said shirring head starts to shirr said casing onto said mandrel, means operatively connected to said mandrel for sequentially moving the same with said shirred casing thereon laterally away from said shirring head to compressing and doffing positions, and means in said machine for doffing said shirred and compressed casing in said doffing position.

21. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for clamping said inflated casing at the rear of said shirring head, means for movably supporting said mandrel in said machine with the air passing therethrough, means operatively connected to said mandrel to move it through said clamp means and shirring head prior to the beginning of the shirring operation and for withdrawing it therefrom at the speed that the shirring is accomplished, means operatively interconnecting said mandrel and said clamp means for opening the latter when the former is moved to a predetermined position relative to said shirring head, means in said machine for starting said shirring head to shirr said casing onto said mandrel when the latter is in said predetermined position, a whisker, means mounting said whisker in said machine for movement toward said mandrel to cooperate therewith and provide a tensioned section of said casing, means in said machine for severing said casing at said tensioned section thereof, means connecting said starting means with said whisker, said clamping means and said severing means to operate the same and close said clamp means onto said tensioned section a predetermined time after said shirring head starts to shirr said casing onto said mandrel, means operatively connected to said mandrel for sequentially moving the same with said shirred casing thereon laterally away from said shirring head to compressing and doffing positions, means in said machine for compressing said shirred casing in said compressing position, and means in said machine for doffing said shirred and compressed casing in said doffing position.

22. In a machine for shirring sausage casings and the like, in combination, a shirring head in said machine, a plurality of mandrels, means movably supporting said mandrels in said machine, and means operatively connected to said mandrels for sequentially moving them into and out of operative relation with said shirring head to permit the same to shirr lengths of casing thereon one by one while a casing previously shirred on a mandrel previously placed in operative relation to said shirring head is compressed thereon and while a casing previously shirred and compressed on another mandrel is doffed therefrom.

23. In a machine for shirring sausage casings and the like, in combination, a shirring head in said machine, a plurality of mandrels, means movably supporting said mandrels in said machine, means operatively connected to said mandrels for sequentially moving them into and out of operative relation with said shirring head to permit the same to shirr lengths of casing thereon one by one while a casing previously shirred on a mandrel previously placed in operative relation to said shirring head is compressed thereon and while a casing previously shirred and compressed on another mandrel is doffed therefrom, and control means for said shirring head responsive to the movement of a mandrel to operative position for effecting the operation of said shirring head only when a mandrel is moving out of its operative relation therewith.

24. In a machine for shirring sausage casings and the like, in combination, a shirring head in said machine, a plurality of mandrels, means movably supporting said mandrels in said machine, means operatively connected to said mandrels for sequentially moving them into and out of operative relation with said shirring head to permit the same to shirr lengths of casing thereon one by one while a casing previously shirred on a mandrel previously placed in operative relation to said shirring head is compressed thereon and while a casing previously shirred and compressed on another mandrel is doffed therefrom, means in said machine for starting said shirring head to shirr said casing onto a mandrel, means in said machine for severing said casing, and means connecting said starting means with said severing means to operate the latter a predetermined time after said shirring head starts to shirr said casing onto a mandrel.

25. In a machine for shirring sausage casings and the like, in combination, a shirring head in said machine, means in said machine for intermittently operating said shirring head, a plurality of hollow mandrels, means mounting said mandrels in said machine for longitudinal movement and transverse movement, means operatively connected to said mandrels for sequentially moving them longitudinally into and out of operative position with respect to said shirring head and transversely away therefrom one by one while a casing previously shirred on a mandrel previously placed in operative relation to said shirring head is compressed thereon and while a casing previously shirred and compressed on another mandrel is doffed therefrom, means for supplying air under pressure through each hollow mandrel while the same is being moved longitudinally to inflate the casing being shirred thereon, and means operable in response to the movement of a mandrel into shirring position in said shirring head for initiating the operation thereof.

26. In a machine for shirring sausage casings and the like, in combination, a shirring head in said machine, means in said machine for intermittently operating said shirring head, a plurality of mandrels, means mounting said mandrels in said machine for longitudinal movement and transverse movement to shirring, compressing and doffing positions, means in said machine for moving one mandrel longitudinally into said shirring head between operations thereof and for withdrawing it therefrom as said casing is shirred thereon while the other mandrels remain stationary, means in said machine for compressing a shirred casing on the mandrel in said compressing position while said shirring operation is being performed, means in said machine for doffing a shirred and compressed casing from the mandrel in said doffing position while said shirring and compressing operations are being performed; means in said machine for moving said mandrels transversely between operations of said shirring head to position the mandrel from which the casing has been doffed in said shirring position, the mandrel on which the casing has been shirred in said compressing position, and the mandrel on which the casing has been compressed in said doffing position; and means operable in response to the movement of a mandrel into shirring position in said shirring head for initiating the operation thereof.

27. In a machine for shirring sausage casings and the like, in combination, a shirring head in said machine, means in said machine for intermittently operating said shirring head, a plurality of mandrels, means mounting said mandrels in said machine for longitudinal movement and transverse movement to shirring, compressing, holding and doffing positions, means in said machine for moving one mandrel longitudinally into said shirring head between operations thereof and for withdrawing it therefrom as said casing is shirred thereon while the other mandrels remain stationary, means in said machine for compressing a shirred casing on the mandrel in said compressing position while said shirring operation is being performed, means in said machine for holding a compressed casing on the mandrel in said holding position while said shirring and compressing operations are being performed, means in said machine for doffing a shirred, compressed and held casing from the mandrel in said doffing position while said shirring, compressing and holding operations are being performed; means in said machine for moving said mandrels transversely between operations of said shirring head to position the mandrel from which the casing has been doffed in said shirring position, the mandrel on which the casing has been shirred in said compressing position, the mandrel on which the casing has been compressed in said holding position, and the mandrel on which the casing has been held in said doffing position; and means operable in response to the movement of a mandrel into shirring position in said shirring head for initiating the operation thereof.

28. In a machine for shirring sausage casings and the like, in combination, a shirring head in said machine, means in said machine for intermittently operating said shirring head, means in said machine for clamping the casing at the rear of said shirring head, means in said machine for severing the casing adjacent said clamping means, a plurality of hollow mandrels; means mounting said mandrels in said machine for longitudinal movement and transverse movement to shirring, compressing and doffing positions; means in said machine for moving one mandrel longitudinally into the casing as held by said clamping means and into said shirring head between operations thereof and for withdrawing it therefrom as the casing is shirred thereon while the other mandrels remain stationary, means for supplying air under pressure through each hollow mandrel while the same is being moved longitudinally to inflate the casing being shirred thereon, means in said machine for compressing a shirred casing on the mandrel in said compressing position while said shirring operation is being performed, means in said machine for doffing a shirred and compressed casing from the mandrel in said doffing position while said shirring and compressing operations are being performed; means in said machine for moving said mandrels transversely between operations of said shirring head to position the mandrel from which the casing has been doffed in said shirring position, the mandrel on which the casing has been shirred in said compressing position, and the mandrel on which the casing has been compressed in said doffing position; and means operable in response to the movement of a mandrel into shirring position in said shirring head for initating the operation thereof and opening said clamping means and a predetermined time thereafter closing said clamping means and operating said severing means.

29. In a machine for shirring sausage casings and the like, in combination, a shirring head in said machine, means in said machine for intermittently operating said shirring head, means in said machine for clamping the casing at the rear of said shirring head, means in said machine for severing the casing adjacent said clamping means, a plurality of hollow mandrels; means mounting said mandrels in said machine for longitudinal movement and transverse movement to shirring, compressing and doffing positions; means in said machine for moving one mandrel longitudinally into the casing as held by said clamping means and into said shirring head between operations thereof and for withdrawing it therefrom as the casing is shirred thereon while the other mandrels remain stationary, means for supplying air under pressure through each hollow mandrel while the same is being moved longitudinally to inflate the casing being shirred thereon, a whisker, means mounting said whisker in said machine for movement toward and away from the mandrel in said shirring position to cooperate therewith on withdrawal thereof from said shirring head and closure of said clamping means to hold the casing against the mandrel while it completes its withdrawal movement to provide a tensioned casing section extending from said clamping means, means in said machine for compressing a shirred casing on the mandrel in said compressing position while said shirring operation is being performed, means in said machine for doffing a shirred and compressed casing from the mandrel in said doffing position while said shirring and compressing operations are being performed; means in said machine for moving said mandrels transversely between operations of said shirring head to position the mandrel from which the casing has been doffed in said shirring position, the mandrel on which the casing has been shirred in said compressing position, and the mandrel on which the casing has been compressed in said doffing position; and means operable in response to the movement of a mandrel into shirring position in said shirring head for initiating the operation thereof and opening said clamping means and a predetermined time thereafter closing said clamping means and operating said whisker and said severing means to cut the casing at said tensioned section.

30. In a machine for shirring sausage casings and the like, in combination, a shirring head in said machine, means in said machine for intermittently operating said shirring head, means in said machine for clamping the casing at the rear of said shirring head, means in said machine for severing the casing adjacent said clamping means, a plurality of hollow mandrels; means mounting said mandrels in said machine for longitudinal movement and transverse movement to shirring, compressing, holding and doffing positions; means in said machine for moving one mandrel longitudinally into the casing as held by said clamping means and into said shirring head between operations thereof and for withdrawing it therefrom as the casing is shirred thereon while the other mandrels remain stationary, means for supplying air under pressure through each hollow mandrel while the same is being moved longitudinally to inflate the casing being shirred thereon, means in said machine for compressing a shirred casing on the mandrel in said compressing position while said shirring operation is being performed, means in said machine for holding a compressed casing on the mandrel in said holding position while said shirring and compressing operations are being performed, means in said machine for doffing a shirred, compressed and held casing from the mandrel in said doffing position while said shirring, compressing, and holding operations are being performed; means in said machine for moving said mandrels transversely between operations of said shirring head to position the mandrel from which the casing has been doffed in said shirring position, the mandrel on which the casing has been shirred in said compressing position, the mandrel on which the casing has been compressed in said holding position, and the mandrel on which the casing has been held in said doffing position; means in said machine cooperating with the mandrels in said compressing, holding and doffing positions for preventing longitudinal movement thereof, and means operable in response to the movement of a mandrel into shirring position in said shirring head for initiating the operation thereof and opening said clamping means and a predetermined time thereafter closing said clamping means and operating said severing means.

31. In a machine for shirring sausage casings and the like, in combination, a shirring head in said machine, means in said machine for intermittently operating said shirring head, means in said machine for clamping the casing at the rear of said shirring head, means in said machine for severing the casing adjacent said clamping means, a plurality of hollow mandrels; means mounting said mandrels in said machine for longitudinal movement and transverse movement to shirring, compressing, holding and doffing positions; means in said machine for moving one mandrel longitudinally into the casing as held by said clamping means and into said shirring head between operations thereof and for withdrawing it therefrom as the casing is shirred thereon while the other mandrels remain stationary, means for supplying air under pressure through each hollow mandrel while the same is being moved longitudinally to inflate the casing being shirred thereon, a whisker, means mounting said whisker in said machine for movement toward and away from the mandrel in said shirring position to cooperate therewith on withdrawal thereof from said shirring head and closure of said clamping means to hold the casing against the mandrel while it completes its withdrawal movement to provide a tensioned casing section extending from said clamping means, means in said machine for compressing a shirred casing on the mandrel in said compressing position while said shirring operation is being performed, means in said machine for holding a compressed casing on the mandrel in said holding position while said shirring and compressing operations are being performed, means in said machine for doffing a shirred, compressed and held casing from the mandrel in said doffing position while said shirring, compressing and holding operations are being performed; means in said machine for moving said mandrels transversely between operations of said shirring head to position the mandrel from which the casing has been doffed in said shirring position, the mandrel on which the casing has been shirred in said compressing position, the mandrel on which the casing has been compressed in said holding position, and the mandrel on which the casing has been held in said doffing position; means in said machine cooperating with the mandrels in said compressing, holding and doffing positions for preventing longitudinal movement thereof, and means operable in response to the movement of a mandrel into shirring position in said shirring head for initiating the operation thereof and opening said clamping means and a predetermined time thereafter closing said clamping means and operating said whisker and said severing means to cut the casing at said tensioned section.

32. In an automatic machine for shirring sausage casings and the like, in combination, a turret, means rotatably supporting said turret in said machine, a plurality of mandrels carried by said turret, a shirring head in said machine for shirring the casing onto said mandrels, and means operatively connected to said turret for rotating the same to present said mandrels successively to said shirring head one by one while a casing previously shirred on a previously presented mandrel is compressed thereon and while a casing previously shirred and compressed on another mandrel is doffed therefrom.

33. In an automatic machine for shirring sausage casings and the like, in combination, a turret, means rotatably supporting said turret in said machine, a plurality of hollow mandrels carried by said turret, a shirring head in said machine for shirring the casing onto said mandrels, means for supplying air under pressure through the mandrel on which the casing is being shirred to inflate the same, means in said machine for starting said shirring head to shirr the casing onto a mandrel, means in said machine for severing the casing, means connecting said starting means with said severing means to operate the same a predetermined time after said shirring head starts to shirr the casing onto a mandrel, and means operatively connected to said turret for rotating the same to present said mandrels successively to said shirring head.

34. In an automatic machine for shirring sausage casings and the like, in combination, a turret, means rotatably supporting said turret in said machine, a plurality of hollow mandrels carried by said turret, a shirring head in said machine for shirring the casing onto said mandrels, means for supplying air under pressure through the mandrel on which the casing is being shirred to inflate the same, means in said machine for starting said shirring head to shirr the casing onto a mandrel, means in said machine for clamping the inflated casing between said shirring head and said turret, means in said machine for severing the casing adjacent said clamping means on the side away from said shirring head, means connecting said starting means with said clamping and severing means to operate the same a predetermined time after said shirring head starts to shirr the casing onto a mandrel, and means operatively connected to said turret for rotating the same to present said mandrels successively to said shirring head.

35. In an automatic machine for shirring sausage casings and the like, in combination, a turret, means rotatably supporting said turret in said machine, a plurality of hollow mandrels carried by said turret, a shirring head in said machine for shirring the casing onto said mandrels, means for supplying air under pressure through the mandrel on which the casing is being shirred to inflate the same, means in said machine for starting said shirring head to shirr the casing onto a mandrel, means in said machine for clamping the inflated casing between said shirring head and said turret, means in said machine for severing the casing adjacent said clamping means on the side away from said shirring head, means connecting said starting means with said clamping and severing means to operate the same a predetermined time after said shirring head starts to shirr the casing onto a mandrel, means operatively connected to said turret for rotating the same to present said mandrels successively to said shirring head, means in said machine for locking said turret in each operative position where a mandrel registers with said shirring head, and means in said machine for releasing said locking means prior to rotating said turret.

36. In an automatic machine for shirring sausage casings and the like, in combination, a turret, means rotatably supporting said turret in said machine, a plurality of hollow mandrels carried by said turret, a shirring head in said machine for shirring the casing onto said mandrels, means for supplying air under pressure through the mandrel on which the casing is being shirred to inflate the same, means in said machine for starting said shirring head to shirr the casing onto a mandrel, means in said machine for clamping the inflated casing between said shirring head and said turret, means in said machine for moving the mandrel with the air passing therethrough into the casing as held by said shirring head and said clamping means prior to the beginning of the shirring operation and for withdrawing it from said shirring head at the speed that the shirring is accomplished, means in said machine for opening said clamping means when the last mentioned mandrel reaches a predetermined position in its forward movement, means in said machine for severing the casing adjacent said clamping means on the side away from said shirring head, means connecting said starting means with said clamping and severing means to operate the same a predetermined time after said shirring head starts to shirr the casing onto a mandrel, and means operatively connected to said turret for rotating the same to present said mandrels successively to said shirring head.

37. In an automatic machine for shirring sausage casings and the like, in combination, a turret, means rotatably supporting said turret in said machine, a plurality of hollow mandrels carried by said turret, a shirring head in said machine for shirring the casing onto said mandrels, means for supplying air under pressure through the mandrel on which the casing is being shirred to inflate the same, means in said machine for starting said shirring head to shirr the casing onto a mandrel, means in said machine for clamping the inflated casing between said shirring head and said turret, means in said machine for moving the mandrel with the air passing therethrough into the casing as held by said shirring head and said clamping means prior to the beginning of the shirring operation and for withdrawing it from said shirring head at the speed that the shirring is accomplished, a whisker, means mounting said whisker in said machine for movement toward the last mentioned mandrel to cooperate therewith on withdrawal thereof from said shirring head and closure of said clamping means to hold the casing against the mandrel while it completes its withdrawal to provide a tensioned casing section extending from said clamping means, means in said machine for opening said clamping means when the last mentioned mandrel reaches a predetermined position in its forward movement, means in said machine for severing the casing adjacent said clamping means in said tensioned section thereof, means connecting said starting means with said clamping and severing means and said whisker to operate the same a predetermined time after said shirring head starts to shirr the casing onto a mandrel, and means operatively connected to said turret for rotating the same to present said mandrels successively to said shirring head.

38. In an automatic machine for shirring sausage casings and the like, in combination, a turret, means rotatably supporting said turret in said machine, a plurality of mandrels carried by said turret, a shirring head in said machine for shirring the casing onto said mandrels, a compressor in said machine for compressing the shirred casing on the mandrels, a doffer in said machine for stripping the shirred and compressed casing from the mandrels, and means operatively connected to said turret for rotating the same to present said mandrels successively to said shirring head, compressor and doffer.

39. In an automatic machine for shirring sausage casings and the like, in combination, a turret, means rotatably supporting said turret in said machine, a plurality of mandrels carried by said turret, a shirring head in said machine for shirring the casing onto said mandrels, a compressor in said machine for compressing the shirred casing on the mandrels, a holder in said machine for holding the shirred and compressed casing in compressed condition to allow the same to set, a doffer in said machine for stripping the shirred and compressed and set casing from the mandrels, and means operatively connected to said turret for rotating the same to present said mandrels successively to said shirring head, compressor, holder and doffer.

40. In an automatic machine for shirring sausage casings and the like, in combination, a turret, means rotatably supporting said turret in said machine, a plurality of hollow mandrels carried by said turret, a shirring head in said machine for shirring the casing onto said mandrels, means in said machine for starting said shirring head to shirr the casing onto a mandrel, means for supplying air under pressure through the mandrel on which the casing is being shirred to inflate the same, means in said machine for severing the inflated casing, means connecting said starting means with said severing means to operate the same a predetermined time after said shirring head starts to shirr the casing onto a mandrel, a compressor in said machine for compressing the shirred casing on the mandrels, a doffer in said machine for stripping the shirred and compressed casing from the mandrels, and means operatively connected to said turret for rotating the same to present said mandrels successively to said shirring head, compressor and doffer.

41. In an automatic machine for shirring sausage casings and the like, in combination, a turret, means rotatably supporting said turret in said machine, a plurality of hollow mandrels carried by said turret, a shirring head in said machine for shirring the casing onto said mandrels, means in said machine for starting said shirring head to shirr the casing onto a mandrel, means for supplying air under pressure through the mandrel on which the casing is being shirred to inflate the same, means in said machine for clamping the inflated casing between said shirring head and said turret, means in said machine for severing the inflated casing adjacent said clamping means, means connecting said starting means with said clamping and severing means to operate the same a predetermined time after said shirring head starts to shirr the casing onto a mandrel, a compressor in said machine for compressing the shirred casing on the mandrels, a doffer in said machine for stripping the shirred and compressed casing from the mandrels, and means operatively connected to said turret for rotating the same to present said mandrels successively to said shirring head, compressor and doffer.

42. In an automatic machine for shirring sausage casings and the like, in combination, a turret, means rotatably mounting said turret in said machine, a plurality of hollow mandrels longitudinally slidably mounted on said turret, a shirring head in said machine for shirring the casing onto said mandrels, means for supplying air under pressure through the mandrel on which the casing is being shirred to inflate the same, means in said machine for starting said shirring head to shirr the casing onto a mandrel, means in said machine for clamping the inflated casing between said shirring head and said turret, means in said machine for moving the mandrel with the air passing therethrough into the casing as held by said shirring head and said clamping means prior to the beginning of the shirring operation and for withdrawing it from said shirring head at the speed that the shirring is accomplished, means in said machine for opening said clamping means when the last mentioned mandrel reaches a predetermined position in its forward movement, means in said machine for severing the casing adjacent said clamping means on the side away from said shirring head, means connecting said starting means with said clamping and severing means to operate the same a predetermined time after said shirring head starts to shirr the casing onto a mandrel, a compressor in said machine for compressing the shirred casing on the mandrels, a doffer in said machine for stripping the shirred and compressed casing from the mandrels, and means operatively connected to said turret for rotating the same to present said mandrels successively to said shirring head, compressor and doffer.

43. In an automatic machine for shirring sausage casings and the like, in combination, a turret, means rotatably mounting said turret in said machine, a plurality of hollow mandrels longitudinally slidably mounted on said turret, a shirring head in said machine for shirring the casing onto said mandrels, means for supplying air under pressure through the mandrel on which the casing is being shirred to inflate the same, means in said machine for starting said shirring head to shirr the casing onto a mandrel, means in said machine for clamping the inflated casing between said shirring head and said turret, means in said machine for moving the mandrel with the air passing therethrough into the casing as held by said shirring head and said clamping means prior to the beginning of the shirring operation and for withdrawing it from said shirring head at the speed that the shirring is accomplished, a whisker, means mounting said whisker in said machine for movement toward the last mentioned mandrel to cooperate therewith on withdrawal thereof from said shirring head and closure of said clamping means to hold the casing against the mandrel while it completes its withdrawal to provide a tensioned casing section extending from said clamping means, means in said machine for opening said clamping means when the last mentioned mandrel reaches a predetermined position in its forward movement, means in said machine for severing the casing adjacent said clamping means in said tensioned section thereof, means connecting said starting means with said clamping and severing means and said whisker to operate the same a predetermined time after said shirring head starts to shirr the casing onto a mandrel, a compressor in said machine for compressing the shirred casing on the mandrels, a doffer in said machine for stripping the shirred and compressed casing from the mandrels, and means operatively connected to said turret for rotating the same to present said mandrels successively to said shirring head, compressor and doffer.

44. In an automatic machine for shirring sausage casings and the like, in combination, a rotatably mounted horizontally extending turret shaft in said machine, a pair of turret plates fixed to said turret shaft in parallel spaced relation, four pairs of pilot shafts slidably mounted in said turret plates, four mandrel pilot shafts slidably mounted in said turret plates each between a pair of pilot shafts, a mandrel yoke secured to each mandrel pilot shaft near its forward end and guided on said turret shaft, a mandrel extending axially from the forward end of each mandrel pilot shaft, a compressor-doffer unit secured to each pair of pilot shafts and ahead of the corresponding yoke for compressing and doffing the casing shirred on the associated mandrel, front and back plates stationarily mounted along said turret shaft, said front plate having a shirring aperture and a doffing aperture registering with adjacent mandrels, a shirring head adjacent said shirring aperture for shirring the casing onto a mandrel extending therethrough, three pairs of slide bars extending between said front and back plates; shirring, compressing and doffing slides slidably mounted on said pairs of slide bars respectively; means in said machine for severing the casing near the rear end of said shirring head, means for rotating said turret shaft to position two of said mandrels in registry with said shirring and doffing apertures respectively; a shirring arm attached to said shirring slide for moving the same forwardly together with the associated mandrel pilot shaft, mandrel yoke, mandrel, compressor-doffer unit and pilot shafts to position the mandrel through said shirring aperture into said shirring head for receiving the casing shirred thereon by said shirring head against the forward end of said compressor-doffer unit and for withdrawing the same as the shirring operation is accomplished; a mandrel ring guide located at the limit of rearward travel of the said mandrel yokes for cooperating therewith to hold the same and said mandrels in the rearward position as they are moved transversely with said turret shaft away from and back to the shirring position, a compressing arm attached to said compressing slide for moving the same forwardly together with the associated compressor-doffer unit and pilot shafts to compress the casing shirred on the associated mandrel against the rear side of said front plate and for withdrawing said shirring slide after the compressing operation has been performed, a forward guide located at the limit of forward travel of said compressor-doffer units as controlled by said compressing arm for cooperating therewith to hold the same in position on rotation of said turret shaft with the shirred and compressed casing between its forward end and said rear surface of said front plate to permit the casing to set, a doffing arm attached to said doffing slide for moving the same forwardly to pick up the associated compressor-doffer unit and pilot shafts for moving the same forwardly relative to the associated mandrel for doffing the set casing through said doffing aperture and for withdrawing the same after the doffing operation has been performed, and means in said machine for operating said casing severing means and said arms in synchronism with the operation of said shirring head.

45. The invention, as set forth in claim 44, wherein locking means are provided for locking the turret shaft and parts movable therewith in each of the four operating positions thereof, and means are provided for unlocking said locking means prior to rotation of said turret shaft to the next position.

46. The invention, as set forth in claim 44, wherein each of the mandrels has a passageway extending therethrough, the shirring slide is connected to a source of air pressure, and the mandrel with which said shirring slide is associated is placed in communication with said source of air pressure to cause air under pressure to flow through said passageway to inflate the casing during the shirring operation.

47. The invention, as set forth in claim 46, wherein the forward end of the compressor-doffer unit in the shirring position is moved through the shirring aperture in the front plate and against the end of the unshirred casing thereby sealing off the same to permit pressure to build up within the casing.

48. The invention, as set forth in claim 47, wherein a pair of clamping members are mounted on the front plate for engaging the casing to hold the same while it is being severed and in position for receiving the next mandrel onto which it is to be shirred.

49. The invention, as set forth in claim 48, wherein positively continuously driven cams individual to the casing severing means, turret shaft rotating means, shirring arm, compressing arm, doffing arm and clamping members control the functioning thereof in predetermined timed relationship.

50. The invention, as set forth in claim 49, wherein the severing means comprises a knife mounted on the front plate to sever the casing on the side of the clamping means away from the shirring head.

51. The invention, as set forth in claim 50, wherein a whisker shaft is slidably and rockably mounted by the front and back plates, a whisker carried by said shaft is arranged to hold the casing against the mandrel on which it is being shirred while said mandrel is completing its withdrawal movement to provide a tensioned casing section extending from the clamping means to facilitate severing thereof by the knife, cam means are provided for rocking said shaft to move said whisker into engagement with the casing as aforesaid, and an arm extends from the shirring slide for controlling the position of said whisker shaft and thereby of said whisker in accordance with the position of said shirring slide.

52. The invention, as set forth in claim 44, wherein a pair of rear guides are provided adjacent and in front of the mandrel ring guide for guiding the compressor-doffer units from their rearmost locations in the doffing and shirring positions to their corresponding respective locations in the shirring and compressing positions.

53. The invention, as set forth in claim 52, wherein the mandrel ring guide, the forward guide and the rear guides are in the form of arcuate plates, each mandrel yoke has an arcuate slot for interfitting with said mandrel ring guide, and each compressor-doffer unit has an arcuate slot for interfitting with said forward and rear guides.

54. The invention, as set forth in claim 44, wherein means are provided in the machine for lubricating each mandrel after a set casing has been doffed therefrom and before the next casing is shirred thereon.

55. The invention, as set forth in claim 54, wherein the lubricating means includes an annular bristle brush located in the forward end of each compressor-doffer unit through which the associated mandrel moves axially, and means for supplying said brush with a measured amount of lubricant at the termination of the doffing operation whereby the full length of each mandrel is lubricated when the doffing slide and associated compressor-doffer unit are withdrawn to their rearmost positions.

56. The invention, as set forth in claim 44, wherein each of the mandrels is slightly tapered from a smaller forward end to the larger rear end to facilitate doffing of the set casing.

57. In a shirring head for shirring inflated sausage casings and the like onto a mandrel, in combination, a plurality of pairs of trucks in said shirring head movably mounted in spaced relation on opposite sides of said mandrel, a shirring dog carried by each truck, means in said shirring head for guiding said shirring dogs along paths such that substantially no relative longitudinal movement takes place between them and the casing when the former move into gripping engagement with the latter, and means in said shirring head for guiding said shirring dogs to swing backwards away from the casing on moving out of gripping engagement therewith.

58. In a shirring head for shirring inflated sausage casings and the like onto a mandrel, in combination, a plurality of pairs of trucks in said shirring head movably mounted in spaced relation on opposite sides of said mandrel, a shirring dog carried by each truck, guide means in said shirring head for said trucks to direct the same to move into and out of paths parallel to the casing, and guide means in said shirring head for said shirring dogs for controlling the movement thereof relative to the trucks carrying the same.

59. The invention, as set forth in claim 58, wherein the guide means for the shirring dogs cause the same to swing backwards away from the casing on moving out of gripping engagement therewith.

60. The invention, as set forth in claim 58, wherein the shirring dogs are formed of a phenolic condensation product.

61. In a shirring head for shirring inflated sausage casings and the like onto a mandrel, in combination, a pair of shirring chains in said shirring head located on opposite sides of said mandrel, a plurality of trucks carried by said chains and located opposite each other, a shirring dog rockably mounted on each truck for gripping opposite sides of the casing to move the same forwardly and shirr it onto said mandrel, truck guide plates in said shirring head located on opposite sides of said mandrel between said chains for guiding said trucks, and dog guide plates in said shirring head located along the opposite edges of one of said truck guide plates for guiding said dogs into and out of gripping engagement with the casing.

62. The invention, as set forth in claim 61, wherein the trucks and shirring dogs are provided with rollers for engaging the respective truck and dog guide plates.

63. The invention, as set forth in claim 62, wherein each shirring chain is an endless chain made up of three parallel chain sections, sprockets are located at the ends of the shirring zone for reversing the direction of the chains and have teeth for engaging only the links of the outer chain sections leaving the intermediate sections free of engagement by said sprockets, and chain guide plates are located along said intermediate chain sections with the ends extending past the rotational axes of said sprockets to guide the chains along paths bearing a fixed relation to the pitch circles of said sprockets.

64. In a shirring head for shirring inflated sausage casings and the like onto a mandrel, in combination, a pair of endless shirring chains in said shirring head located on opposite sides of said mandrel and made up of three parallel chain sections, a plurality of shirring dogs carried by said chains opposite each other for gripping opposite sides of the casing to move it forwardly and shirr it onto said mandrel, sprockets in said shirring head at the ends of the shirring zone for reversing the direction of the chains having teeth for engaging only the links of the outer chain sections leaving the intermediate sections free of engagement by said sprockets, and chain guide plates in said shirring head located along said intermediate chain sections with the ends extending past the rotational axes of said sprockets to guide the chains along paths bearing a fixed relation to the pitch circles of said sprockets.

65. In an automatic machine for shirring inflated sausage casings or the like, in combination, a shirring head in said machine, a motor for driving said shirring head, a turret in said machine including a plurality of mandrels arranged to be presented sequentially thereby to said shirring head to have the casing shirred thereon one by one while a casing previously shirred on a previously presented mandrel is compressed thereon and while a casing previously shirred and compressed on another mandrel is doffed therefrom, a motor for driving said turret, means in said machine for energizing said turret motor continuously, means in said machine for energizing said shirring head motor when the mandrel onto which the casing is to be shirred is in the shirring position, and means in said machine for deenergizing said shirring head motor when a predetermined length of casing has been shirred onto said mandrel.

66. In an automatic machine for shirring inflated sausage casings or the like, in combination, a shirring head in said machine, a motor for driving said shirring head, a turret in said machine including a plurality of mandrels arranged to be presented sequentially thereby to said shirring head to have the casing shirred thereon one by one while a casing previously shirred on a previously presented mandrel is compressed thereon and while a casing previously shirred and compressed on another mandrel is doffed therefrom, a motor for driving said turret, means in said machine for energizing said turret motor continuously, means in said machine for energizing said shirring head motor when the mandrel onto which the casing is to be shirred is in the shirring position, means in said machine for deenergizing said shirring head motor when a predetermined length of casing has been shirred onto said mandrel, and means in said machine for deenergizing said shirring head motor in the event that the casing is torn during the shirring operation.

67. In an automatic machine for shirring inflated sausage casings or the like, in combination, a shirring head in said machine, a motor for driving said shirring head, a turret in said machine including a plurality of mandrels arranged to be presented sequentially thereby to said shirring head to have the casing shirred thereon one by one while a casing previously shirred on a previously presented mandrel is compressed thereon and while a casing previously shirred and compressed on another mandrel is doffed therefrom, a motor for driving said turret, means in said machine for energizing said turret motor continuously, means in said machine for energizing said shirring head motor when the mandrel onto which the casing is to be shirred is in the shirring position, means in said machine for deenergizing said shirring head motor when a predetermined length of casing has been shirred onto said mandrel, means in said machine for deenergizing said motors in the event that the casing is torn during the shirring operation, and means in said machine for maintaining said turret motor energized until said turret is advanced to the next position.

68. In an automatic machine for shirring inflated sausage casings or the like, in combination, a shirring head in said machine, a motor for driving said shirring head, a turret in said machine including a plurality of mandrels arranged to be presented sequentially thereby to said shirring head to have the casing shirred thereon and subsequently to have the shirred casing doffed therefrom, a motor for driving said turret, means in said machine for energizing said turret motor continuously, means in said machine for energizing said shirring head motor when the mandrel onto which the casing is to be shirred is in the shirring position, means in said machine for deenergizing said shirring head motor when a predetermined length of casing has been shirred onto said mandrel, means in said machine for severing the casing when said predetermined length of casing has been shirred thereby permitting it to become deflated, means in said machine for deenergizing said shirring head motor in the event that the casing is torn during the shirring operation and deflated, and means in said machine for rendering the last mentioned means ineffective at the beginning of the shirring operation until the casing is inflated.

69. In a machine for shirring sausage casings and the like having a mandrel and a shirring head in cooperative relation therewith for shirring said casings thereon, in combination, means in said machine movably supporting said mandrel, means operatively connected to said mandrel for moving it away from said shirring head while a casing is being shirred thereon, means in said machine for clamping the casing and positively gripping the same on termination of the shirring operation, and means in said machine for cutting the clamped and gripped casing adjacent said clamping and gripping means.

70. In a machine for shirring sausage casings and the like having a hollow mandrel, a shirring head in cooperative relation therewith for shirring said casings thereon, and means for supplying air under pressure through said hollow mandrel to inflate the casing during the shirring operation, in combination, means in said machine for starting said shirring head to shirr said casing onto said mandrel, means for movably supporting said mandrel in said machine with the air passing therethrough, means operatively connected to said mandrel for moving it in the direction in which the casing is shirred simultaneously with the shirring operation, a pair of opposed clamp members in said machine having semi-circular openings for clamping the casing therebetween and having parallel faces constituting extensions of the surfaces bounding said openings, the diameter of said openings being slightly less than the external diameter of the casing being shirred whereby diametrically opposite portions of the same are gripped between said parallel faces, means in said machine for moving said clamp members into engagement with said casing, and means in said machine for cutting the clamped and gripped casing adjacent said clamp members while they hold the same.

71. In a machine for shirring sausage casings and the like, in combination, a tapered mandrel in said machine, a shirring head in said machine positioned to shirr a casing onto said mandrel from its smaller end, and doffing means in said machine positioned at the larger end of said mandrel and arranged and adapted to strip the shirred casing therefrom off of its smaller end.

72. In a machine for shirring sausage casings and the like, in combination, a tapered mandrel, means in said machine for movably supporting said mandrel, a shirring head in said machine positioned to shirr a casing onto said mandrel from its smaller end, means operatively connected to said mandrel for moving it in the direction in which said casing is shirred simultaneously with the shirring operation, and doffing means in said machine positioned at the larger end of said mandrel and arranged and adapted to strip the shirred casing therefrom off of its smaller end.

73. In a machine for shirring sausage casings and the like, in combination, a tapered mandrel in said machine, a plurality of pairs of trucks in said machine movably mounted in spaced relation on opposite sides of said mandrel, a shirring dog carried by each truck, means for moving said trucks to cause the casing to be gripped by pairs of shirring dogs to shirr said casing onto said mandrel from its smaller end, guide means in said machine for said shirring dogs to cause them to swing backwards away from said casing at the larger end of said mandrel on moving out of gripping engagement with said casing, and doffing means in said machine positioned at the larger end of said mandrel and arranged and adapted to strip the shirred casing therefrom off of its smaller end.

74. In a machine for shirring sausage casings and the like, in combination, a tapered mandrel in said machine, a plurality of pairs of trucks in said machine movably mounted in spaced relation on opposite sides of said mandrel, a shirring dog carried by each truck, means for moving said trucks to cause the casing to be gripped by pairs of shirring dogs to shirr said casing onto said mandrel from its smaller end, guide means in said machine for said shirring dogs to cause them to swing backwards away from said casing at the larger end of said mandrel on moving out of gripping engagement with said casing, means in said machine movably supporting said mandrel, means operatively connected to said mandrel for moving it in the direction in which said casing is shirred simultaneously with the shirring operation, and doffing means in said machine positioned at the larger end of said mandrel and arranged and adapted to strip the shirred casing therefrom off of its smaller end.

PAUL H. KORSGAARD.

REFERENCES CITED

The following references are of record in the file of this patent:

UNITED STATES PATENTS

| Number | Name | Date |
|---|---|---|
| 2,010,626 | Dietrich | Aug. 6, 1935 |